US011212657B2

United States Patent
Zhao et al.

(10) Patent No.: US 11,212,657 B2
(45) Date of Patent: Dec. 28, 2021

(54) DEVICE CONTROL METHOD AND DEVICE

(71) Applicant: HUAWEI TECHNOLOGIES CO., LTD., Guangdong (CN)

(72) Inventors: Peng Zhao, Xi'an (CN); Xiangyang Wang, Xi'an (CN); Feng Chen, Xi'an (CN); Guangze Zhu, Xi'an (CN); Xiong Shen, Xi'an (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 100 days.

(21) Appl. No.: 16/622,528

(22) PCT Filed: Jun. 16, 2017

(86) PCT No.: PCT/CN2017/088813
§ 371 (c)(1),
(2) Date: Dec. 13, 2019

(87) PCT Pub. No.: WO2018/227633
PCT Pub. Date: Dec. 20, 2018

(65) Prior Publication Data
US 2020/0213830 A1    Jul. 2, 2020

(51) Int. Cl.
*H04W 4/80* (2018.01)
*H04W 4/70* (2018.01)
(Continued)

(52) U.S. Cl.
CPC ......... *H04W 4/80* (2018.02); *H04M 1/72412* (2021.01); *H04W 4/70* (2018.02);
(Continued)

(58) Field of Classification Search
CPC ......... H04W 4/80; H04W 4/70; H04W 76/14; H04W 8/24; H04W 52/0235;
(Continued)

(56) References Cited

U.S. PATENT DOCUMENTS

| 2006/0046704 | A1* | 3/2006 | Hori | H04W 88/02 455/418 |
| 2008/0165829 | A1* | 7/2008 | Lee | H04W 4/80 375/130 |
| 2011/0081859 | A1  | 4/2011 | Chung | |
| 2014/0256256 | A1* | 9/2014 | Park | H04W 36/14 455/41.1 |

(Continued)

FOREIGN PATENT DOCUMENTS

| CN | 101227199 A | 7/2008 |
| CN | 101374310 A | 2/2009 |

(Continued)

OTHER PUBLICATIONS

International Search Report for PCT/CN2017/088813, dated Mar. 19, 2018, 4 pages.

*Primary Examiner* — Farid Seyedvosoghi

(57) ABSTRACT

This application relates to the field of communications technologies, and provides a device control method and a device, so that efficiency of controlling a wireless device to disable or enable a wireless transmit capability of the wireless device or to be powered off can be improved. One solution includes at least: establishing, by a first device, a wireless short-range communication connection to a second device, and sending, by the first device, a first control command to the second device through the wireless short-range communication connection. The first control command is used to instruct the second device to perform a control action, the control action includes disabling a wireless communication capability, enabling a wireless communication capability, powering on, or powering off, and the wireless communication capability includes a wireless transmit capability, or the wireless communication capability includes a wireless transmit capability and a wireless receive capability.

20 Claims, 75 Drawing Sheets

(51) Int. Cl.
*H04W 76/14* (2018.01)
*H04W 8/24* (2009.01)
*H04W 52/02* (2009.01)
*H04M 1/72412* (2021.01)

(52) U.S. Cl.
CPC ......... *H04W 8/24* (2013.01); *H04W 52/0235* (2013.01); *H04W 52/0274* (2013.01); *H04W 76/14* (2018.02); *H04M 2250/02* (2013.01)

(58) Field of Classification Search
CPC ......... H04W 52/0274; H04M 1/72412; H04M 1/72415; H04M 2250/02; Y02D 30/70; G08C 17/02
See application file for complete search history.

(56) References Cited

U.S. PATENT DOCUMENTS

| | | | |
|---|---|---|---|
| 2016/0227600 A1 | 8/2016 | Shedletsky et al. | |
| 2016/0325391 A1* | 11/2016 | Stampfl | H04W 48/10 |
| 2017/0083220 A1 | 3/2017 | Gao et al. | |
| 2018/0116040 A1* | 4/2018 | Mann | H05B 31/50 |
| 2019/0342738 A1* | 11/2019 | Gao | H04W 4/80 |

FOREIGN PATENT DOCUMENTS

| | | |
|---|---|---|
| CN | 101478595 A | 7/2009 |
| CN | 101827317 A | 9/2010 |
| CN | 102833422 A | 12/2012 |
| CN | 105182777 A | 12/2015 |
| CN | 106658560 A | 5/2017 |

* cited by examiner

DEVICE CONTROL METHOD AND DEVICE

CROSS-REFERENCE TO RELATED APPLICATIONS

This application is a national stage of International Application No. PCT/CN2017/088813, filed on Jun. 16, 2017, the entire contents of which is hereby incorporated by reference in its entirety.

TECHNICAL FIELD

This application relates to the field of communications technologies, and in particular, to a device control method and a device.

BACKGROUND

With development of electronic technologies, an increasing quantity of portable electronic devices (such as a smartphone, a notebook computer, a tablet computer, and a Bluetooth band) gradually enter people's lives, so as to facilitate work and learning of the people. Based on different usage purposes, a user may carry a plurality of portable electronic devices.

In some scenarios or in some time periods, the user may need to control, one by one, portable electronic devices carried by the user to be turned off or turned on, or to disable wireless communication capabilities of the electronic devices (for example, control the electronic devices to be in an airplane mode). For example, when the user is taking an airplane, the user needs to turn off, one by one, the electronic devices carried by the user to reduce electromagnetic interference; after the airplane is landed, to restore normal use of the electronic devices, the user needs to turn on, one by one, the electronic devices carried by the user.

Relatively cumbersome user operations are required for the user to manually turn off or turn on a plurality of electronic devices one by one, and consequently, user experience is poor. In addition, if the user has a lot of electronic devices, the user may forget to turn off or turn on an electronic device. Consequently, there may be a security risk or inconvenience may be caused to the user.

SUMMARY

This application provides a device control method and a device, so as to improve efficiency of controlling a wireless device to disable or enable a wireless communication capability or to be powered off.

To achieve the foregoing objective, at least the following technical solutions are used in this application.

According to a first aspect, this application provides a device control method. The device control method includes: establishing, by a first device, a wireless short-range communication connection to a second device; and sending, by the first device, a first control command to the second device through the wireless short-range communication connection. The first control command may be used to instruct the second device to perform a control action (for example, the control action includes enabling a wireless communication capability, disabling a wireless communication capability, powering on, or powering off). The wireless communication capability may include a wireless transmit capability, or the wireless communication capability includes a wireless transmit capability and a wireless receive capability.

According to the device control method provided in this application, the first device may send a first control command to second devices to instruct the second devices to perform a control action (for example, the control action includes enabling a wireless communication capability, disabling a wireless communication capability, powering on, or powering off). In this way, a user does not need to manually control the second devices to enable a wireless communication capability, disable a wireless communication capability, be powered on, or be powered off. In addition, the first device may simultaneously control a plurality of second devices to perform the control action by using the first control command, without a need of manually controlling the plurality of second devices one by one, so that efficiency of controlling a plurality of wireless devices to perform the control action can be improved. Then, a security risk existing or inconvenience caused to the user because the user forgets a wireless device may be further reduced.

Optionally, in an implementation of the first aspect, before the "sending, by the first device, a first control command to the second device through the wireless short-range communication connection", the method in this application may further include: displaying, by the first device in response to a first input of a user, a first interface including a device connection window, where the device connection window may include an identifier of a device that has a wireless short-range communication connection to the first device.

In this application, the first device may display, in response to the first input, the first interface including the device connection window. The device connection window includes the identifier of the device that has the wireless short-range communication connection to the first device. Therefore, the first device may notify, through the first interface, the user of second devices that have wireless short-range communication connections to the first device. In this way, a security risk existing or inconvenience caused to the user because the user forgets to disable a wireless device or a wireless communication capability of the wireless device may be avoided.

For example, when a user is taking an airplane, if the user carries a relatively large quantity of wireless devices, the user is very likely to forget to turn off a wireless device, electromagnetic interference may occur on the airplane. Usually, there are wireless short-range communication connections between all wireless devices of the user that are powered on. In the solution of this application, second devices that have wireless short-range communication connections to the first device may be notified to the user.

Optionally, in an implementation of the first aspect, before the "sending, by the first device, a first control command to the second device through the wireless short-range communication connection", the method in this application further includes: displaying, by the first device, a second interface including a selection window, where the selection window is used to set indication information in the first control command, and the indication information is used to indicate a control action to be performed by the second device. The user may enter indication information in the selection window in the second interface, so that the first device may send, to the second device based on the indication information, the first control command used to instruct the second device to perform a corresponding control action. For example, when the user enters, in the selection window, first indication information that is used to instruct the second device to disable the wireless transmit capability of the second device, the first device may send, to the second device, a first control command that carries the first indication information, so as to instruct the second device to disable the wireless transmit capability of the second device.

Optionally, in an implementation of the first aspect, the second interface includes not only the selection window, but also a time window. Time information entered in the time window is used to indicate a time at which the second device performs the control action. For example, when the time information is 9:00:00-10:00:00, the first control command that carries the first indication information may be used to instruct the second device to disable the wireless transmit capability of the second device in the time period 9:00:00-10:00:00.

Optionally, in an implementation of the first aspect, the first input may be further used to instruct the first device to be powered off. In this implementation, the first input may be an instruction used to instruct the first device to be powered off. For example, the first input may be an instruction triggered by a touch and hold operation performed by the user on a lock screen key of a mobile phone (the first device). In this implementation, the first device may respond to the first input, first perform the method steps in the first possible implementation, and then display a power off interface after "the first device sends the first control command to the second device through the wireless short-range communication connection".

Optionally, in an implementation of the first aspect, the first input may be used to instruct the first device to disable a wireless communication capability of the first device. For example, the first input is an instruction triggered by the user's operation of enabling an "airplane mode" of the mobile phone (namely, the first device). In this implementation, in response to the first input, the first device may first perform the method steps in any one of the first possible implementation to the third possible implementation, then disable the wireless communication capability of the first device, and display a third interface, where the third interface includes indication information indicating that the wireless communication capability of the first device has been disabled.

Optionally, in an implementation of the first aspect, the first input may be a start instruction of a first application, and the first interface is a display interface of the first application. The first application may be an application downloaded by the user from an application store and installed on the first device, or the first application may be a system application of the first device.

Optionally, in an implementation of the first aspect, the first control command carries first indication information and time information, and the first indication information is used to instruct the second device to disable the wireless transmit capability of the second device within a time indicated by the time information.

Optionally, in an implementation of the first aspect, the first control command carries second indication information and time information, and the second indication information is used to instruct the second device to disable the wireless transmit capability and the wireless receive capability of the second device within a time indicated by the time information. Optionally, the second indication information may be further used to instruct the second device to enable the wireless receive capability of the second device after the time indicated by the time information.

Optionally, in an implementation of the first aspect, the first control command carries third indication information and time information, and the third indication information is used to instruct the second device to be powered off within a time indicated by the time information. Optionally, the third indication information is further used to instruct the second device to be powered on after the time indicated by the time information, disable the wireless transmit capability of the second device, and enable the wireless receive capability of the second device.

Optionally, in an implementation of the first aspect, the first control command may be further used to instruct a third device that has a wireless short-range communication connection to the second device to perform the control action.

Optionally, in an implementation of the first aspect, the wireless transmit capability may include one or more of a radio frequency transmit Tx capability, a wireless fidelity (WiFi) transmit capability, and a Bluetooth transmit capability. The wireless receive capability may include one or more of a radio frequency receive Rx capability, a WiFi receive capability, and a Bluetooth receive capability.

According to a second aspect, a device control method is provided. The device control method includes: establishing, by a second device, a wireless short-range communication connection to a first device; receiving, by the second device through the wireless short-range communication connection, a first control command sent by the first device; and performing, by the second device, a control action according to an instruction of the first control command. For the control action and a wireless communication capability in the second aspect, refer to related descriptions in the first aspect and the possible implementations of the first aspect. Details are not described again in this application.

In this application, after receiving the first control command sent by the first device, the second device may automatically perform a corresponding control action according to the instruction of the first control command, while the user does not need to manually control the second device to perform the control action, thereby improving efficiency of controlling a wireless device to perform the control action. Then, a security risk existing or inconvenience caused to the user because the user forgets a wireless device may be further reduced.

Optionally, in an implementation of the second aspect, the first control command further carries time information, and the time information is used to indicate a time at which the second device performs the control action.

In some embodiments, the time information may include a first time and a second time. The second device may be powered off at the first time and is powered on at the second time according to the first control command. Optionally, the second device may be powered on and disable the wireless communication capability at the second time according to the first control command.

In other embodiments, the time information includes a first time and a second time. The second device disables the wireless communication capability at the first time and enables the wireless communication capability at the second time according to the first control command.

According to a third aspect, this application provides a first device, and the first device includes an establishment module and a sending module. The establishment module is configured to establish a wireless short-range communication connection to a second device. The sending module is configured to send the first control command described in the first aspect and the possible implementations of the first aspect to the second device through the wireless short-range communication connection established by the establishment module.

Optionally, in a possible implementation of the third aspect, the first device may further include a display module. The display module is configured to: perform the method step in any possible implementation of the first aspect, and display a display interface such as a first interface, a second interface, or a power off interface in the possible implementation of the first aspect.

Optionally, in a possible implementation of the third aspect, the first device may further include a control module. The control module is configured to disable a wireless communication capability of the first device after the sending module sends the first control command to the second device through the wireless short-range communication connection.

According to a fourth aspect, this application provides a first device, and the first device includes a processor, a communications interface, a display, and a memory. The processor, the communications interface, the display, and the memory are connected through a bus, the communications interface is configured to communicate with a second device through a wireless short-range communication connection, the display is configured to display a display interface generated by the processor, the memory is configured to store computer program code, the computer program code includes an instruction, and when the processor executes the instruction, the first device performs the device control method according to the first aspect or any possible implementation of the first aspect.

According to a fifth aspect, this application provides a second device, and the second device includes an establishment module, a receiving module, and a control module. The establishment module is configured to establish a wireless short-range communication connection to a first device. The receiving module is configured to receive, through the wireless short-range communication connection established by the establishment module, a first control command sent by the first device. The control module is configured to perform the control action described in the second aspect according to an instruction of the first control command received by the receiving module.

It should be noted that for the first control command described in the fifth aspect of this application, refer to the first control command described in the second aspect and any possible implementation of the second aspect.

Optionally, when time information carried in the first control command includes a first time and a second time, the control module may be specifically configured to: power off the second device at the first time and power on the second device at the second time according to the first control command. Optionally, the control module may be specifically configured to: power off the second device at the first time and power on the second device at the second time according to the first control command.

Alternatively, when time information carried in the first control command includes a first time and a second time, the control module may be specifically configured to: disable a wireless communication capability at the first time and enable a wireless communication capability at the second time according to the first control command.

According to a sixth aspect, this application provides a second device, and the second device includes a processor, a communications interface, and a memory. The processor, the communications interface, and the memory are connected through a bus, the communications interface is configured to communicate with a second device through a wireless short-range communication connection, the memory is configured to store computer program code, the computer program code includes an instruction, and when the processor executes the instruction, the second device performs the device control method according to the second aspect or any possible implementation of the second aspect.

According to a seventh aspect, this application provides a computer storage medium. The computer storage medium includes computer instruction(s), and when the computer instruction(s) is/are run on a first device, the terminal is enabled to perform the device control method according to the first aspect, the second aspect, or any possible implementation of the first aspect or the second aspect.

According to an eighth aspect, this application provides a computer program product. When the computer program product is run on a computer, the computer is enabled to perform the device control method according to the first aspect, the second aspect, or any possible implementation of the first aspect or the second aspect.

It may be understood that the first device in the third aspect and the fourth aspect, and the second device in the fifth aspect and the sixth aspect, the computer storage medium in the seventh aspect, and the computer program product in the eighth aspect that are provided above are all configured to perform a corresponding method provided above. Therefore, for beneficial effects that can be achieved by the first device, the second device, the computer storage medium, or the computer program product, refer to beneficial effects in the corresponding method provided above.

DESCRIPTION OF DRAWINGS

FIG. 15A-1, FIG. 15B-1, FIG. 15A-2, and FIG. 15B-2 illustrate a schematic diagram 10 of a mobile phone display interface instance according to an embodiment of the present invention;

DESCRIPTION OF EMBODIMENTS

The terms "first" and "second" mentioned below are merely intended for a purpose of description, and shall not be understood as an indication or implication of relative importance or implicit indication of the number of indicated technical features. Therefore, a feature limited by "first" or "second" may explicitly or implicitly include one or more features. In the description of the embodiments of the present application, unless otherwise stated, "a plurality of" means two or more than two. For example, at least two second devices mean two or more second devices.

Embodiments of the present application provide a device control method. The method may be applied to a process in which a first device controls a second device to enable a wireless communication capability, disable a wireless communication capability, be powered on, or be powered off.

For example, the wireless communication capability in the embodiments of the present application may include a wireless receive capability and a wireless transmit capability, or the wireless communication capability may include a wireless transmit capability, or the wireless communication capability may include a wireless receive capability. The wireless transmit capability may include at least one of a radio frequency transmit (Tx) capability, a WiFi transmit capability, and a Bluetooth transmit capability. The wireless receive capability may include at least one of a radio frequency receive (Rx) capability, a WiFi receive capability, and a Bluetooth receive capability.

It should be noted that the radio frequency Tx capability may also be referred to as a radio frequency Tx channel, a radio frequency Tx resource, or a transmitter, and the radio frequency Rx capability may also be referred to as a radio frequency Rx channel, a radio frequency Rx resource, or a receiver.

For example, the first device in the embodiments of the present application may be a device such as a mobile phone, a notebook computer, a tablet computer, an ultra-mobile personal computer (UMPC), a netbook, or a personal digital assistant (PDA); the second device may include a mobile phone, a wearable device (such as a Bluetooth band, a Bluetooth watch, and a Bluetooth headset), an augmented reality (AR) device/a virtual reality (VR) device, a tablet computer, a notebook computer, a UMPC, a netbook, a PDA, and a Bluetooth water cup. This is not limited in the embodiments of the present application.

Figure 1:
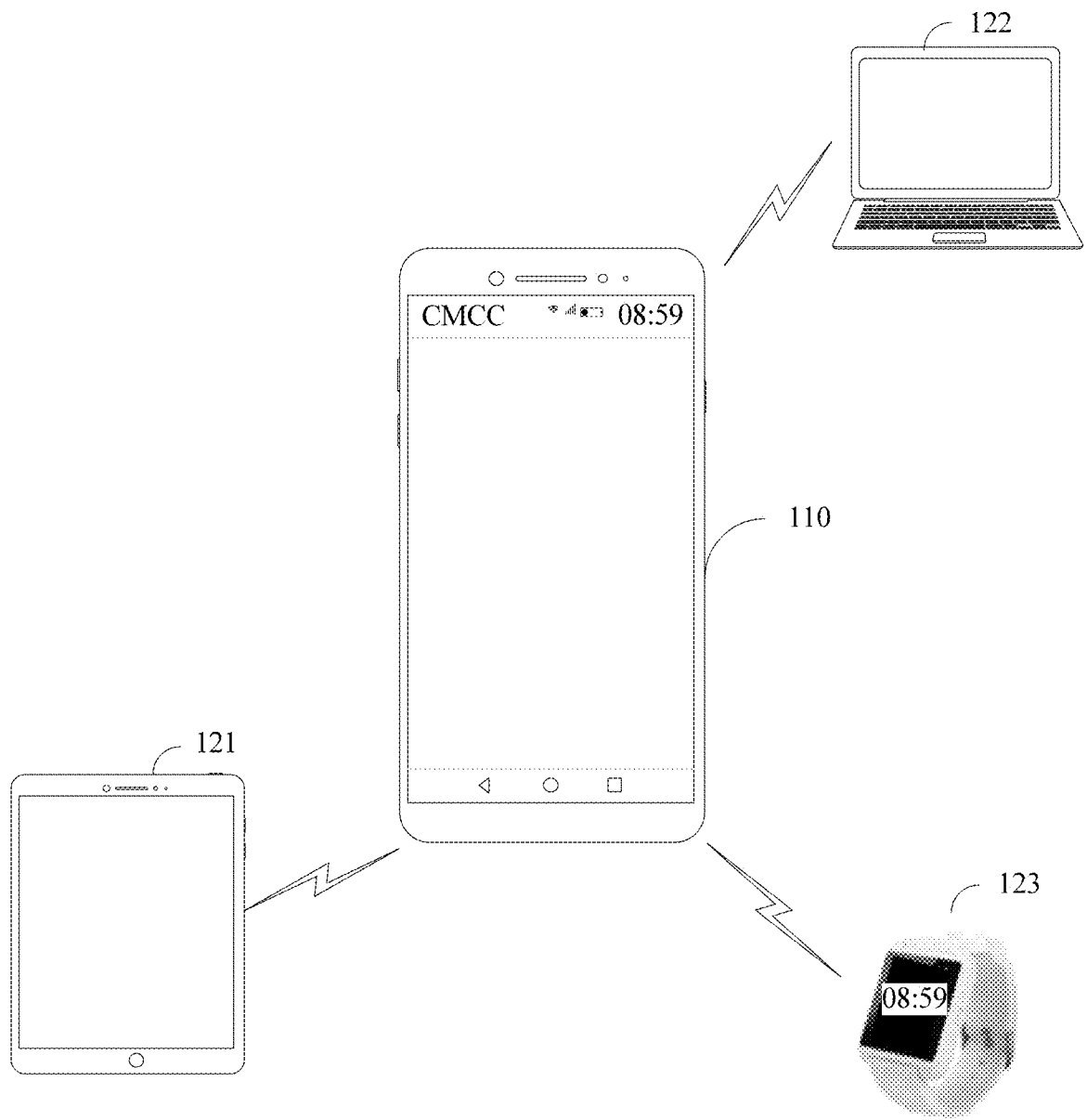
FIG. 1 is a schematic diagram of a network architecture to which a device control method is applied according to an embodiment of the present application.

Referring to FIG. 1, in the embodiments of the present application, that the first device is a mobile phone 110, and the second device includes a tablet computer 121, a notebook computer 122, and a Bluetooth band 123 is used as an example to briefly describe a network architecture to which a device control method provided in the embodiments of the present application is applied.

As shown in FIG. 1, the mobile phone 110 establishes a wireless short-range communication connection to each of the tablet computer 121, the notebook computer 122, and the Bluetooth band 123. The wireless short-range communication connection is a communication connection established by using a wireless short-range communications technology. The wireless short-range communications technology in the present application may be a Bluetooth connection or a WiFi connection, or may be another wireless short-range communications technology such as an infrared connection, a near field communication (NFC) connection, an ultra-wideband connection, or a zigbee protocol connection. This is not specifically limited in the embodiments of the present application. The WiFi connection may be a WiFi direct connection, namely, a point-to-point connection through a WiFi device.

The mobile phone 110 may send a control command to each of these devices (including the tablet computer 121, the notebook computer 122, and the Bluetooth band 123) through the wireless short-range communication connection between the mobile phone and each of the tablet computer 121, the notebook computer 122, and the Bluetooth band 123, so as to instruct the devices to perform a corresponding control action.

The control action may include enabling a wireless communication capability, disabling a wireless communication capability, powering on, or powering off, to be specific, the first device may control the second device to enable or disable the wireless communication capability of the second device, or control the second device to be powered off or to be powered on. The first device may further control the second device to be powered off, and to be powered on at a specified time after the power-off. Alternatively, the first device may further control the second device to be powered off, and to be powered on and disable the wireless transmit capability at a specified time after the power-off.

For example, the method in the embodiments of the present application may be applied to a process in which a user is taking an airplane. When the airplane takes off, to reduce or avoid electromagnetic interference caused to the airplane by a wireless device carried by the user, the user may use a mobile phone (namely, the first device) to perform the method in the embodiments of the present application to control another wireless device (namely, the second device, such as a notebook, a tablet computer, and a Bluetooth band) of the user to disable a wireless communication capability of the device or to be powered off.

Alternatively, the method in the embodiments of the present application may be further applied to a case in which a user is preparing for a rest or is to attend a conference or lecture. To reduce or avoid impact of a wireless device carried by the user on the rest of the user or the conference or lecture to be attended by the user, the user may use a mobile phone (namely, the first device) to perform the method in the embodiments of the present application to control another wireless device (namely, the second device, such as a notebook, a tablet computer, and a Bluetooth band) of the user to disable a wireless communication capability of the device or to be powered off.

It should be noted that an application scenario of the device control method provided in the embodiments of the present application includes but is not limited to the foregoing scenario in which the user is taking an airplane, the user is preparing for a rest, the user is to attend a conference, or the user is to attend a lecture. Details about another application scenario of the device control method are not described in the embodiments of the present application.

Further, the method in the embodiments of the present application may be applied to a process in which the first device controls the second device and a third device that has a wireless short-range communication connection to the second device to perform the foregoing control action.

For example, the third device may be a mobile phone, a wearable device (such as a Bluetooth band, a Bluetooth watch, or a Bluetooth headset), an AR device/a VR device, a tablet computer, a notebook computer, a UMPC, a netbook, a PDA, or a Bluetooth water cup. This is not limited in the embodiments of the present application.

Figure 2:
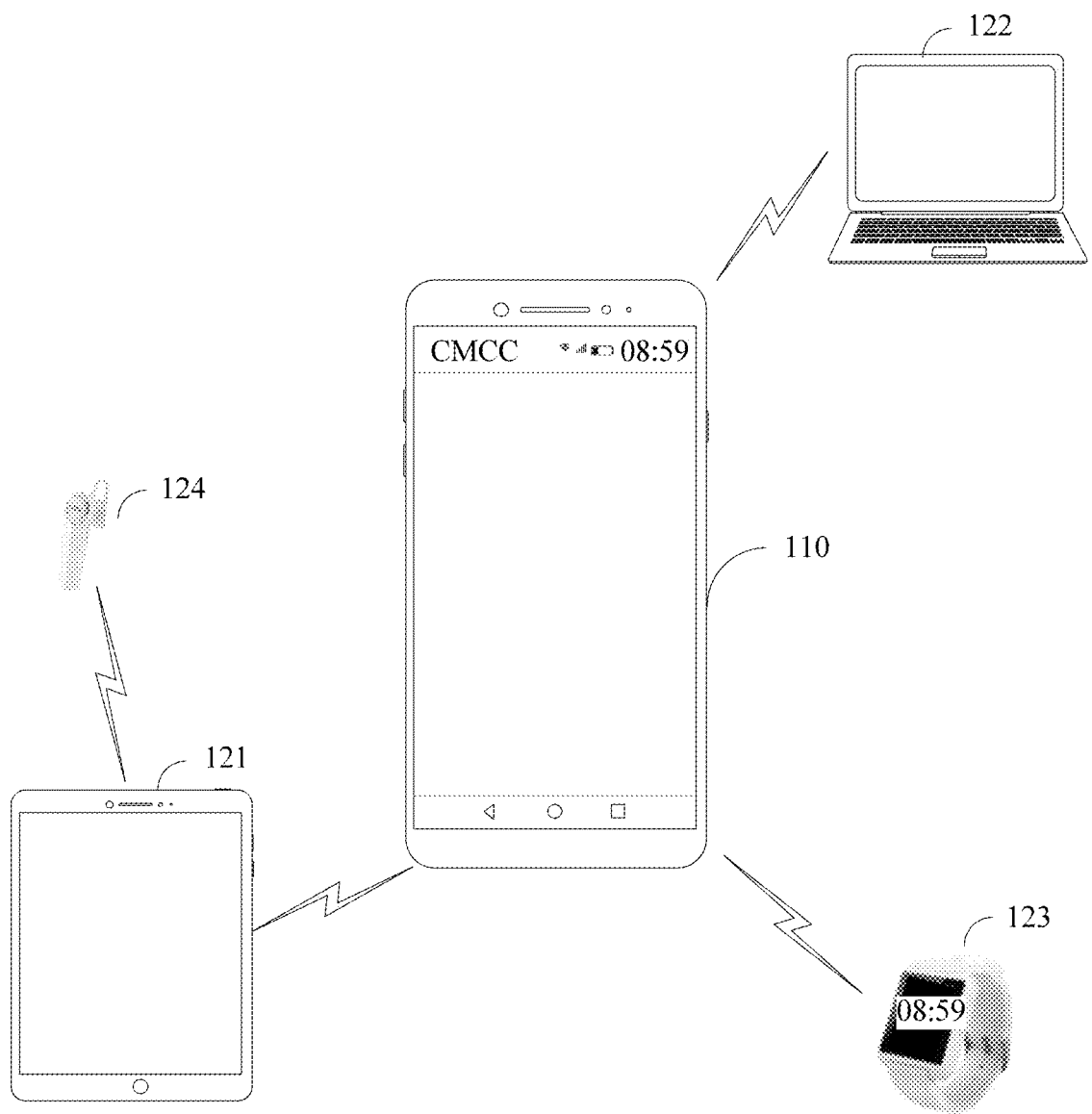
FIG. 2 is a schematic diagram of a network architecture to which a device control method is applied according to an embodiment of the present application.

Referring to FIG. 2, in the embodiments of the present application, that the first device is a mobile phone 110, the second device includes a tablet computer 121, a notebook computer 122, and a Bluetooth band 123, and the third device is a Bluetooth headset 124 is used as an example to briefly describe a network architecture to which a device control method provided in the embodiments of the present application is applied.

As shown in FIG. 2, the mobile phone 110 establishes a wireless short-range communication connection to each of the tablet computer 121, the notebook computer 122, and the Bluetooth band 123. The tablet computer 121 establishes a wireless short-range communication connection to the Bluetooth headset 124. The wireless short-range communication connection may be a Bluetooth connection or a WiFi connection.

The mobile phone 110 may send a control command to each of the tablet computer 121, the notebook computer 122, and the Bluetooth band 123 through the wireless short-range communication connection between the mobile phone and each of the foregoing devices, so as to instruct the tablet computer 121, the notebook computer 122, and the Bluetooth band 123 to perform the foregoing control action. After receiving the control command, the tablet computer 121 may send a control command to the Bluetooth headset 124 that has the wireless short-range communication connection to the tablet computer, so as to instruct the Bluetooth headset 124 to perform the foregoing control action.

It should be noted that, according to the method in the embodiments of the present application, the first device may enable or disable the wireless communication capability of the second device by instructing the second device to operate a switch of the wireless communication capability of the second device, or may instruct the second device to enter a preset use mode, so as to enable or disable the wireless communication capability of the second device. For example, it is assumed that the first device is a mobile phone a, and the second device is a mobile phone b. The mobile phone a may instruct the mobile phone b to enter a use mode such as an airplane mode, a conference mode, or a silent mode. In a different use mode, a wireless communication capability of the mobile phone b is in a different state. For example, in the airplane mode, both a wireless transmit capability and a wireless receive capability of the mobile phone b are disabled; in the conference mode, the wireless receive capability of the mobile phone b is disabled.

It may be understood that, by using the method in the embodiments, the first device may further enable or disable some functions of the second device. For example, when the mobile phone a establishes a wireless short-range communication connection to the mobile phone b, the mobile phone a may control the mobile phone b to turn on a camera, a flashlight, or the like.

Figure 3:
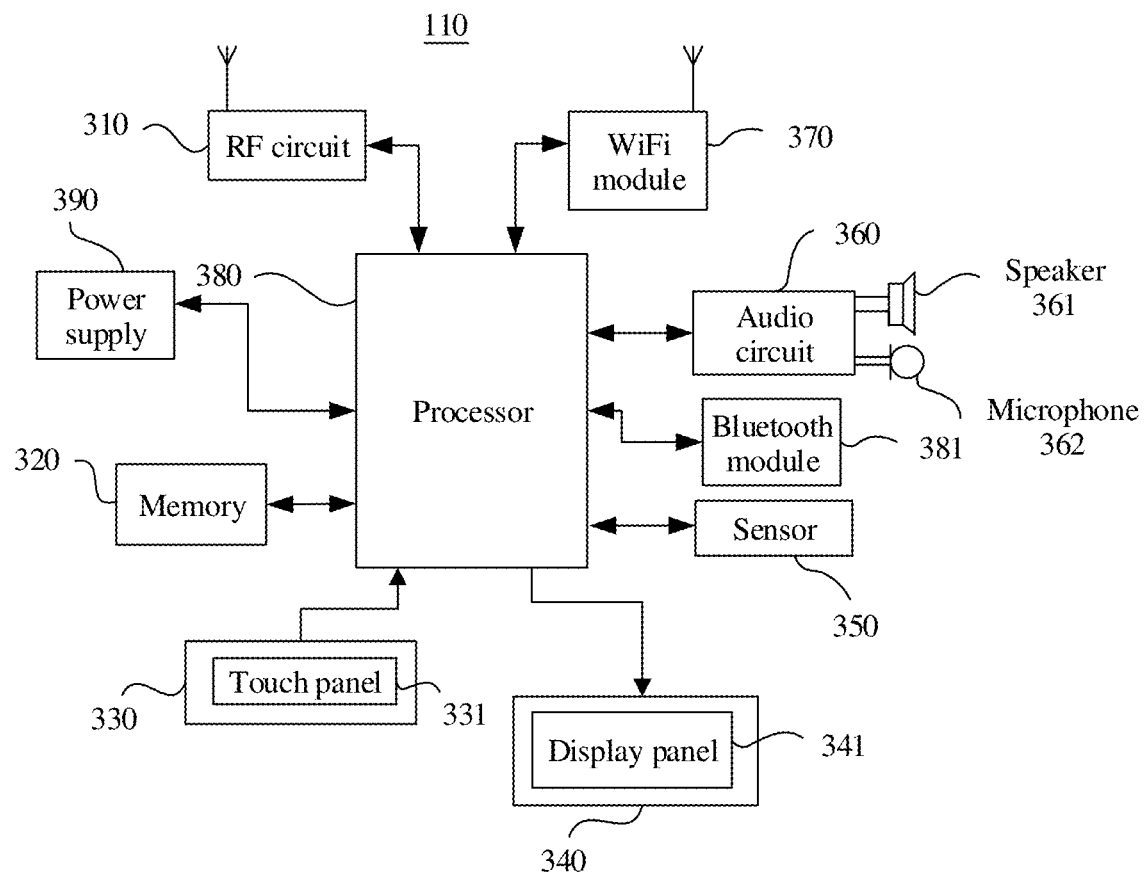
FIG. 3 is a schematic structural diagram of hardware of a mobile phone according to an embodiment of the present application.

In the following embodiment, an example in which a first device is a mobile phone is used to describe how the first device and a second device implement a specific technical solution in the embodiments. As shown in FIG. 3, the first device in this embodiment may be the mobile phone 110. The mobile phone 110 is used as an example below to describe the embodiment in detail.

It should be understood that, the mobile phone 110 shown in the figure is merely an example of the terminal, and the mobile phone 110 may have more or fewer components than those shown in the figure, may combine two or more components, or may have different component configurations. The components shown in FIG. 3 may be implemented in hardware, software, or a combination of hardware and software including one or more signal processing and/or application-specific integrated circuits.

As shown in FIG. 3, the mobile phone 110 includes components such as a radio frequency (RF) circuit 310, a memory 320, an input unit 330, a display unit 340, a sensor 350, an audio circuit 360, a Wi-Fi module 370, a processor 380, and a power supply 390. A person skilled in the art may understand that a structure of the mobile phone shown in FIG. 3 does not constitute a limitation on the mobile phone, and the mobile phone may include more or fewer components than those shown in the figure, may combine some components, or may have different component arrangements.

The following specifically describes the components of the mobile phone 110 with reference to FIG. 3.

The RF circuit 310 may be configured to receive and send signals in an information receiving and sending process or a call process. The RF circuit 310 may receive downlink information from a base station, and then transmit the downlink information to the processor 380 for processing; and send uplink data to the base station. Usually, the RF circuit includes but is not limited to devices such as an antenna, at least one amplifier, a transceiver, a coupler, a low noise amplifier, and a duplexer. In addition, the RF circuit 310 may further communicate with a network and another mobile device through wireless communication. The wireless communication may use any communication standard or protocol that includes but is not limited to a global system for mobile communications, a general packet radio service, code division multiple access, wideband code division multiple access, long term evolution, an email, a short message service, and the like.

The memory 320 may be configured to store a software program and data. The processor 380 runs the software program and the data stored in the memory 320, to perform various functions and data processing of the mobile phone 110. The memory 320 may mainly include a program storage area and a data storage area. The program storage area may store an operating system, an application program required by at least one function (such as a voice play function and an image display function), and the like. The data storage area may store data (such as audio data and a phone book) that is created based on use of the mobile phone 110, and the like. In addition, the memory 320 may include a high speed random access memory, and may further include a non-volatile memory, such as at least one magnetic disk storage device, a flash memory, or another volatile solid-state storage device. In the following embodiments, the memory 320 stores an operating system that can enable the mobile phone 110 to run, for example, an iOS® operating system developed by Apple Inc., an Android® open source operating system developed by Google Inc., or a Windows® operating system developed by Microsoft Corporation.

The input unit 330 (for example, a touchscreen) may be configured to: receive entered digit or character information, and generate signal input related to user setting and function control of the mobile phone 110. Specifically, the input unit 330 may include a touch panel 331 disposed on a front face of the mobile phone 110. The touch panel 331 may collect a touch operation of a user on or near the touch panel 331 (for example, an operation performed by the user on or near the touch panel 331 by using any suitable object or accessory such as a finger or a stylus), and drive a corresponding connection apparatus based on a preset program. Optionally, the touch panel 331 may include two parts: a touch detection apparatus and a touch controller (not shown in FIG. 3). The touch detection apparatus detects a touch position of the user, detects a signal generated by the touch operation, and transfers the signal to the touch controller. The touch controller receives touch information from the touch detection apparatus, converts the touch information into touch point coordinates, sends the touch point coordinates to the processor 380, and can receive and execute an instruction sent by the processor 380. In addition, the touch panel 331 may be of a resistive type, a capacitive type, an infrared type, a surface acoustic wave type, or the like.

The display unit 340 (namely, a display screen) may be configured to display information entered by the user or information provided for the user, and graphical user interfaces (GUI) of various menus of the mobile phone 110. The display unit 340 may include a display panel 341 disposed on the front face of the mobile phone 110. The display panel 341 may be configured in a form of a liquid crystal display, a light-emitting diode, or the like.

In some embodiments, the mobile phone 110 includes a front face A and a back face B. An optical touch button is disposed at the bottom of the front face A. The touch panel 331 and the display panel 341 are further disposed, and the touch panel 331 covers the display panel 341. The touch panel 331 detects a touch operation on or near the touch panel 331, and then transfers the touch operation to the processor 380 to determine a touch event. Then the processor 380 provides a corresponding visual output on the display panel 341 based on a type of the touch event. Although in FIG. 3, the touch panel 331 and the display panel 341 serve as two independent components to implement input and output functions of the mobile phone 110, in some embodiments, the touch panel 331 and the display panel 341 may be integrated to implement the input and output functions of the mobile phone 110, and the integrated touch panel 331 and display panel 341 may be referred to as a touchscreen.

In some other embodiments, a pressure sensor may be further disposed on the touch panel 331, so that the touch panel can further detect pressure of a touch operation when the user performs the touch operation on the touch panel. Therefore, the mobile phone 110 can more accurately detect the touch operation.

The mobile phone 110 may further include at least one sensor 350, such as an optical sensor, a motion sensor, and other sensors. Specifically, the optical sensor may include an ambient light sensor and a proximity sensor. An ambient light sensor 351 may adjust luminance of the display panel 341 based on brightness of ambient light. A proximity light sensor 352 is disposed on the front face of the mobile phone 110. When the mobile phone 110 moves to an ear, the mobile phone 110 powers off the display panel 341 based on detection performed by the proximity light sensor 352, so that power consumption of the mobile phone 110 can be further reduced. As one type of motion sensor, an accelerometer sensor may detect values of accelerations in various directions (usually on three axes), may detect a value and a direction of gravity when the mobile phone stays still, and may be applied to an application that recognizes a posture of the mobile phone (for example, switching between landscape orientation and portrait orientation, a related game, and magnetometer posture calibration), a function related to vibration recognition (such as a pedometer and a knock), and the like. For other sensors such as a gyroscope, a barometer, a hygrometer, a thermometer, and an infrared sensor that may be further configured for the mobile phone 110, details are not described herein. A front-facing camera 353 may be disposed on the top of the front face of the mobile phone 110, and a rear-facing camera 354 is disposed on the top of the back face of the mobile phone 110.

The audio circuit 360, a speaker 361, and a microphone 362 may provide audio interfaces between the user and the mobile phone 110. The audio circuit 360 may convert received audio data into an electrical signal and transmit the electrical signal to the speaker 361, and the speaker 361 converts the electrical signal into a sound signal for output. In addition, the microphone 362 converts a collected sound signal into an electrical signal, and the audio circuit 360 receives the electrical signal, converts the electrical signal into audio data, and then outputs the audio data to the RF circuit 310, to send the audio data to, for example, another mobile phone, or outputs the audio data to the memory 320 for further processing.

Wi-Fi belongs to a short-range wireless transmit technology. By using the Wi-Fi module 370, the mobile phone 110 can help the user receive and send emails, browse web pages, access streaming media, and so on, thereby providing wireless broadband Internet access for the user.

The processor 380 is a control center of the mobile phone 110, and is connected to various parts of the entire mobile phone by using various interfaces and lines. By running or executing the software program stored in the memory 320, and invoking the data stored in the memory 320, the processor 380 performs various functions and data processing of the mobile phone 110, to perform overall monitoring on the mobile phone. In some embodiments, the processor 380 may include one or more processing units. The processor 380 may further integrate an application processor and a modem processor. The application processor mainly processes an operating system, a user interface, an application program, and the like. The modem processor mainly processes wireless communication. It may be understood that, alternatively, the modem processor may not be integrated into the processor 380.

A Bluetooth module 381 is configured to exchange information with another device by using a short-range communication protocol such as Bluetooth. For example, the mobile phone 110 may establish, by using the Bluetooth module 381, a Bluetooth connection to a wearable electronic device (for example, a smartwatch) that also has a Bluetooth module, to exchange data.

The mobile phone 110 further includes the power supply 390 (such as a battery) that supplies power to each component. The power supply may be logically connected to the processor 380 by using a power management system, thereby implementing functions such as charging, discharging, and power consumption management by using the power management system. It may be understood that, in the following embodiments, the power supply 390 may be configured to supply power to the display panel 341 and the touch panel 331.

All methods in the following embodiments can be implemented in the mobile phone 110 having the foregoing hardware structure.

Figure 4:
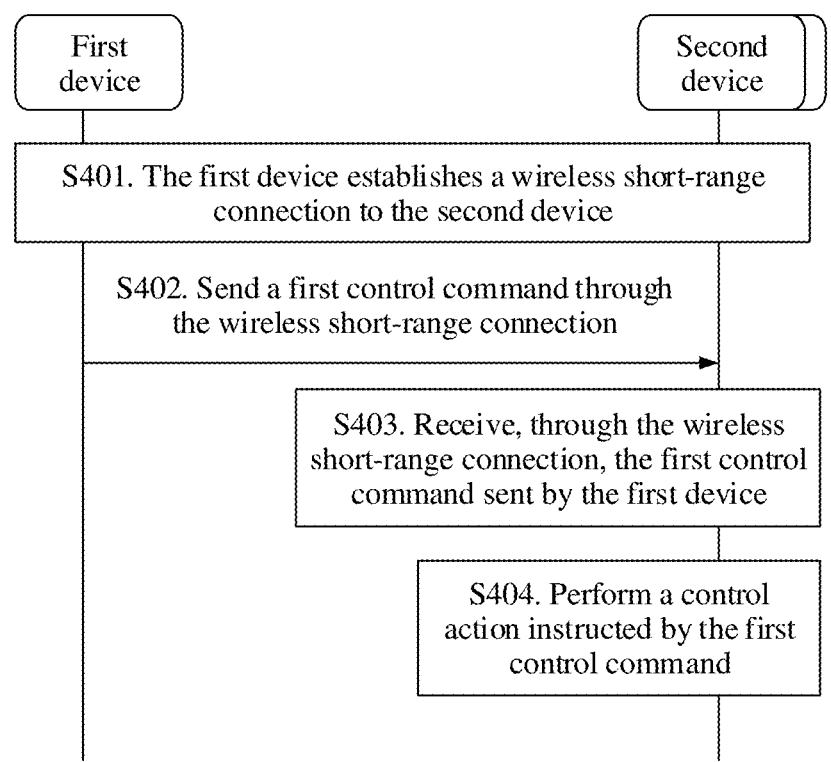
FIG. 4 is a flowchart of a device control method according to an embodiment of the present application.

An embodiment of the present application provides a device control method. As shown in FIG. 4, the device control method includes S401 to S403.

S401. A first device establishes a wireless short-range communication connection to a second device.

The wireless short-range communication connection between the first device and the second device may be any one of a Bluetooth connection, a WiFi connection, an infrared connection, an NFC connection, a zigbee connection, or the like, and the WiFi connection may be a WiFi direct connection. The first device may establish wireless short-range communication connections to one or more second devices. FIG. 1 is used as an example. The mobile phone 110 (namely, the first device) may establish wireless short-range communication connections to a plurality of second devices (the notebook 122, the tablet computer 121, and the Bluetooth band 123). Optionally, the first device may establish different wireless short-range communication connections to a plurality of second devices. For example, the mobile phone 110 establishes a Wifi connection to the notebook 122, and the mobile phone 110 establishes Bluetooth connections to the tablet computer 121 and the Bluetooth band 123. If wireless short-range communication manners established between the first device and the plurality of second devices are different, interaction may be performed by using a wireless short-range communication protocol.

S402. The first device sends a first control command to the second device through the wireless short-range communication connection.

The first control command is used to instruct the second device to perform a control action, and the control action includes enabling a wireless communication capability, disabling a wireless communication capability, powering on, or powering off.

For example, when the control action is enabling a wireless communication capability or disabling a wireless communication capability, in some embodiments, the first control command may instruct the second device to enable or disable all wireless communication capabilities of the second device.

For example, the control action is disabling a wireless communication capability, and the wireless communication capability is a wireless transmit capability. The first control command may be used to instruct the second device to disable all wireless transmit capabilities of the second device, for example, all wireless transmit capabilities such as a radio frequency Tx capability, a WiFi transmit capability, and a Bluetooth transmit capability of the second device; all wireless receive capabilities such as a radio frequency Rx capability, a WiFi receive capability, and a Bluetooth receive capability of the second device are enabled.

For example, when the control action is enabling a wireless communication capability or disabling a wireless communication capability, in other embodiments, the first control command may be used to instruct the second device to enable or disable some wireless communication capabilities of the second device.

For example, the control action is disabling a wireless communication capability, and the wireless communication capability includes a wireless transmit capability and a wireless receive capability. The first control command may be used to instruct the second device to disable a radio frequency Tx capability and a radio frequency Rx capability of the second device, and a WiFi transmit capability, a WiFi receive capability, a Bluetooth transmit capability, and a Bluetooth receive capability of the second device may be enabled.

For example, the control action is disabling a wireless communication capability, and the wireless communication capability includes a wireless transmit capability. The first control command may be used to instruct the second device to disable a radio frequency Tx capability of the second device, and a WiFi transmit capability, a WiFi receive capability, a Bluetooth transmit capability, a Bluetooth receive capability, and a radio frequency Rx capability of the second device may be enabled.

FIG. 1 is used as an example. The mobile phone 110 of a user establishes a wireless short-range communication connection to each of the notebook 122, the tablet computer 121, and the Bluetooth band 123 of the user. When an airplane that the user is taking is about to take off, to reduce electromagnetic interference caused to the airplane by a wireless device carried by the user, the user may trigger the mobile phone 110 to send the foregoing first control command to one or more devices of the notebook 122, the tablet computer 121, and the Bluetooth band 123, so as to instruct the notebook 122, the tablet computer 121, and the Bluetooth band 123 to disable wireless communication capabilities of the notebook 122, the tablet computer 121, and the Bluetooth band 123 or to be powered off.

S403. The second device receives, through the wireless short-range communication connection, the first control command sent by the first device.

S404. The second device performs a control action instructed by the first control command.

According to the device control method provided in this embodiment of the present application, the first device may send a first control command to second devices to instruct the second devices to perform a control action (for example, the control action includes enabling a wireless communication capability, disabling a wireless communication capability, powering on, or powering off). In this way, the user does not need to manually control the second devices to enable a wireless communication capability, disable a wireless communication capability, be powered on, or be powered off. In addition, the first device may simultaneously control a plurality of second devices to perform the control action by using the first control command, without a need of manually controlling the plurality of second devices one by one, so that efficiency of controlling a plurality of wireless devices to perform the control action can be improved. Then, a security risk existing or inconvenience caused to the user because the user forgets a wireless device may be further reduced.

In addition, in this application, the first device may control the second device to perform a corresponding control action through the wireless short-range communication connection to the second device. For example, when the user wants to disable the wireless communication capability of the second device or turn off the second device, the user does not need to find the second device before disabling the wireless communication capability of the second device or turning off the second device. As long as there is a wireless short-range communication connection between the second device and the first device, the first device may control the second device to be powered off or disable the wireless communication capability of the second device.

For example, when the airplane the user is taking is about to take off, the user may directly use a mobile phone of the user to control, through a wireless short-range communication connection between the mobile phone and another wireless device (such as a tablet computer, a Bluetooth band, or a notebook computer) of the user, the another wireless device to be powered off or to disable a wireless communication capability of the another wireless device, without a need of finding these wireless devices one by one and then controlling the wireless devices to be powered off or to disable wireless communication capabilities of these wireless devices one by one.

Further, the first device may send the first control command to the second device in different cases. For example, in response to a power off operation of the user, the first device may send a first control command to the second device before the power-off. Alternatively, in response to an operation of disabling a wireless communication capability of the first device by the user, the first device may send a first control command to the second device before disabling the wireless communication capability of the first device. Alternatively, the first device may further send a first control command to the second device in response to a related operation performed by the user on a first application (the first application is used to control a plurality of devices that have wireless short-range communication connections to the first device).

Figure 5:
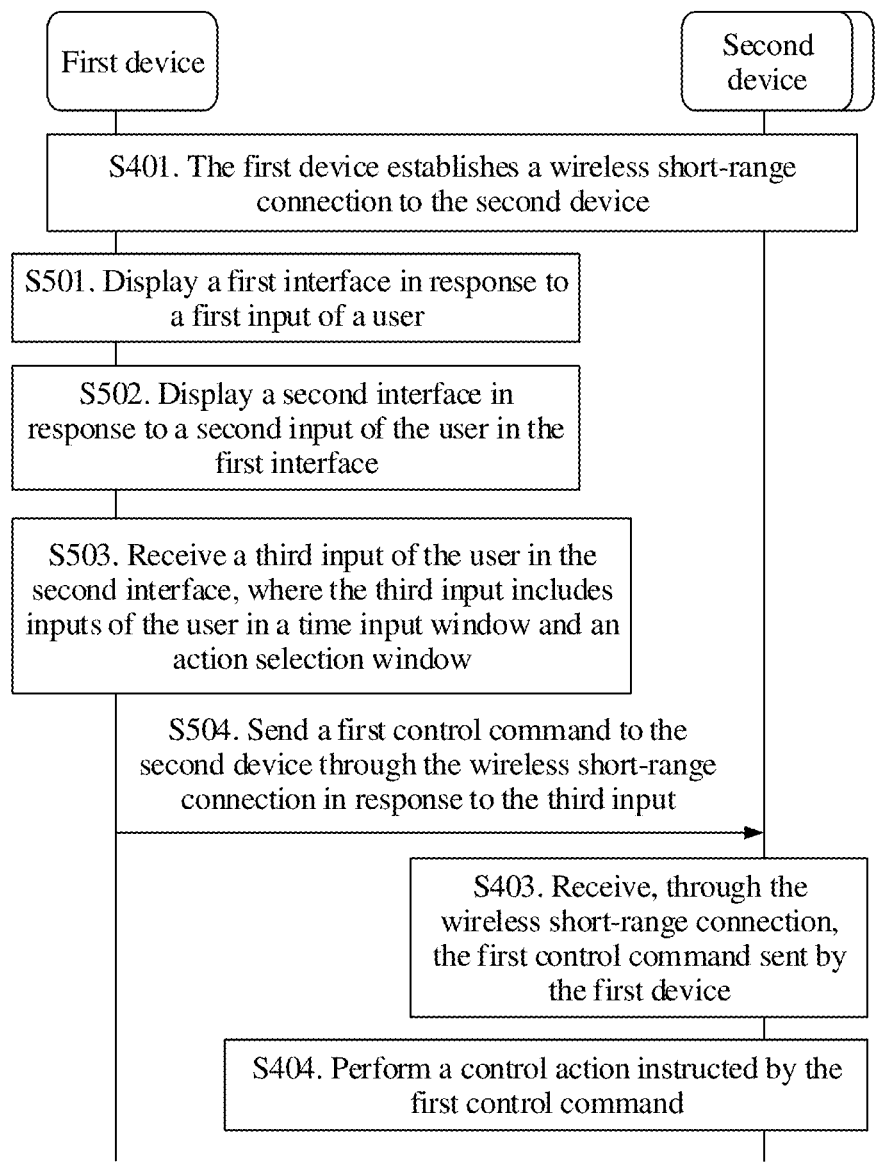
FIG. 5 is a flowchart of a device control method according to an embodiment of the present application.

Specifically, as shown in FIG. 5, before S402 shown in FIG. 4, the method in this embodiment of the present application may further include S501 to S504.

S501. The first device displays a first interface in response to a first input of a user.

In a first application scenario, the first input is a start instruction of a first application, and the first interface is a display interface of the first application.

For example, the first device is the mobile phone 110 shown in FIG. 1. The first application may be an application program that is in the mobile phone 110 and that is used to control another wireless device that has a wireless short-range communication connection to the mobile phone 110.

Figure 6A:
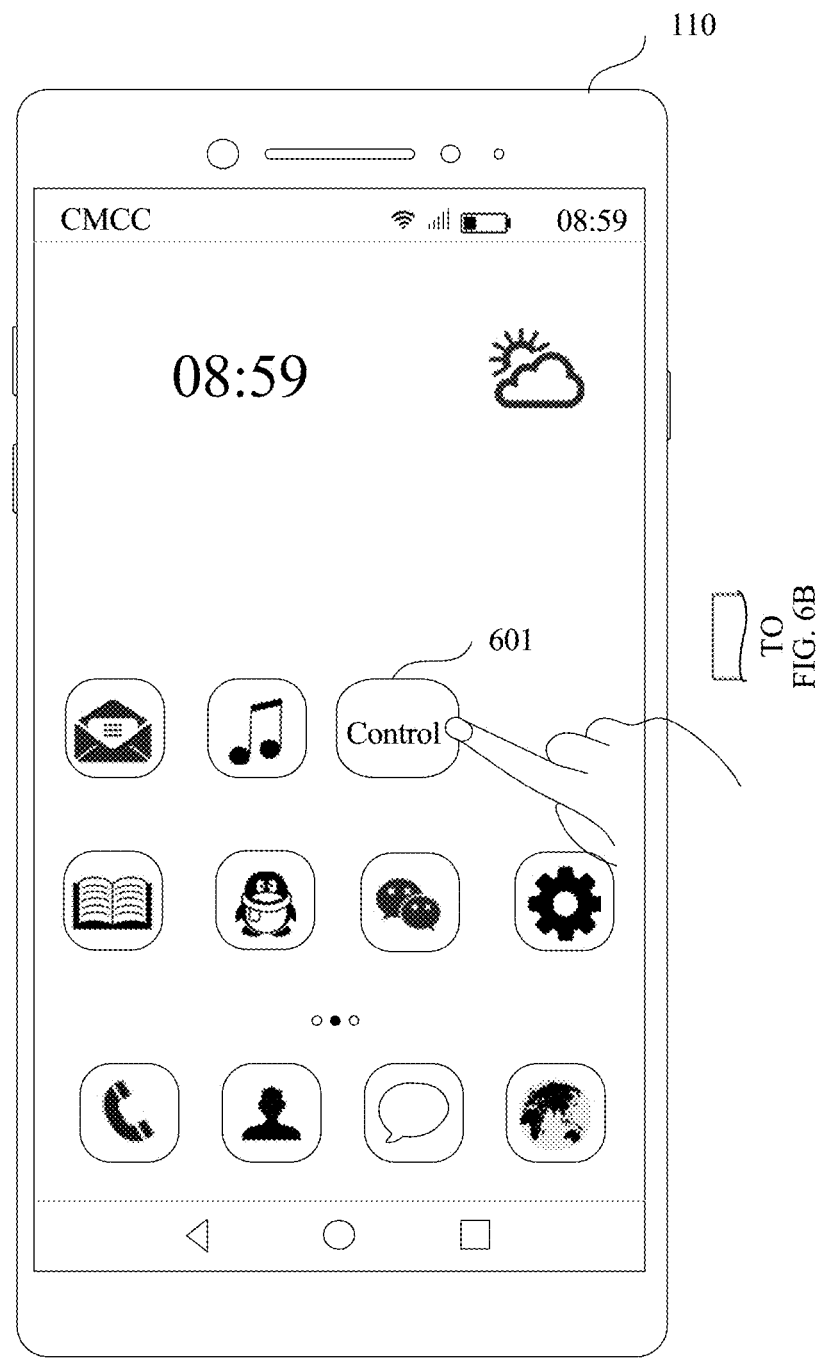
FIG. 6A and FIG. 6B are a schematic diagram of a mobile phone display interface instance according to an embodiment of the present application.

For example, the first application may be an application program corresponding to a "Wireless device control" icon 601 shown in FIG. 6A. When the user taps the "Wireless device control" icon 601 shown in FIG. 6A by using a finger, the mobile phone 110 may display a "Wireless device control interface" 602 shown in FIG. 6B, namely, the first interface.

Alternatively, the first application may be a system application in the mobile phone 110. For example, when the user taps a "Settings" icon 701 shown in FIG. 7A by using a finger, the mobile phone 110 may display a "Settings interface" 702 shown in FIG. 7B. The "Settings interface" 702 shown in FIG. 7B may include an "Airplane mode" option, a "Wireless local area network (WLAN)" option, a "Bluetooth" option, a "Mobile network" option, and a "Wireless device control" option 703. When the user taps a "Wireless device control" icon 703 shown in FIG. 6B by using a finger, the mobile phone 110 may display a "Wireless device control interface" 602 shown in FIG. 7C, namely, the first interface.

Figure 6B:
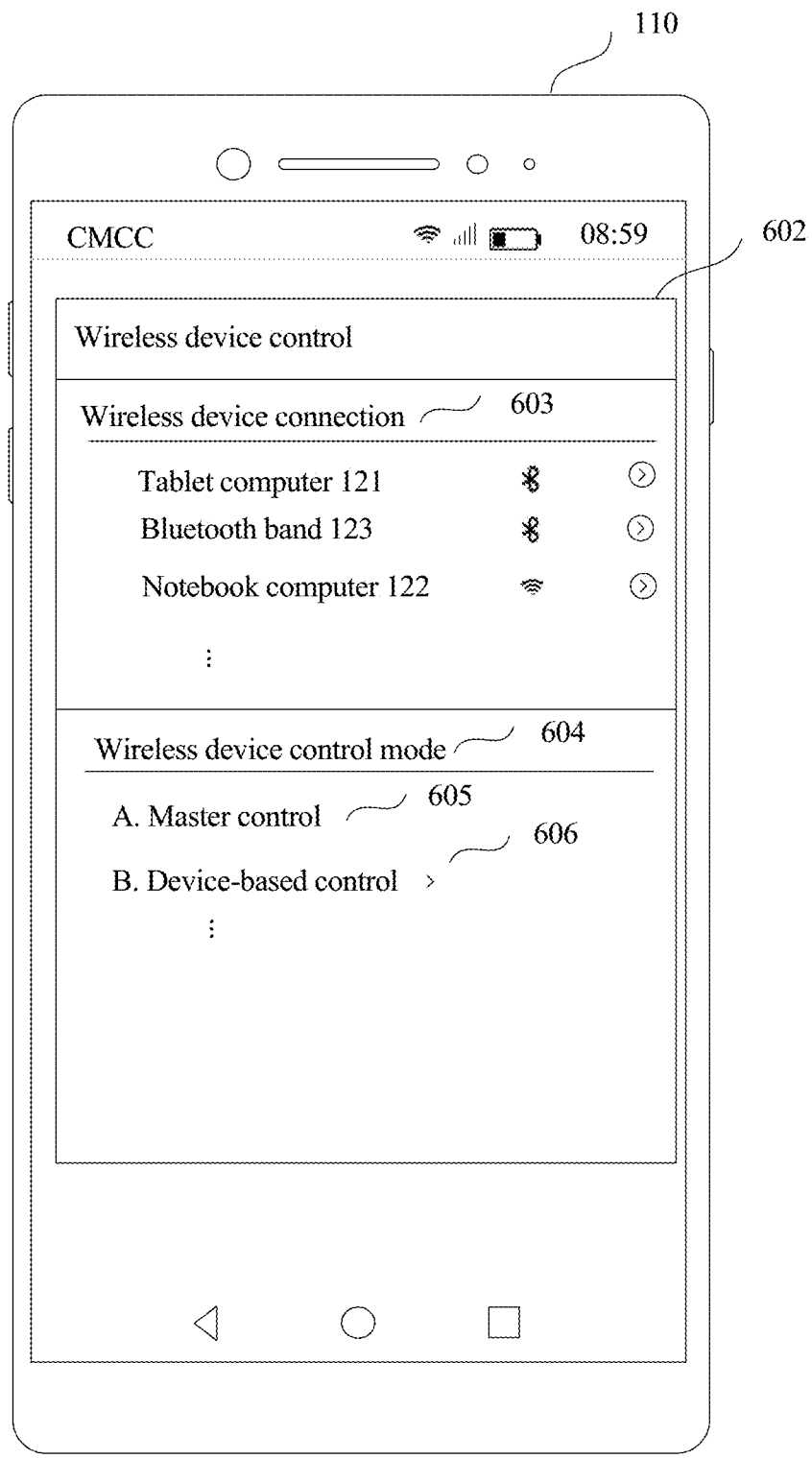
Figure 7A:
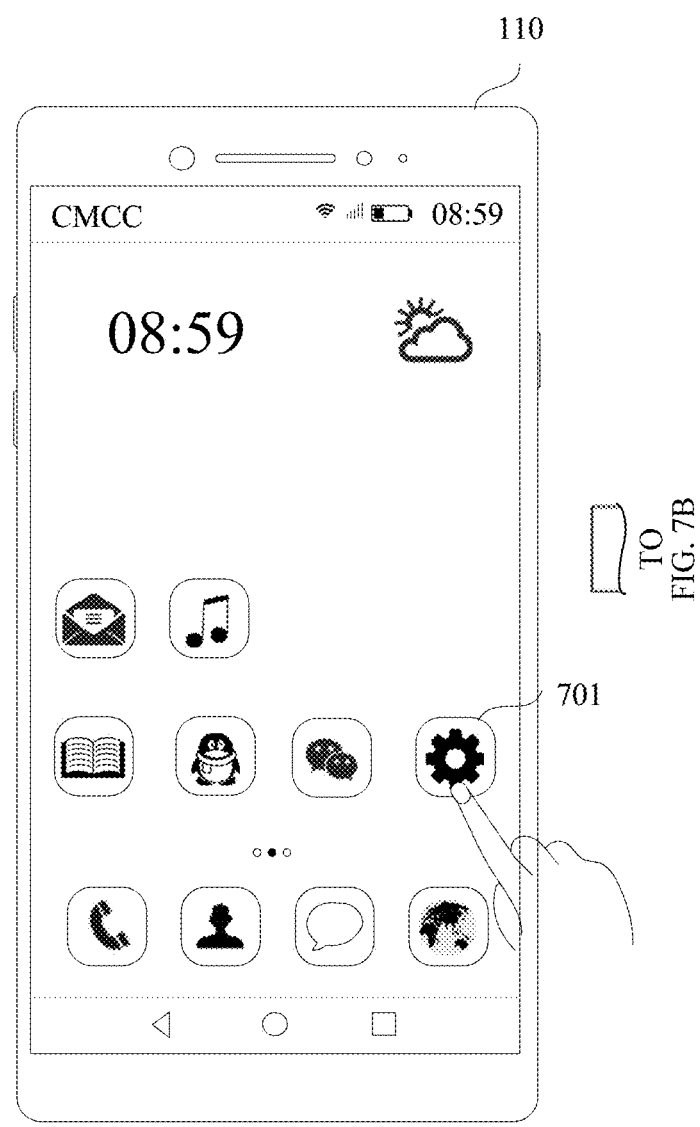
FIG. 7A, FIG. 7B, and FIG. 7C are a schematic diagram of a mobile phone display interface instance according to an embodiment of the present application.
Figure 7B:
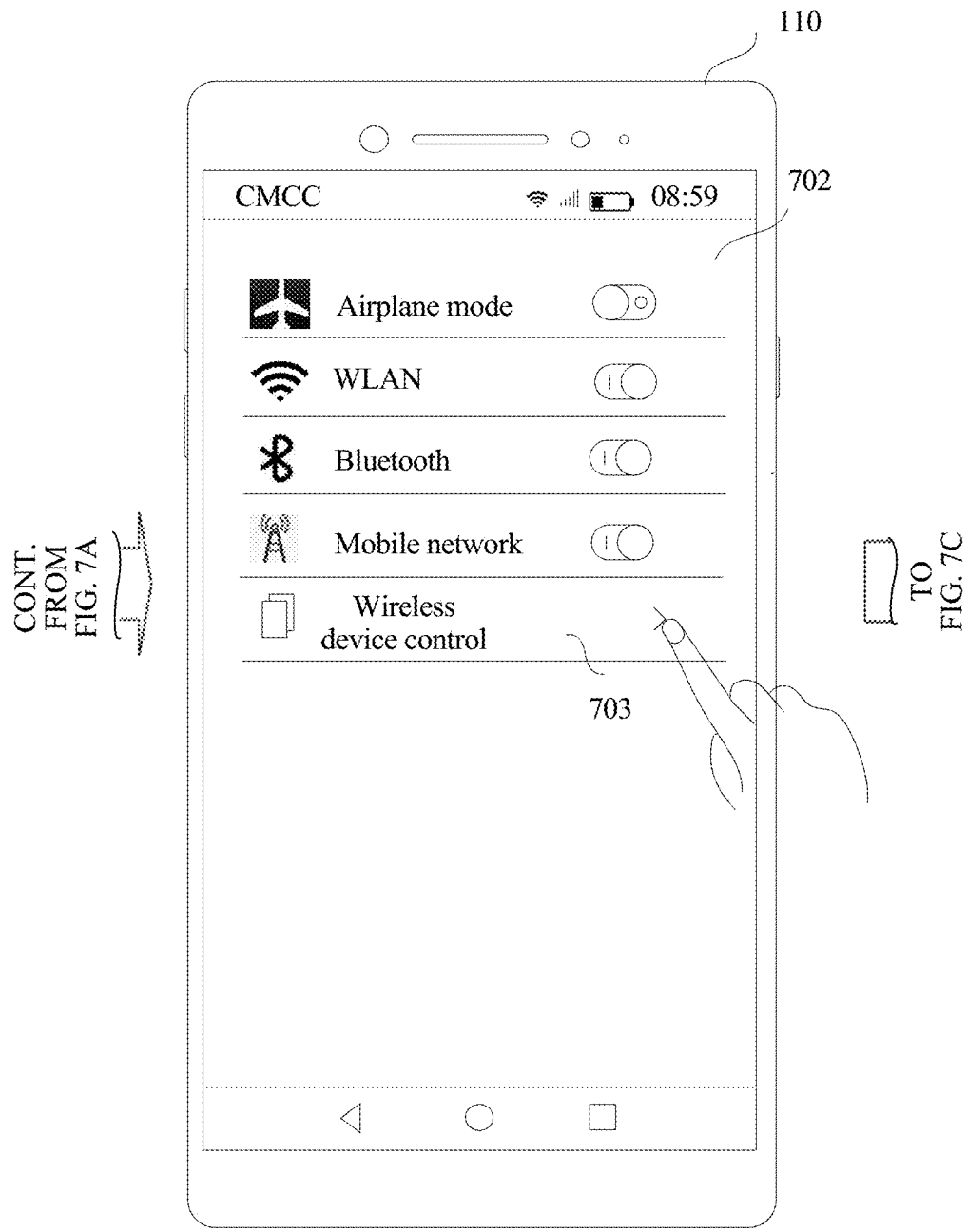
Figure 7C:
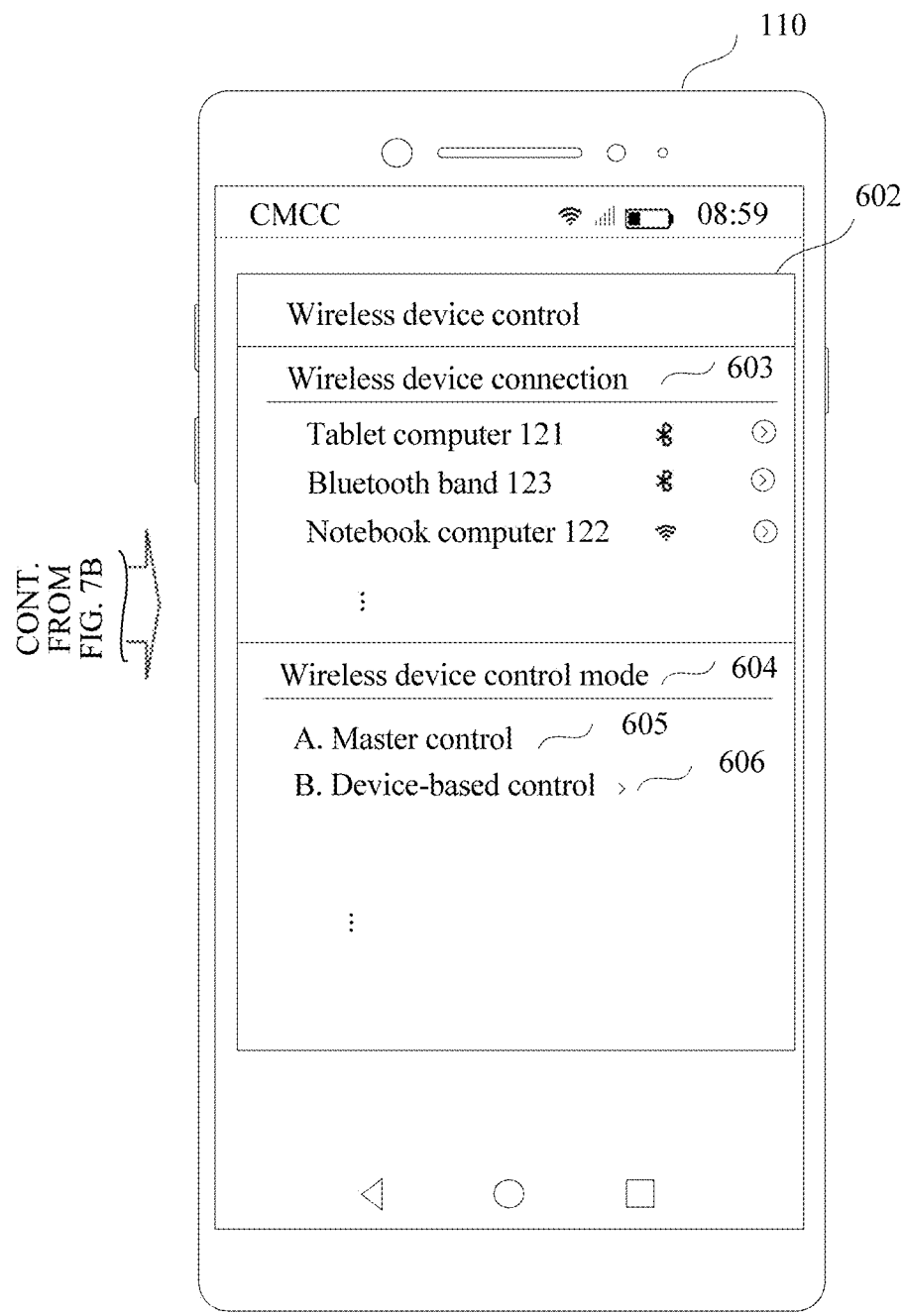

The "Wireless device control interface" 602 shown in FIG. 6B or FIG. 7C may include a "Wireless device connections" option 603 and a "Wireless device control modes" option 604.

As shown in FIG. 6B or FIG. 7C, in the "Wireless device connections" option 603, an identifier of a wireless device that has a wireless short-range communication connection (such as a WiFi connection and a Bluetooth connection) to the mobile phone 110 and a connection manner (such as a WiFi connection and a Bluetooth connection) of the wireless device are shown. Devices that have wireless short-range communication connections (such as a WiFi connection and a Bluetooth connection) to the mobile phone 110 and wireless short-range communication connection manners in which these wireless devices are connected to the mobile phone 110 may be specifically determined by using the "Wireless device connections" option 603. As shown in FIG. 6B or FIG. 7C, the following may be determined by using the "Wireless device connections" option 603: Wireless devices that have wireless short-range communication connections to the mobile phone 110 include a notebook computer 122, a tablet computer 121, and a Bluetooth band 123, the tablet computer 121 and the Bluetooth band 123 establish wireless short-range communication connections to the mobile phone 110 through Bluetooth, and the notebook computer 122 establishes a wireless short-range communication connection to the mobile phone 110 through a WiFi connection.

As shown in FIG. 6B or FIG. 7C, the "Wireless device control mode" option 604 shows control modes in which the mobile phone 110 controls wireless devices that have wireless short-range communication connections to the mobile phone 110. The control modes include a "Master control" mode 605 and a "Device-based control" mode 606. The "Master control" mode 605 means that the mobile phone 110 controls all wireless devices (such as the notebook computer 122, the tablet computer 121, and the Bluetooth band 123) that have wireless short-range communication connections to the mobile phone 110 to be powered off or to disable wireless communication capabilities of the wireless devices. The "Device-based control" mode 606 means that the mobile phone 110 controls, based on a selection of the user, some wireless devices (such as the notebook computer 122 and the tablet computer 121) that have wireless short-range communication connections to the mobile phone 110 to be powered off or to disable wireless communication capabilities of the wireless devices.

Figure 8:
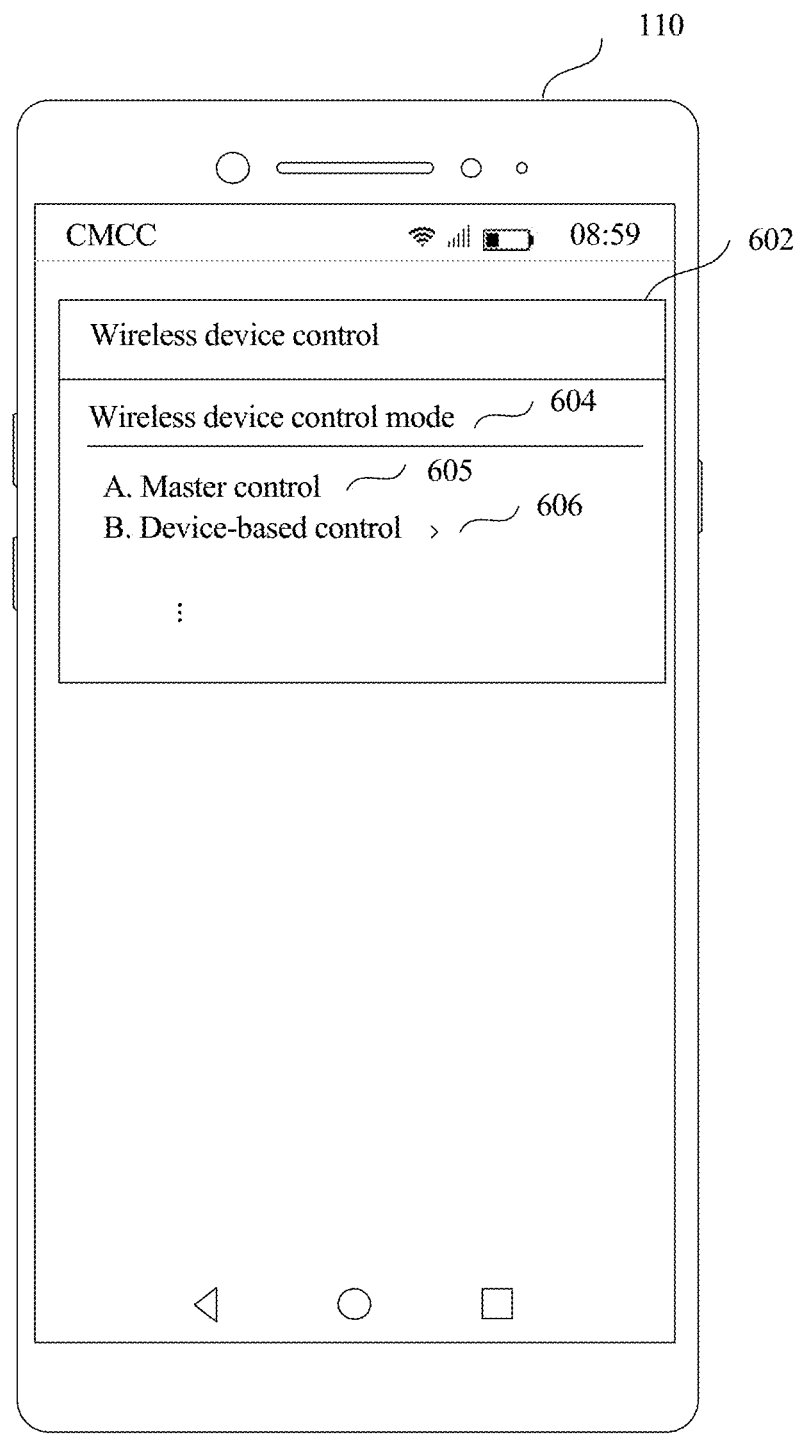
FIG. 8 is a schematic diagram of a mobile phone display interface instance according to an embodiment of the present application.

It should be noted that, in this embodiment of the present application, the first interface displayed by the first device includes but is not limited to the "Wireless device control interface" 602 shown in FIG. 6B or FIG. 7C. For example, the "Wireless device connections" option 603 in the "Wireless device control interface" 602 shown in FIG. 6B or FIG. 7C is optional. A "Wireless device control interface" 602 shown in FIG. 8 may not include a "Wireless device connections" option 603, but include only a "Wireless device control modes" option 604. In addition, an interface display manner of the "Wireless device control modes" option 604 includes but is not limited to an interface display manner shown in FIG. 6B or FIG. 7C.

S502. The first device displays a second interface in response to a second input of the user in the first interface.

The second input is used to determine a device that needs to receive a first control command, the second interface includes a time window and a selection window, the time window is used to enter the foregoing time information, and the selection window is used to enter an action that the first control command instructs the foregoing second device to perform.

The "Wireless device control interface" 602 shown in FIG. 6B or FIG. 7C is used as an example. When the user chooses to control, in a "Master control" mode, a plurality of wireless devices connected to the mobile phone 110, to be specific, when the user taps a "Master control" mode 605 shown in FIG. 9A by using a finger, the mobile phone 110 may display a "Wireless device control interface" 901 shown in FIG. 9B. The "Wireless device control interface" 901 shown in FIG. 9B includes a "time window" 902 and a "selection window" 904.

The "time window" 902 is used to enter the time information. A format of the time information may be \*\*year\*\*month\*\*day\*\*hour\*\*minute\*\*second. Alternatively, a format of the time information may be \*\*:\*\*:\*\*. In this case, the time information is considered as time of that day by the mobile phone 110 by default.

For example, the time information may be entered by the user in the "time window" 902. For a method for entering time information in the "time window" 902 by the user, refer to detailed descriptions in the prior art. Details are not described herein in this embodiment of the present application.

Figure 9A:
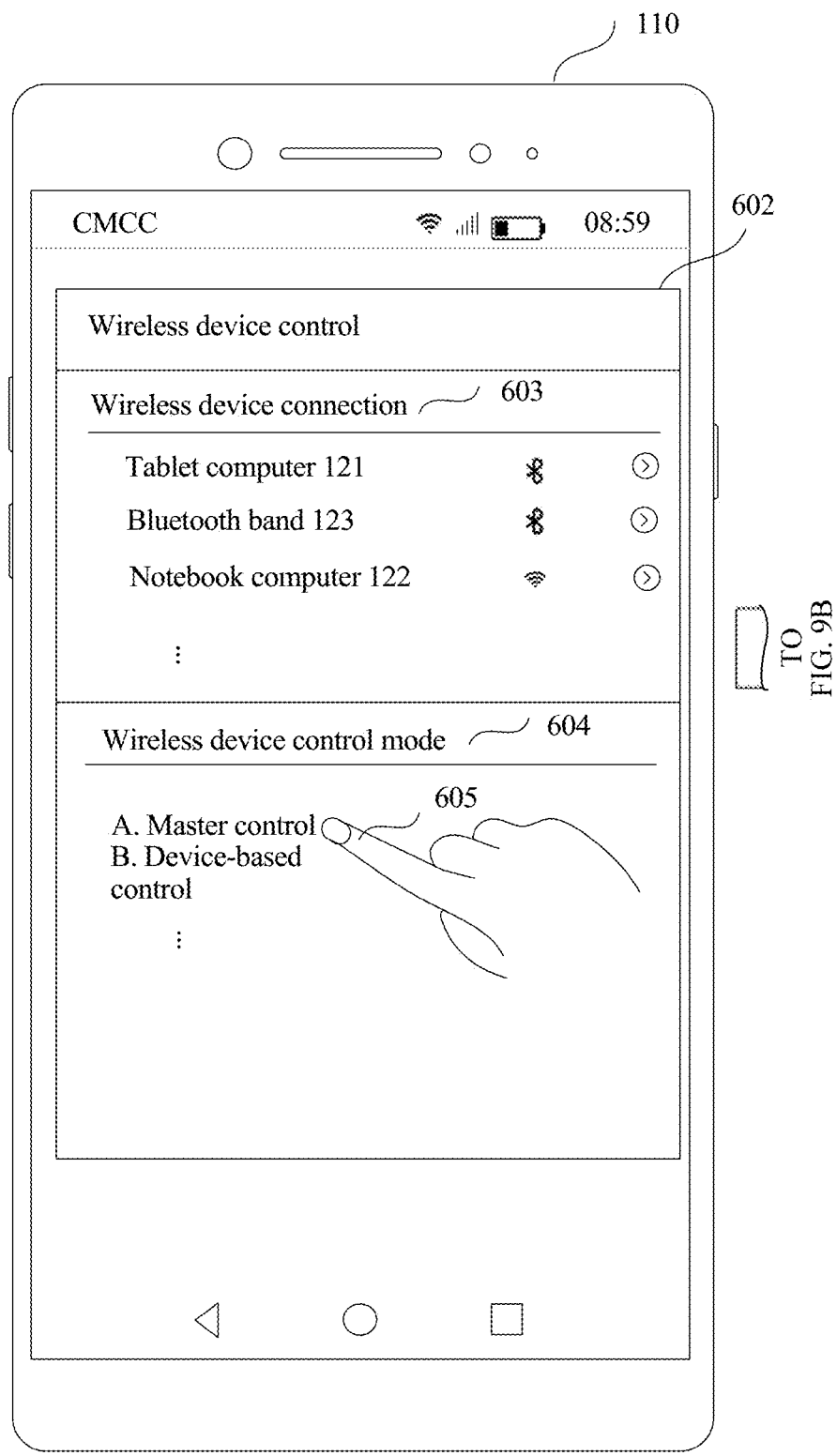
FIG. 9A, FIG. 9B, and FIG. 9C are a schematic diagram of a mobile phone display interface instance according to an embodiment of the present application.
Figure 9B:
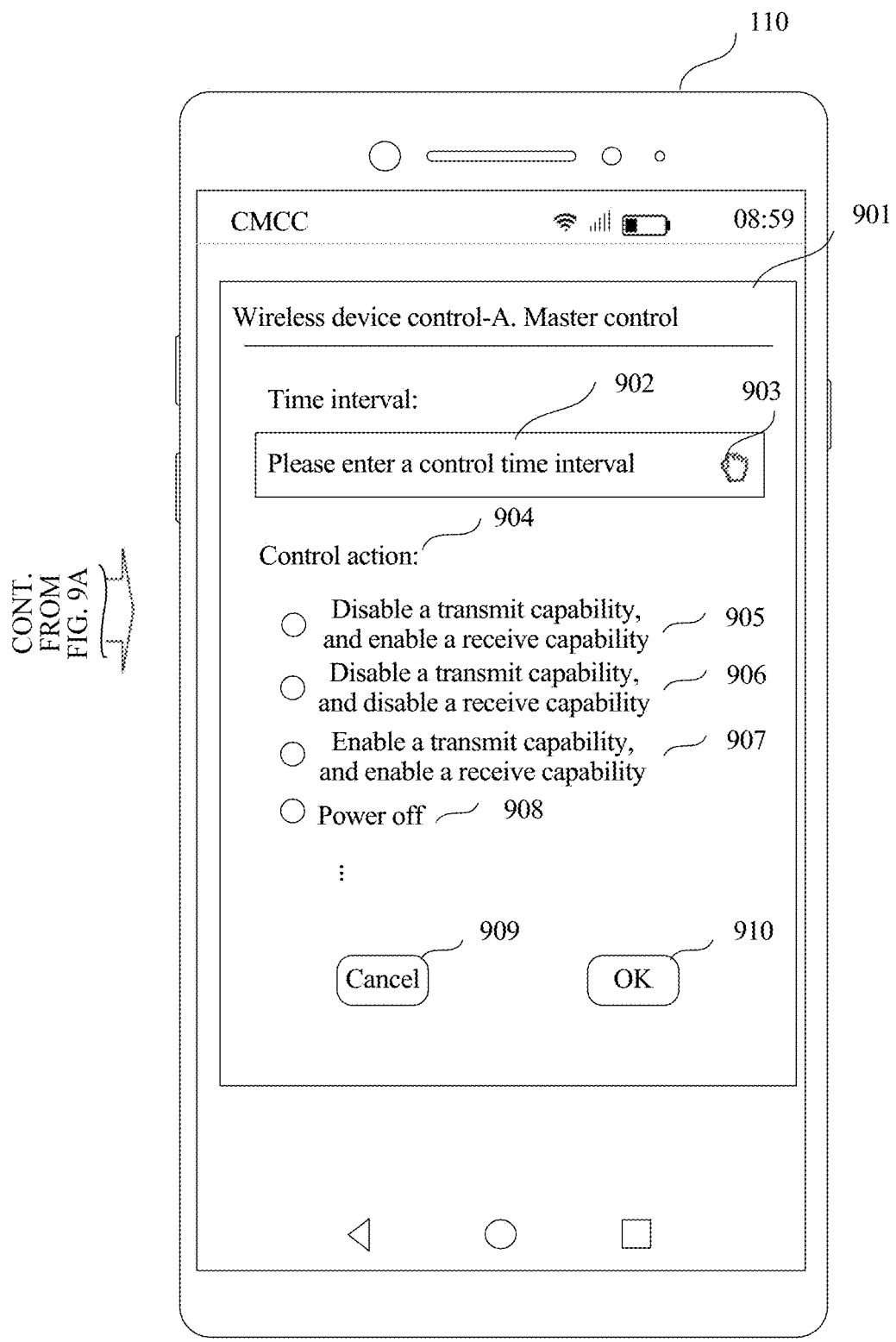

Optionally, when the user taps a "time obtaining button" 903 shown in FIG. 9B by using a finger, the mobile phone 110 may read time information from information such as an electronic ticket stored in the mobile phone 110 and a schedule in a calendar of the mobile phone 110, and display the time information in the "time window" 902.

It should be noted that the first device may establish wireless connections to a plurality of second devices in different wireless short-range communication connection manners. For example, as shown in FIG. 7C, a wireless short-range communication connection between the mobile phone 110 and the tablet computer 121 is a Bluetooth connection, a wireless short-range communication connection between the mobile phone 110 and the Bluetooth band 123 is a Bluetooth connection, and a wireless short-range communication connection between the mobile phone 110 and the notebook computer 122 is a WiFi connection.

Certainly, the first device may alternatively establish wireless connections to a plurality of second devices in a same wireless short-range communication connection manner. For example, a wireless short-range communication connection between the mobile phone 110 and the tablet computer 121, a wireless short-range communication connection between the mobile phone 110 and the Bluetooth band 123, and a wireless short-range communication connection between the mobile phone 110 and the notebook computer 122 may be all WiFi connections.

Figure 9C:
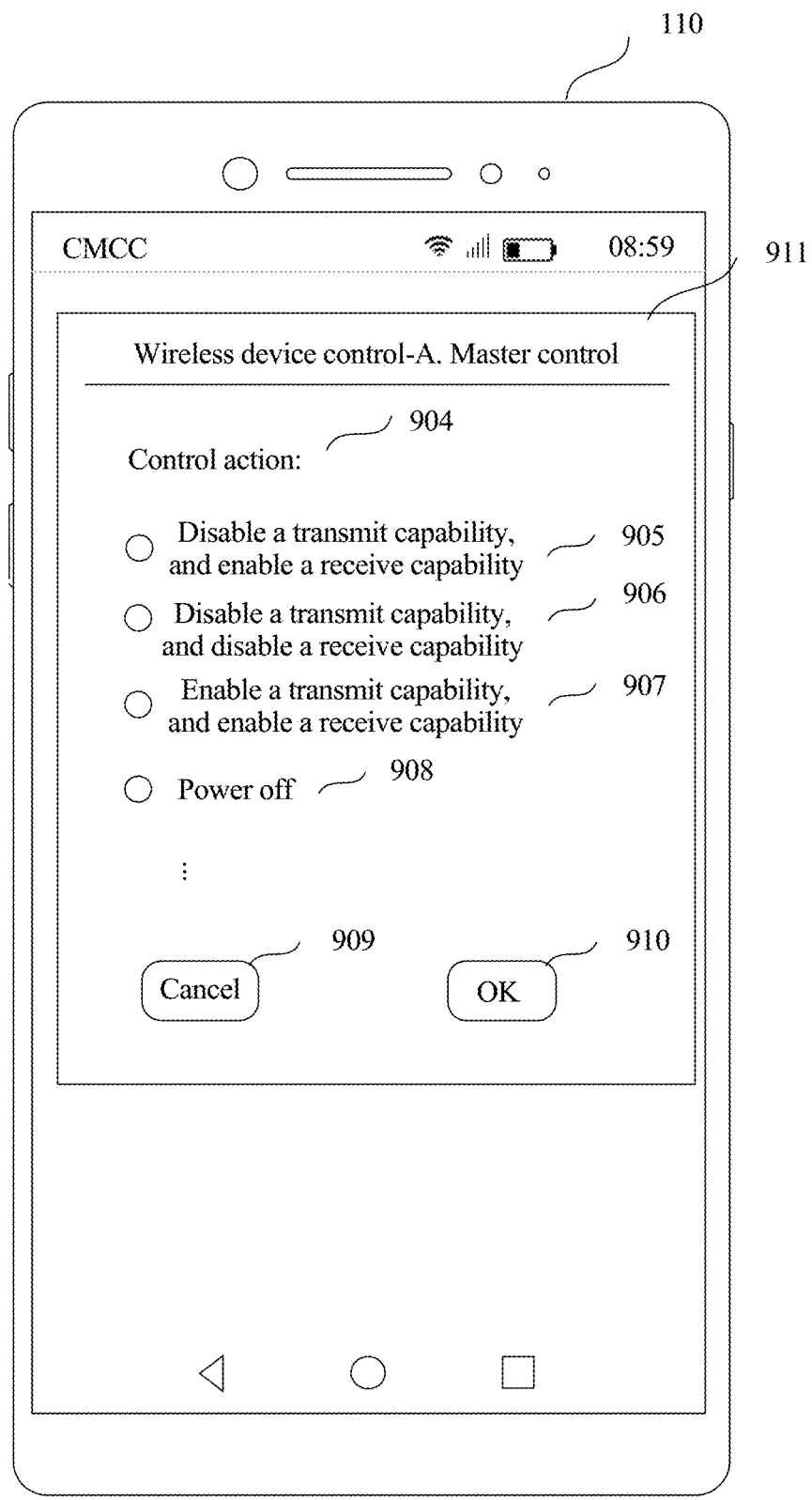

Optionally, the second interface may not include a time window, but includes only a selection window. In other words, the "time window" 902 in the "Wireless device control interface" 901 shown in FIG. 9B is optional. For example, the "Wireless device control interface" 911 shown in FIG. 9C includes only a "selection window" 904, and does not include a time window.

Optionally, the "selection window" or the "time window" and the "selection window" may be directly included in the first interface, and the second interface including the "selection window" or the "time window" and the "selection window" does not need to be displayed in response to the second input of the user in the first interface.

Figure 10A:
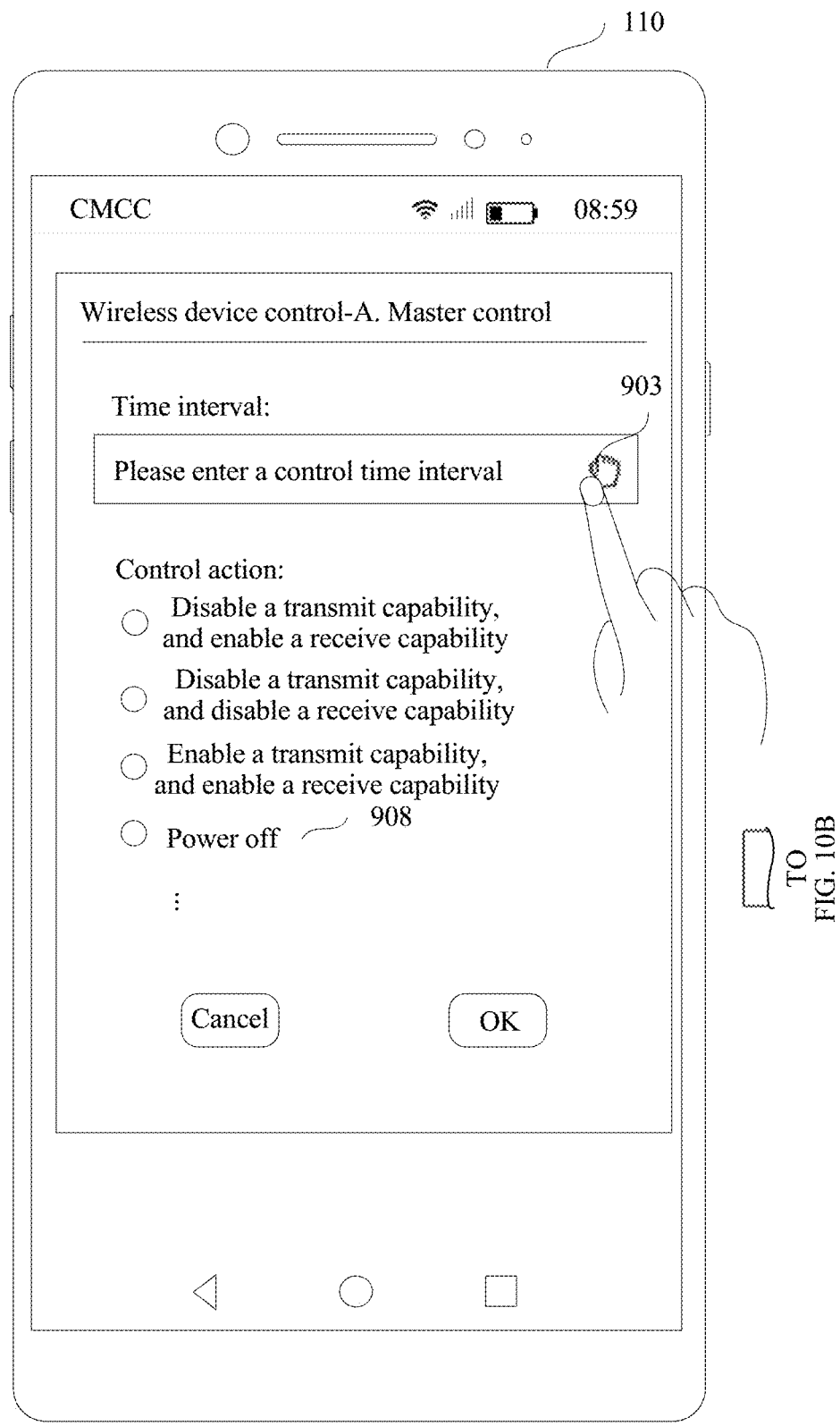
FIG. 10A, FIG. 10B, and FIG. 10C are a schematic diagram of a mobile phone display interface instance according to an embodiment of the present application.
Figure 10B:
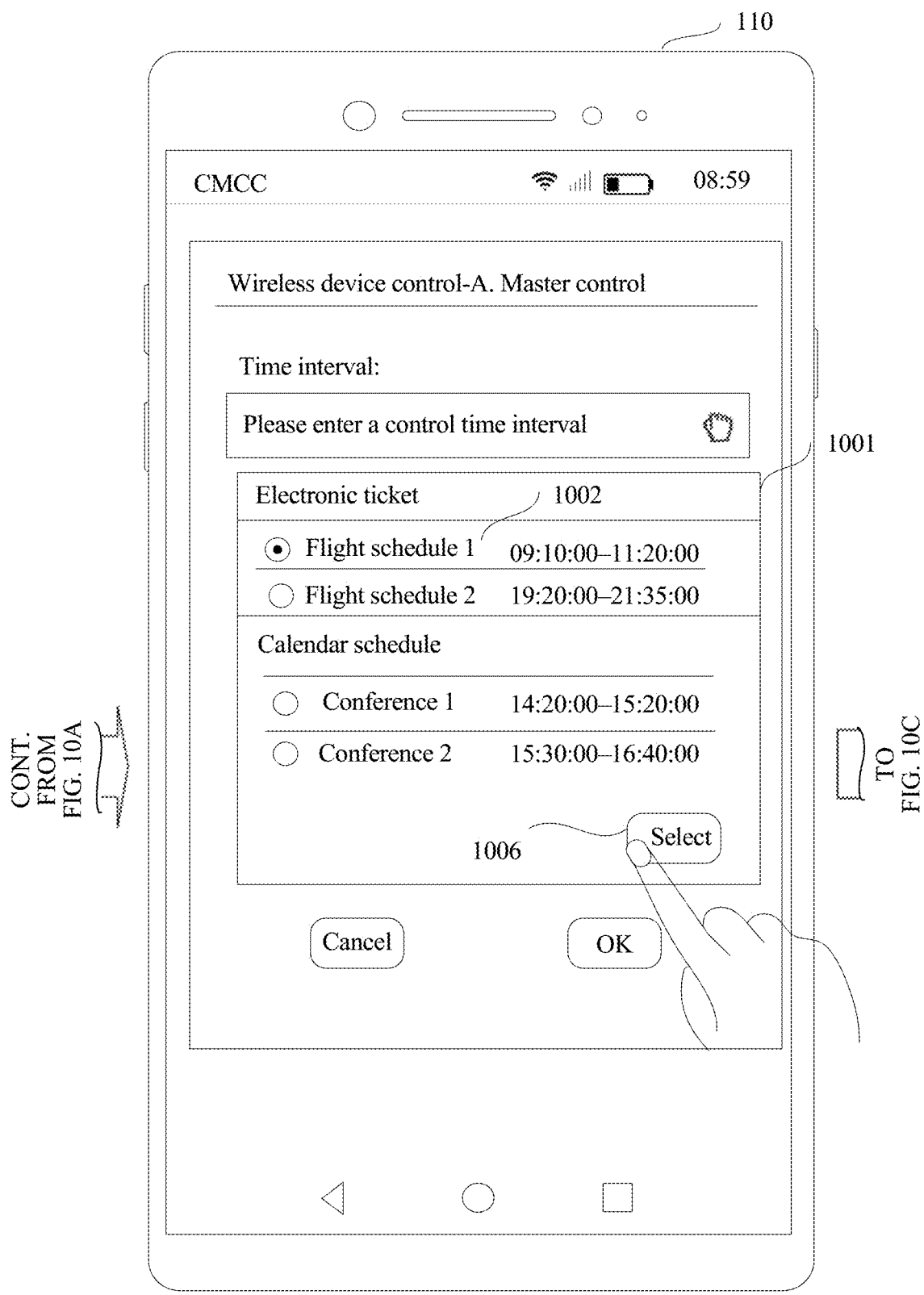
Figure 10C:
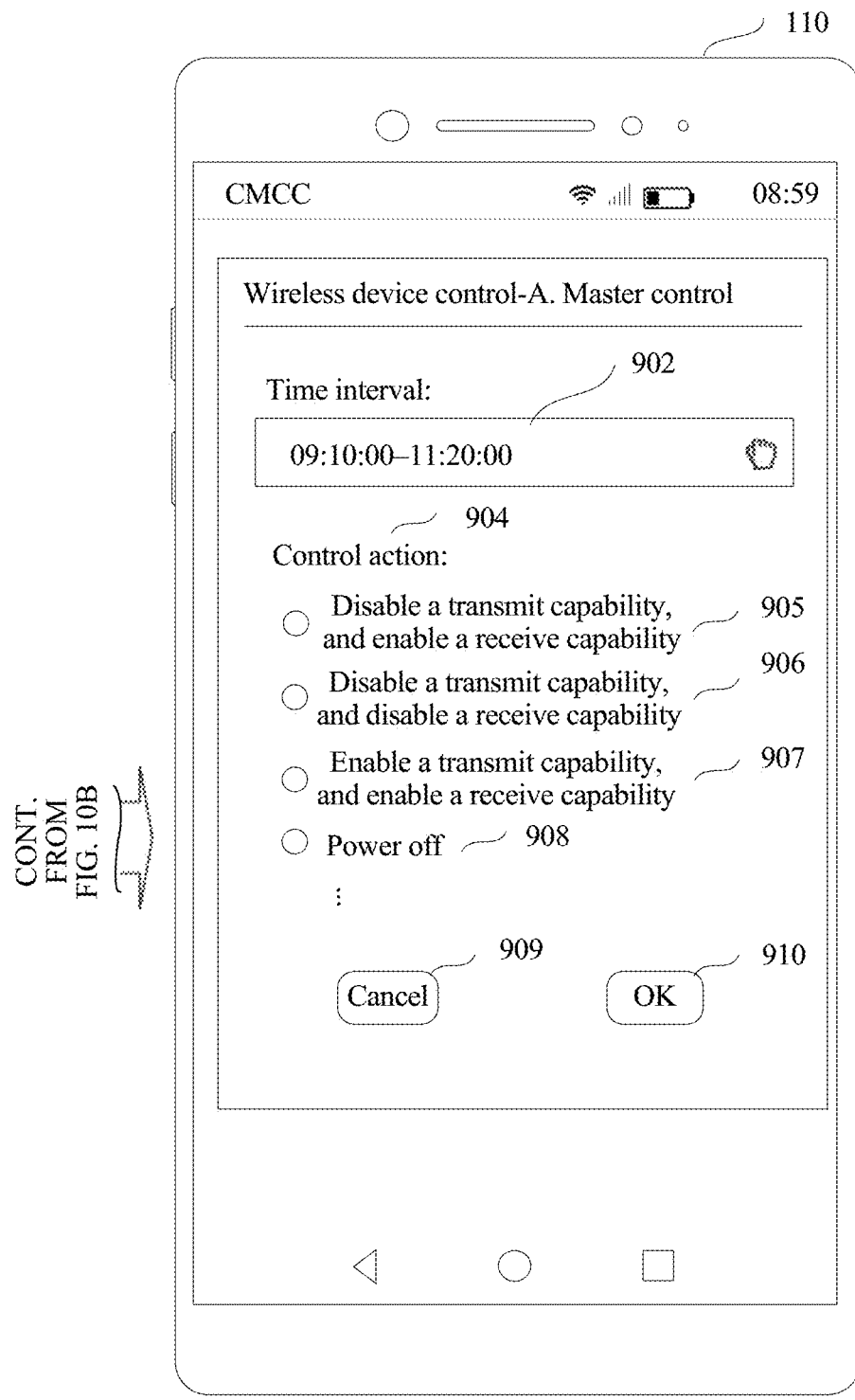

For example, as shown in FIG. 10A, FIG. 10B, and FIG. 10C, when the user taps a "time obtaining button" 903 shown in FIG. 10A by using a finger, the mobile phone 110 may display a "time obtaining interface" 1001 shown in FIG. 10B. The "time obtaining interface" 1001 may include a flight time interval 09:10:00-11:20:00 of a flight schedule 1 and a flight time interval 19:20:00-21:35:00 of a flight schedule 2 in electronic tickets of the mobile phone 110, and a time interval 14:20:00-15:20:00 of a conference 1 and a time interval 15:30:00-16:40:00 of a conference 2 in schedules of the electronic calendar. The user may select any time interval from the four time intervals as effective time interval of the first control command. For example, it is assumed that the user selects a "Flight schedule 1" 1002 shown in FIG. 10B. When the user taps a "Select" button 1006 shown in FIG. 10B by using a finger, the mobile phone 110 may display a terminal interface shown in FIG. 10C. On the terminal interface shown in FIG. 10C, the time interval 09:10:00-11:20:00 of the "Flight schedule 1" 1002 is displayed in a "time window" 902. It may be understood that an event (flight schedule or conference) displayed on the "time obtaining interface" 1001 shown in FIG. 10B may be a schedule of the user on that day.

Figure 11A:
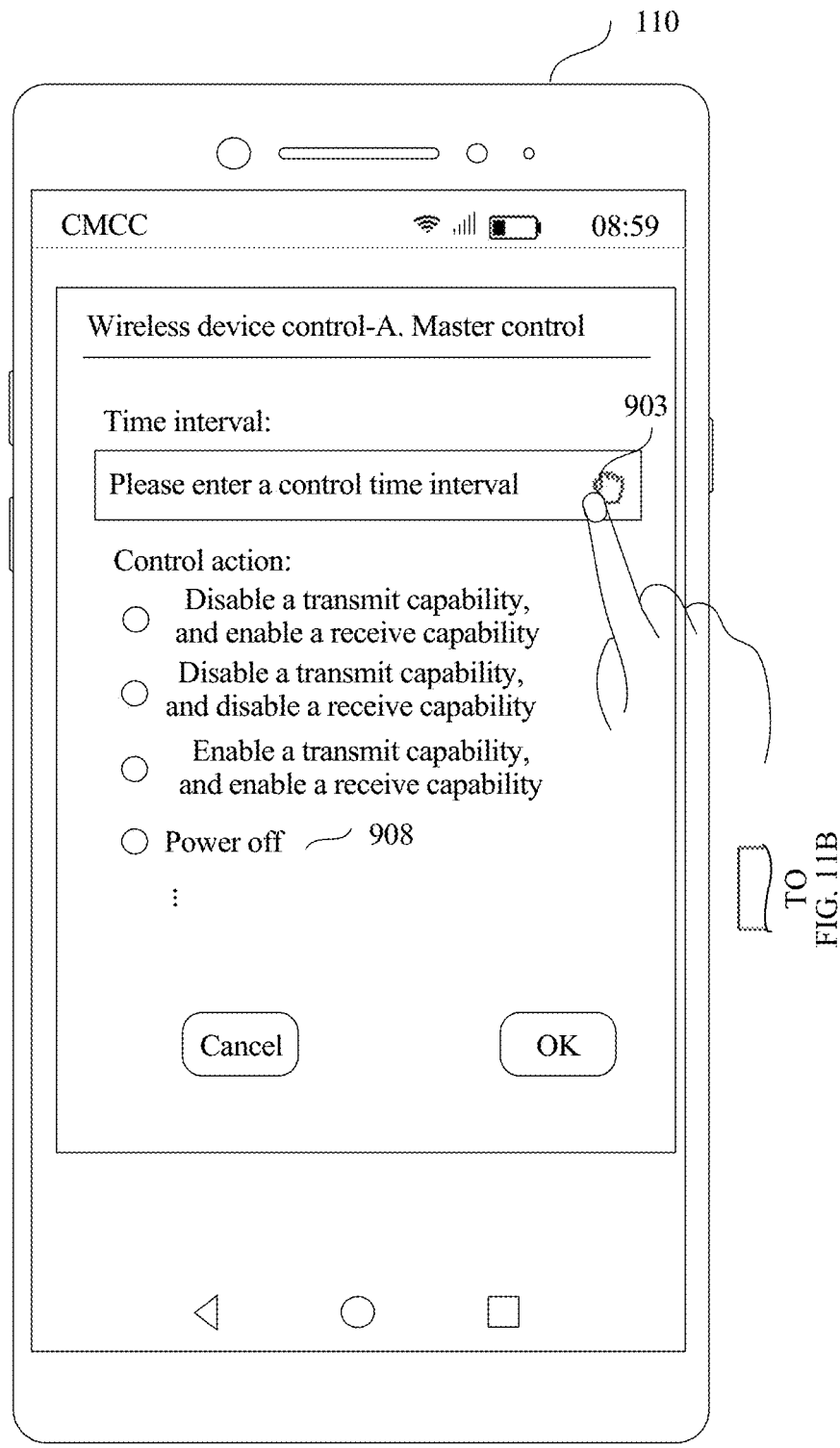
FIG. 11A and FIG. 11B are a schematic diagram of a mobile phone display interface instance according to an embodiment of the present application.

Optionally, in some embodiments, the mobile phone 110 may automatically obtain a time interval of an event closest to that of a current event from an electronic ticket or a schedule in an electronic calendar, and display the time interval in the "time window" 902. For example, it is assumed that current time is 08:59:00. Electronic tickets of the mobile phone 110 include a flight time interval 09:10:00-11:20:00 of a flight schedule 1 and a flight time interval 19:20:00-21:35:00 of a flight schedule 2, and schedules of the electronic calendar include a time interval 14:20:00-15:20:00 of a conference 1 and a time interval 15:30:00-16:40:00 of a conference 2. The time interval 09:10:00-11:20:00 of the "Flight schedule 1" is closest to the current time 08:59:00. Therefore, when the user taps a "time obtaining button" 903 shown in FIG. 11A by using a finger, the mobile phone 110 may display a terminal interface shown in FIG. 11B. On the terminal interface shown in FIG. 11B, the time interval 09:10:00-11:20:00 of the "Flight schedule 1" is displayed in a "time window" 902.

Figure 11B:
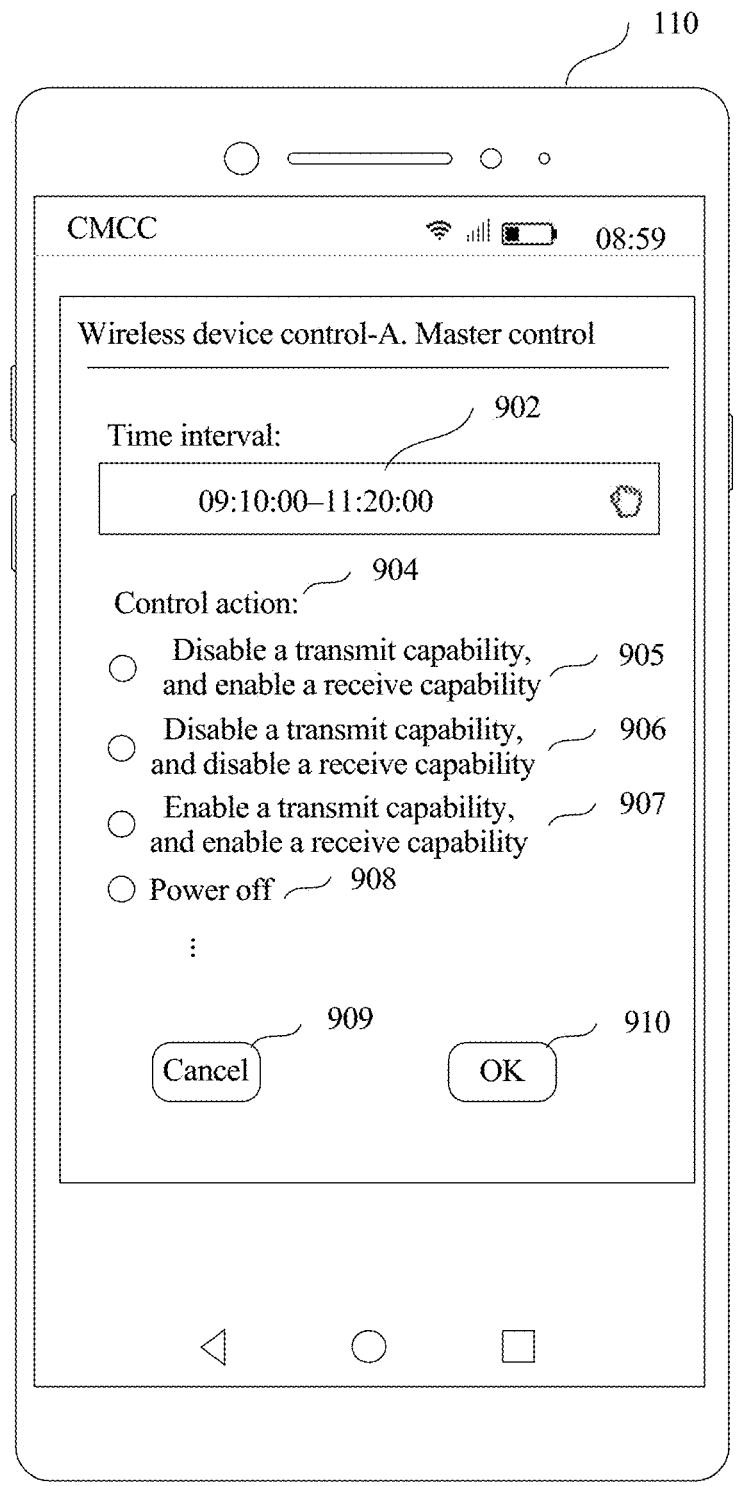

The "selection window" 904 shown in FIG. 9B, FIG. 10C, or FIG. 11B may include a "Disable a transmit capability, and enable a receive capability" option 905, a "Disable a transmit capability, and disable a receive capability" option 906, an "Enable a transmit capability, and enable a receive capability" option 907, and a "Power off" option 908.

For example, when the user selects the "Disable a transmit capability, and enable a receive capability" option 905, a control action that the first control command sent by the mobile phone 110 instructs the second device to perform is disabling a wireless transmit capability. In this case, the first control command may carry first indication information, and the first indication information is used to instruct the second device to disable the wireless transmit capability of the second device. When the user selects the "Disable a transmit capability, and disable a receive capability" option 906, control actions that the first control command sent by the mobile phone 110 instructs the second device to perform are disabling a wireless transmit capability and a wireless receive capability. In this case, the first control command may carry second indication information, and the second indication information is used to instruct the second device to disable the wireless transmit capability and the wireless receive capability of the second device. When the user selects the "Power off" option 908, a control action that the first control command sent by the mobile phone 110 instructs the second device to perform is powering off. In this case, the first control command may carry third indication information, and the third indication information is used to instruct at least one second device to be powered off. When the user selects the "Enable a transmit capability, and enable a receive capability" option 907, a control action that the first control command sent by the mobile phone 110 instructs the second device to perform is enabling a wireless transmit capability. In this case, the first control command carries fourth indication information, and the fourth indication information is used to instruct the second device to enable the wireless transmit capability of the second device.

S503. The first device receives a third input of the user in the second interface, where the third input includes inputs of the user in a time window and a selection window.

Figure 12A:
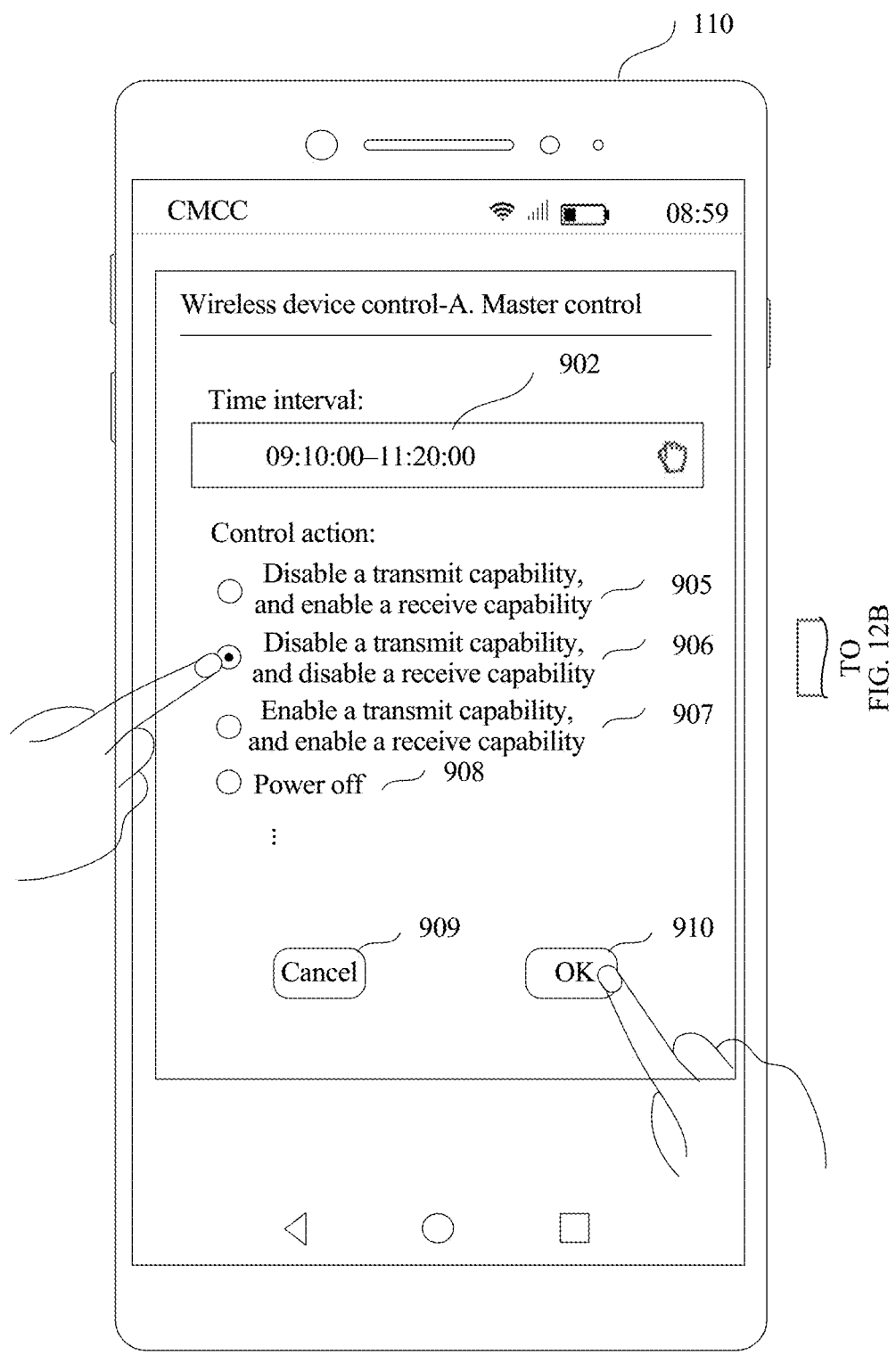
FIG. 12A and FIG. 12B are a schematic diagram of a mobile phone display interface instance according to an embodiment of the present application.

For example, the third input may be time information entered by the user in the time window. For example, a time interval 09:10:00-11:20:00 of a "Flight schedule 1" is displayed in a "time window" 902 shown in FIG. 12A, and selecting a "Disable a transmit capability, and disable a receive capability" option 906 by the user is shown in FIG. 12A.

When the second interface does not include the time window, the third input does not include the input of the user in the selection window, either.

Correspondingly, S402 may be replaced with S504. For example, as shown in FIG. 5, S402 shown in FIG. 4 may be replaced with S504:

S504. The first device sends a first control command to the second device through the wireless short-range communication connection in response to the third input.

Figure 12B:
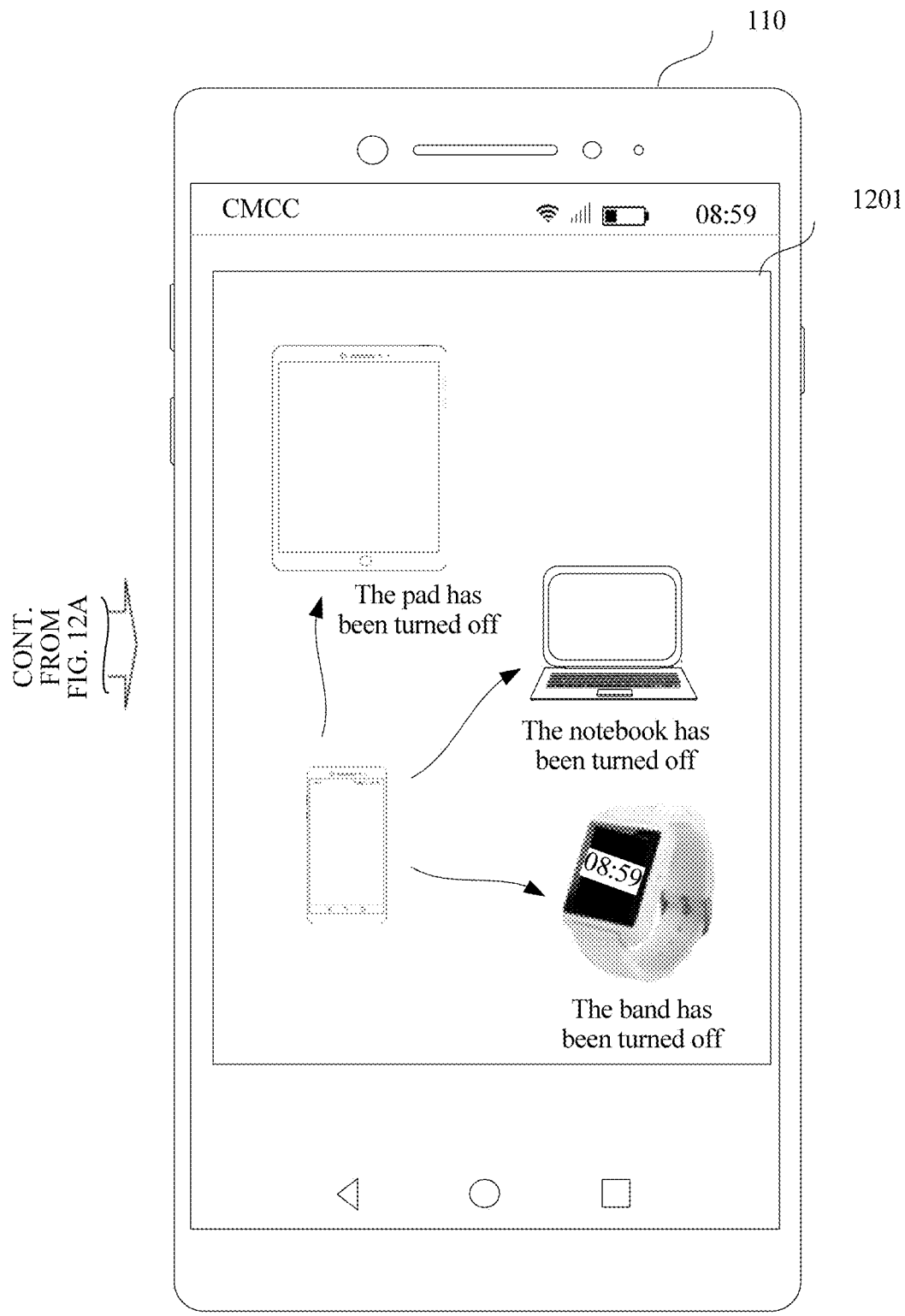

For example, when the user taps an "OK" button 910 shown in FIG. 12A, the mobile phone 110 may perform the step of "sending a first control command to the second device through the wireless short-range communication connection", and display a "command sending interface" 1201 shown in FIG. 12B. On the "command sending interface" 1201 shown in FIG. 12B, a dynamic image of sending a command by the mobile phone to the notebook computer, the tablet computer, and the Bluetooth band may be displayed. The mobile phone 110 may return to a terminal interface shown in FIG. 6A or FIG. 7A after displaying the "command sending interface" 1201 shown in FIG. 12B for a period of time (for example, 5 seconds).

Optionally, as shown in FIG. 12B, indication information "The notebook has been turned off" may be further displayed at a location corresponding to a "Notebook computer" icon, indication information "The tablet computer has been turned off" may be further displayed at a location corresponding to a "Tablet computer" icon, and indication information "The band has been turned off" may be further displayed at a location corresponding to a "Bluetooth band" icon.

Optionally, when the user taps the "OK" button 910 shown in FIG. 12A, if the mobile phone performs the step of "sending a first control command to the second device through the wireless short-range communication connection", the mobile phone may not display the "command sending interface" 1201 shown in FIG. 12B, but directly return to the terminal interface shown in FIG. 6A or FIG. 7A.

Optionally, the user may not enter any time information in the "time window" 902. In this case, the mobile phone 110 may determine that an effective time of the first control command is not limited. For example, if the first control command is used to instruct at least one second device to be powered off, the at least one second device needs to remain powered off after being powered off, until the user manually powers on the at least one second device.

As shown in FIG. 9A, because the user selects the "Master control" mode 605, when the user taps the "OK" button 910 shown in FIG. 12A, the mobile phone 110 may send the first control command to all wireless devices (namely, the notebook computer 122, the tablet computer 121, and the Bluetooth band 123) that have wireless short-range communication connections to the mobile phone 110 through the wireless short-range communication connections.

The "Wireless device control interface" 602 shown in FIG. 6B or FIG. 7C is used as an example. When the user chooses to control, in a "Device-based control" mode, a plurality of wireless devices connected to the mobile phone 110, to be specific, when the user taps a "Device-based control" mode 606 shown in FIG. 13A by using a finger, the mobile phone 110 may display a "Wireless device selection interface" 1301 shown in FIG. 13B. The "Wireless device selection interface" 1301 shown in FIG. 13B includes options for all wireless devices that have wireless short-range communication connections to the mobile phone 110, such as the notebook computer 122, the tablet computer 121, and the Bluetooth band 123.

Figure 13A:
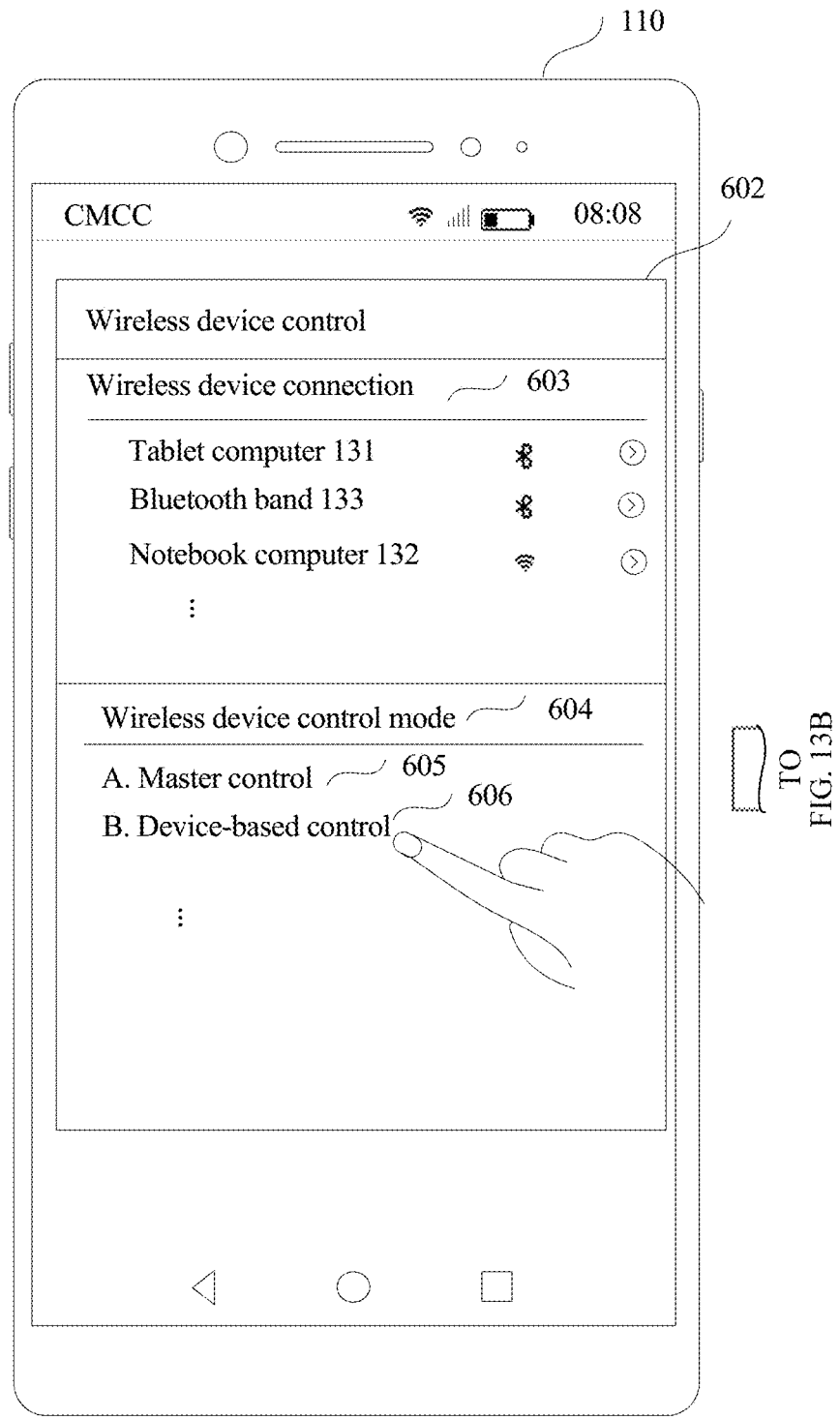
FIG. 13A, FIG. 13B, and FIG. 13C are a schematic diagram of a mobile phone display interface instance according to an embodiment of the present application.
Figure 13B:
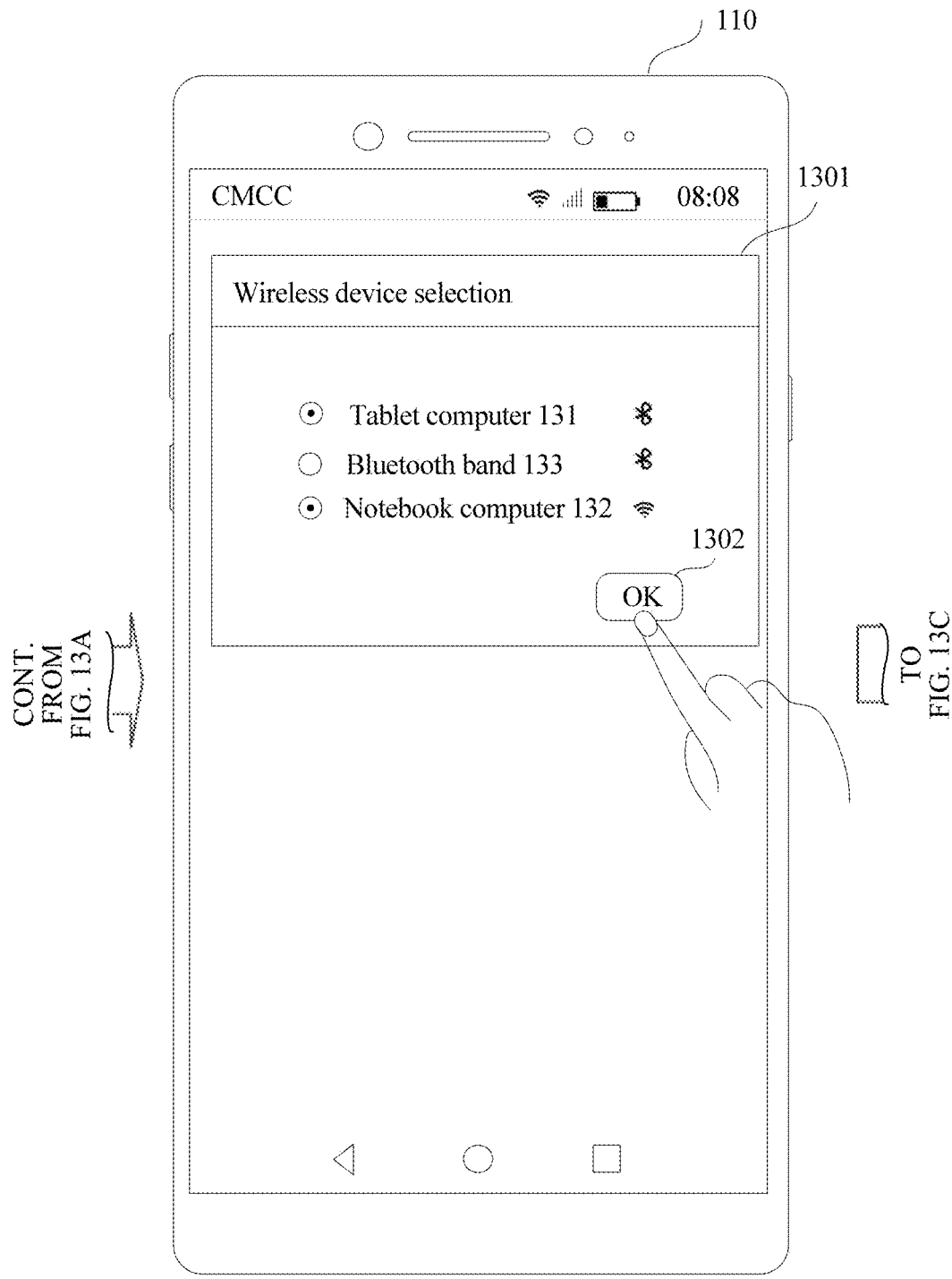
Figure 13C:
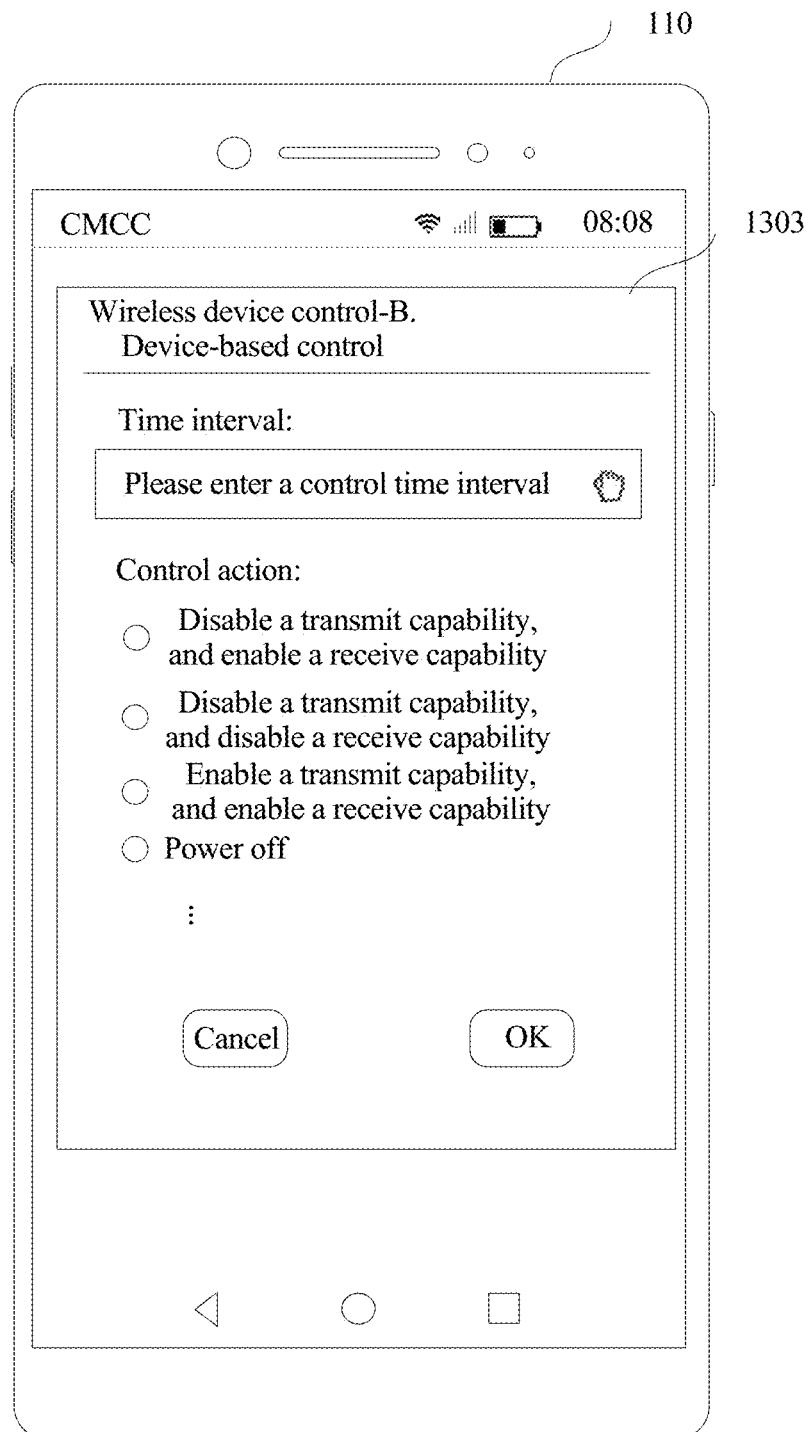

As shown in FIG. 13B, after the user selects the notebook computer 122 and the tablet computer 121 and taps an "OK" option 1302 shown in FIG. 13B, the mobile phone 110 may display a "Wireless device control interface" 1303 shown in FIG. 13C. For detailed descriptions of content displayed on the "Wireless device control interface" 1303 shown in FIG. 13C, refer to detailed descriptions of the "Wireless device control interface" 901 shown in FIG. 9B in the embodiment of the present application. Details are not described herein again in this embodiment of the present application.

In addition, for a specific method in which the user enters the time information in the "time window" on the "Wireless device control interface" 1303 shown in FIG. 13C and selects a control action option in the "selection window", refer to related descriptions in FIG. 10A, FIG. 10B, FIG. 10C, FIG. 11A, and FIG. 11B in the embodiment of the present application. Details are not described herein again in this embodiment of the present application.

Figure 14A:
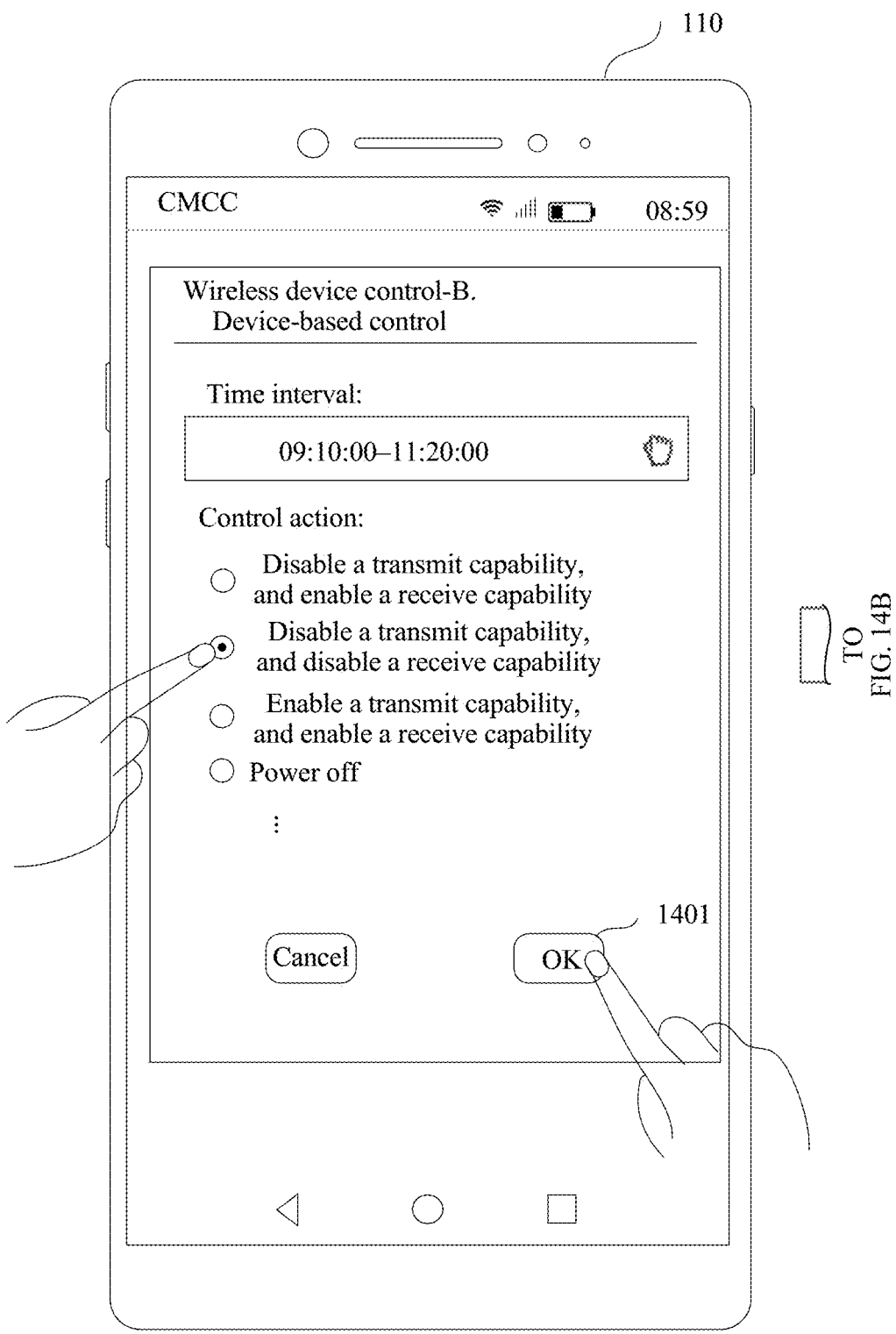
FIG. 14A and FIG. 14B are a schematic diagram of a mobile phone display interface instance according to an embodiment of the present application.
Figure 14B:
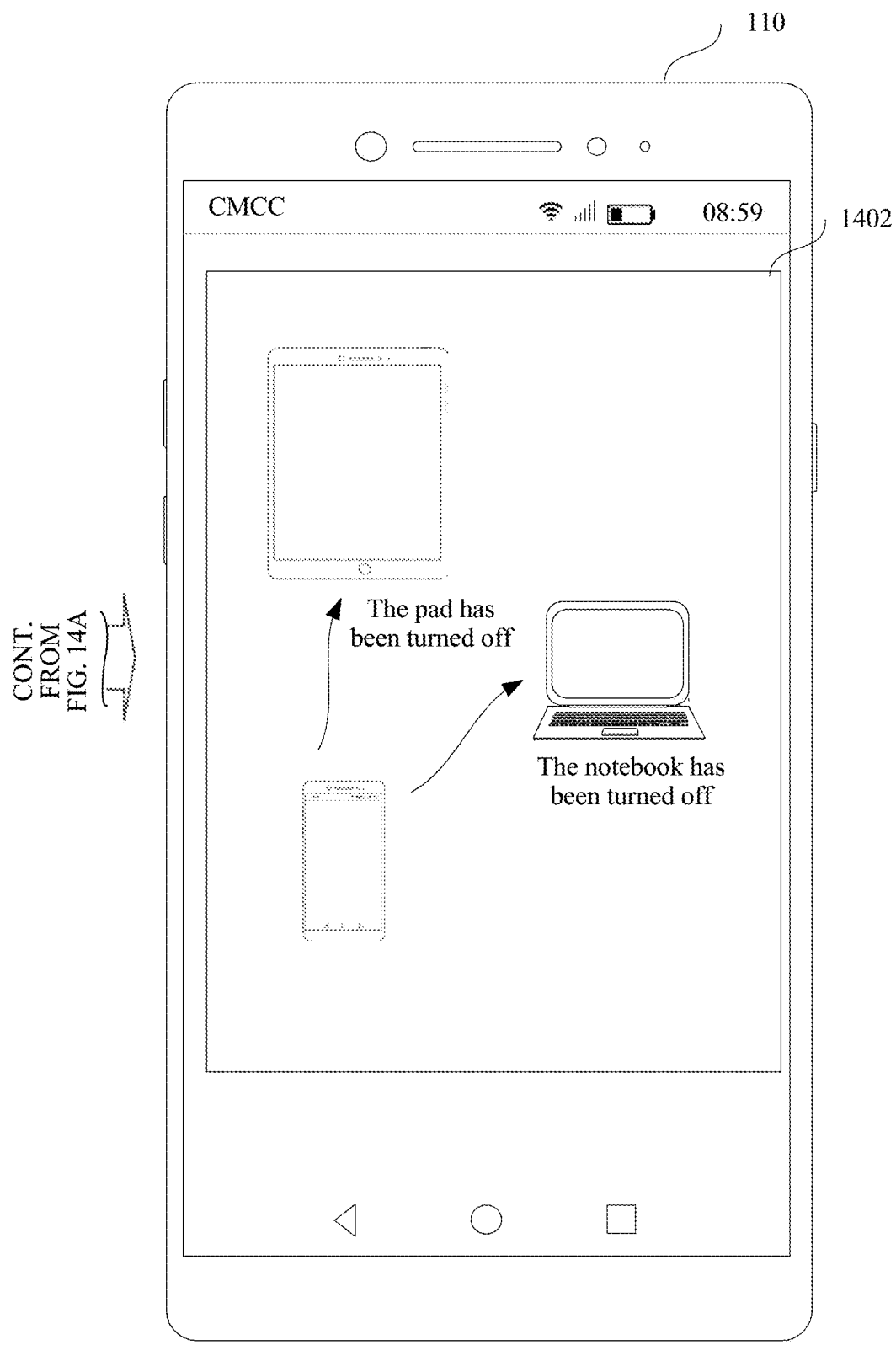

When the user enters a time interval 09:10:00-11:20:00 of a "Flight schedule 1" in the "time window" input shown in FIG. 13C, and selects a "Disable a transmit capability, and disable a receive capability" option in the "selection window", the terminal may display a terminal interface shown in FIG. 14A. A difference is as follows: As shown in FIG. 13A, the user selects the "Device-based control" mode 606, and as shown in FIG. 13B, the user only chooses to send a control command to the notebook computer 122 and the tablet computer 121. Therefore, when the user taps an "OK" option 1401 shown in FIG. 14A by using a finger, the mobile phone 110 may send the first control command to the notebook computer 122 and the tablet computer 121 through a wireless short-range communication connection, and does not need to send the first control command to the Bluetooth band 123. Optionally, when the mobile phone 110 sends the first control command to the notebook computer 122 and the tablet computer 121, the mobile phone 110 may display a "command sending interface" 1402 shown in FIG. 14B. On the "command sending interface" 1402 shown in FIG. 14B, a dynamic image of sending a command by the mobile phone to the notebook computer and the tablet computer may be displayed.

In the device control method provided in this embodiment of the present application, the first device may display icons of all devices that have wireless short-range communication connections to the first device, and may notify a user of second devices that have wireless short-range communication connections to the first device. In addition, the user may further choose, on the first device, to control, in a "Master control" mode or "Device-based control" mode, a plurality of second devices to simultaneously disable wireless communication capabilities of the second devices or to be powered off, thereby improving user experience.

Figures 1, 15A:
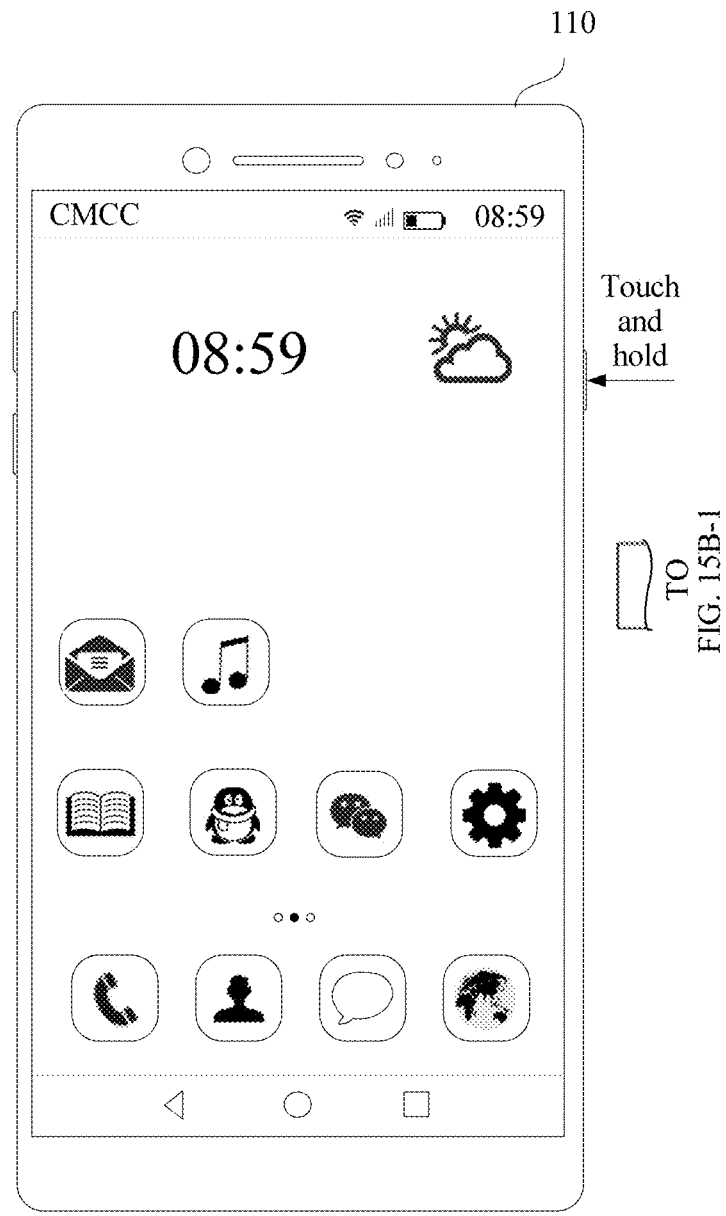

In a second application scenario, the first input may be an instruction used to instruct the first device to be powered off. For example, the first device is the mobile phone 110. Usually, when the mobile phone 110 receives a power off instruction (as shown in FIG. 15A-1, an instruction that is triggered by a touch and hold operation performed by the user on a lock screen key of the mobile phone 110), the mobile phone 110 may display a "Power off interface" 1501 shown in FIG. 15B-1. In contrast, in this embodiment of the present application, when the mobile phone 110 receives a power off instruction (as shown in FIG. 15A-2, an instruction that is triggered by a touch and hold operation performed by the user on a lock screen key of the mobile phone 110), the mobile phone 110 may display a "control prompt interface" 1502 shown in FIG. 15B-2. The "control prompt interface" 1502 shown in FIG. 15B-2 includes prompts such as prompt information "The mobile phone has wireless short-range communication connections to the following devices", icons of the devices that have the wireless short-range communication connections to the mobile phone 110, corresponding wireless short-range communication connection manners, a "Yes" option 1504, and a "No" option 1503.

Figures 1, 15B:
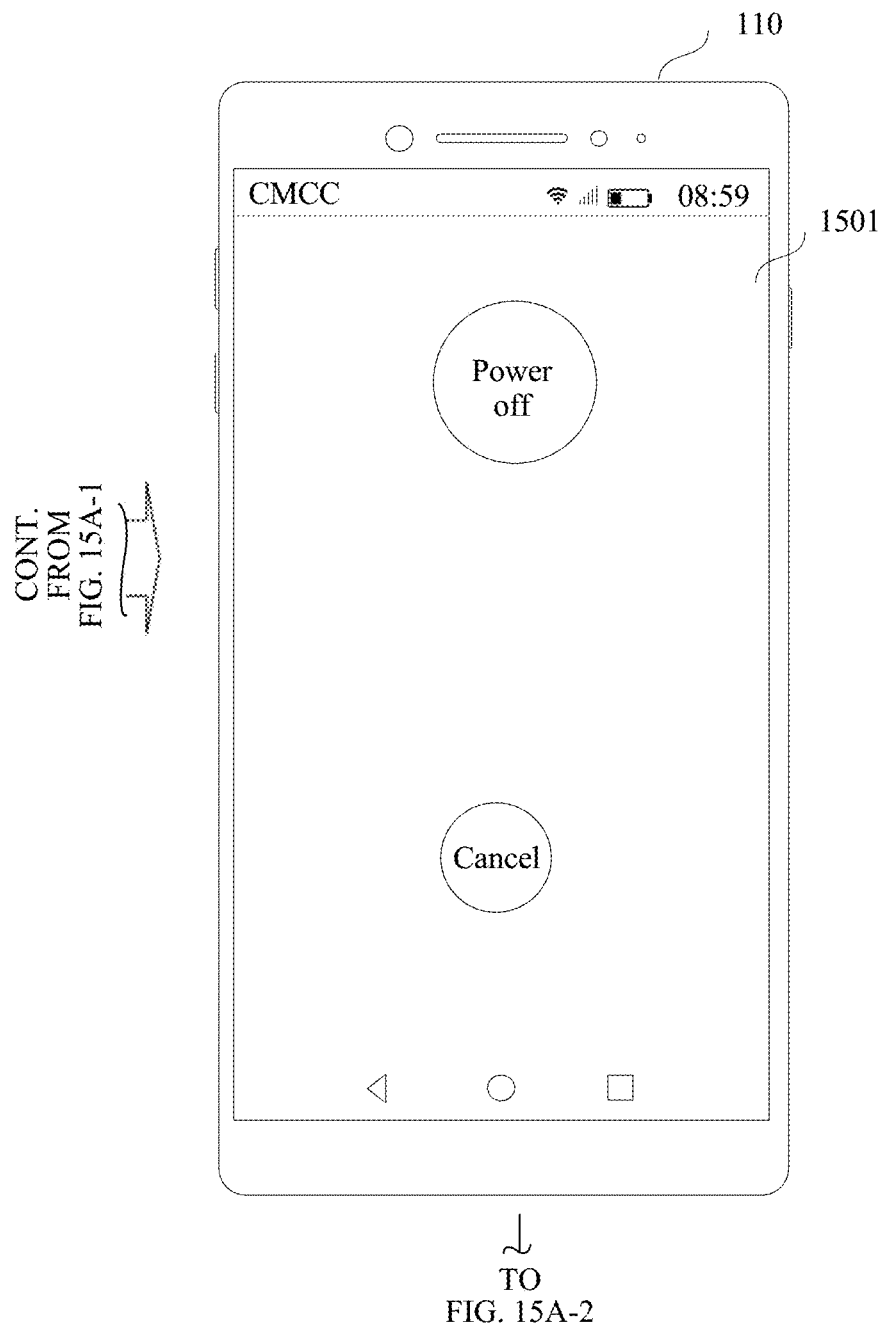
Figures 2, 15A:
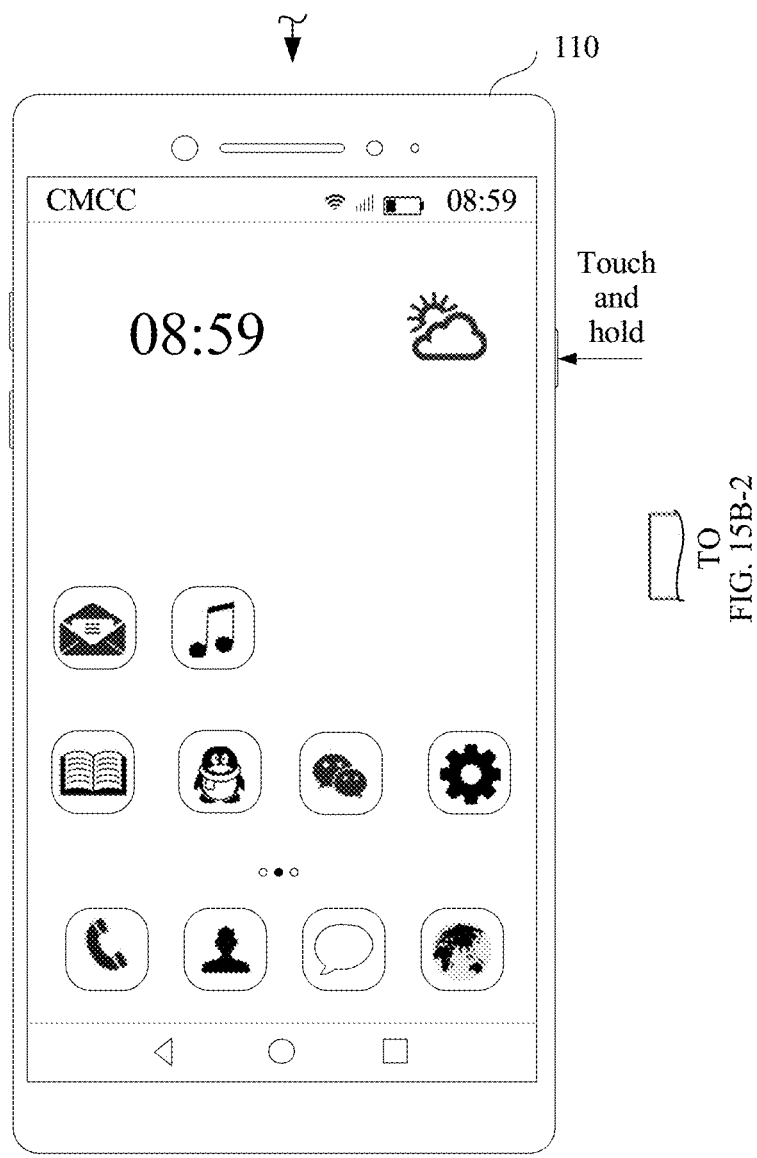
Figures 2, 15B:
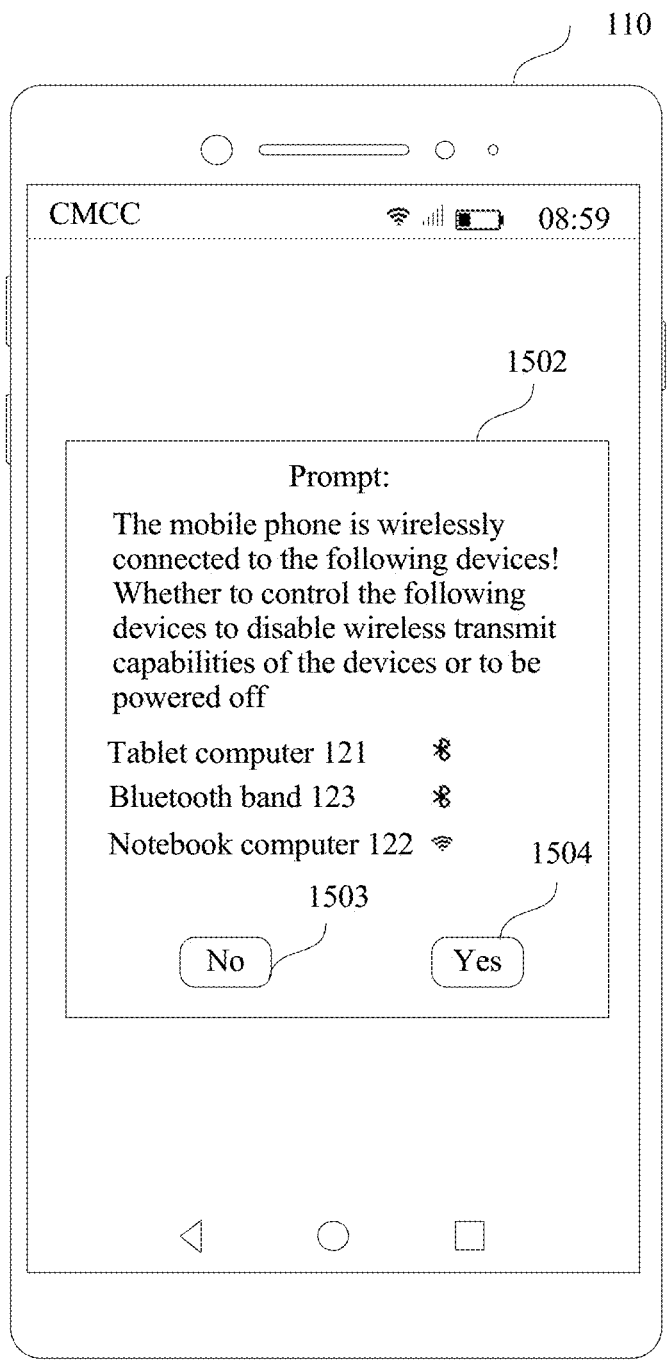
Figure 16A:
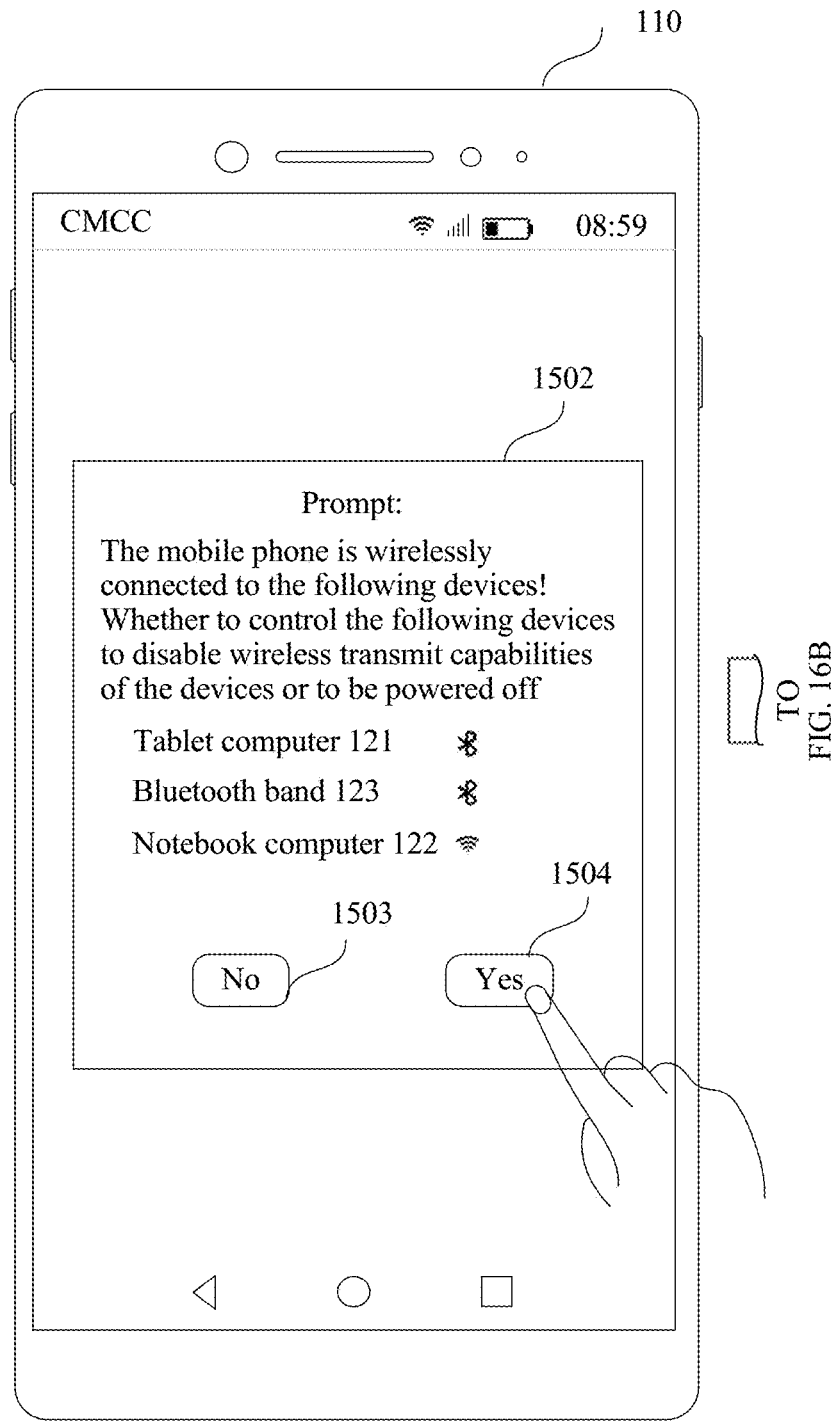
FIG. 16A and FIG. 16B are a schematic diagram of a mobile phone display interface instance according to an embodiment of the present application.

When the user taps the "No" option 1503 shown in FIG. 15B-2 by using a finger, the mobile phone 110 may display the "Power off interface" 1501 shown in FIG. 15B-1. As shown in FIG. 16A, when the user taps a "Yes" option 1504 shown in FIG. 16A by using a finger, the mobile phone 110 displays a "Wireless device control interface" shown in FIG. 16B.

Figure 16B:
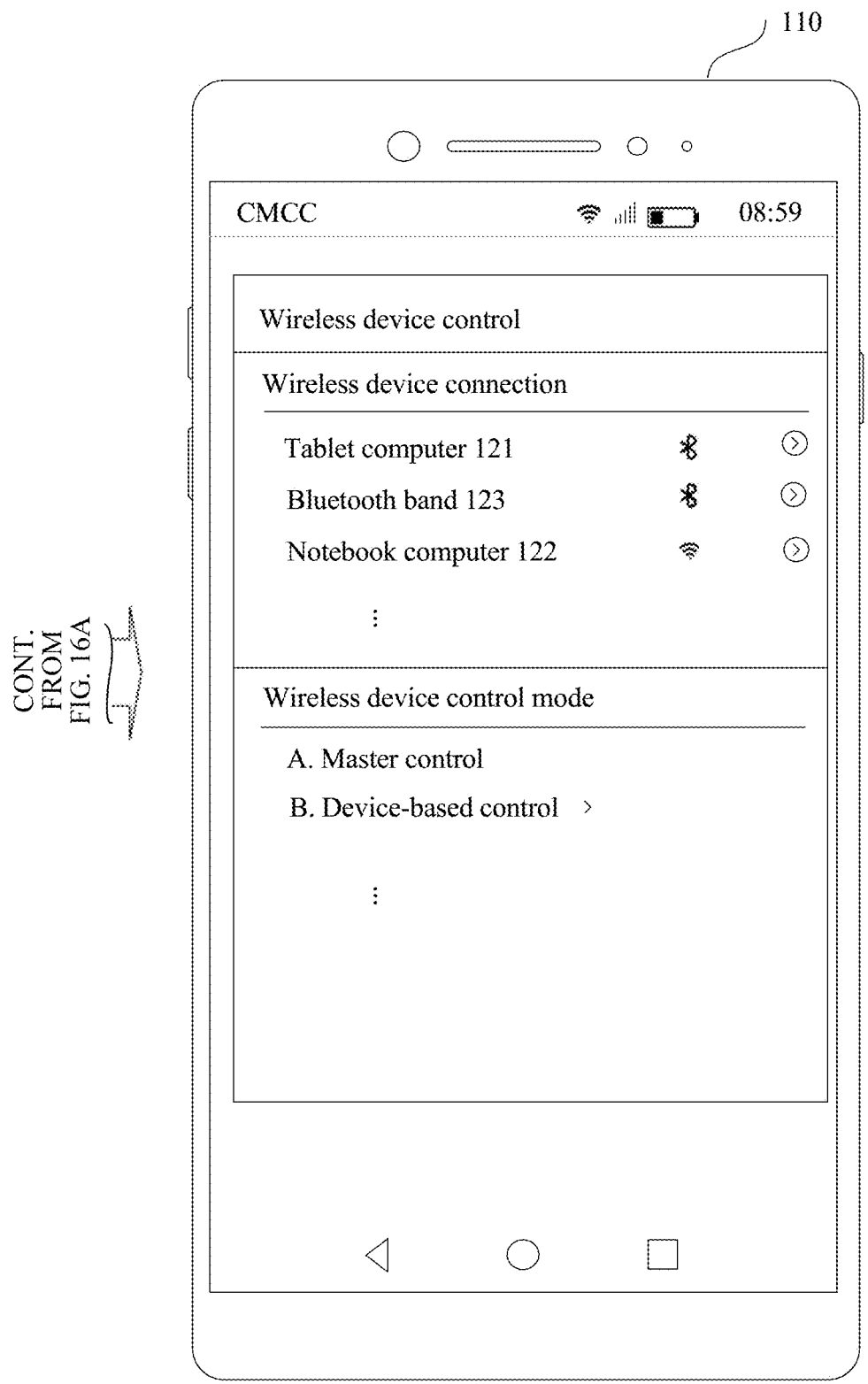

It should be noted that for a specific method in which the user controls the mobile phone 110 to send the first control command to the second device through the "Wireless device control interface" shown in FIG. 16B, refer to related descriptions in FIG. 10A, FIG. 10B, FIG. 10C, FIG. 11A, and FIG. 11B in the embodiment of the present application. Details are not described herein again in this embodiment of the present application.

Figure 18A:
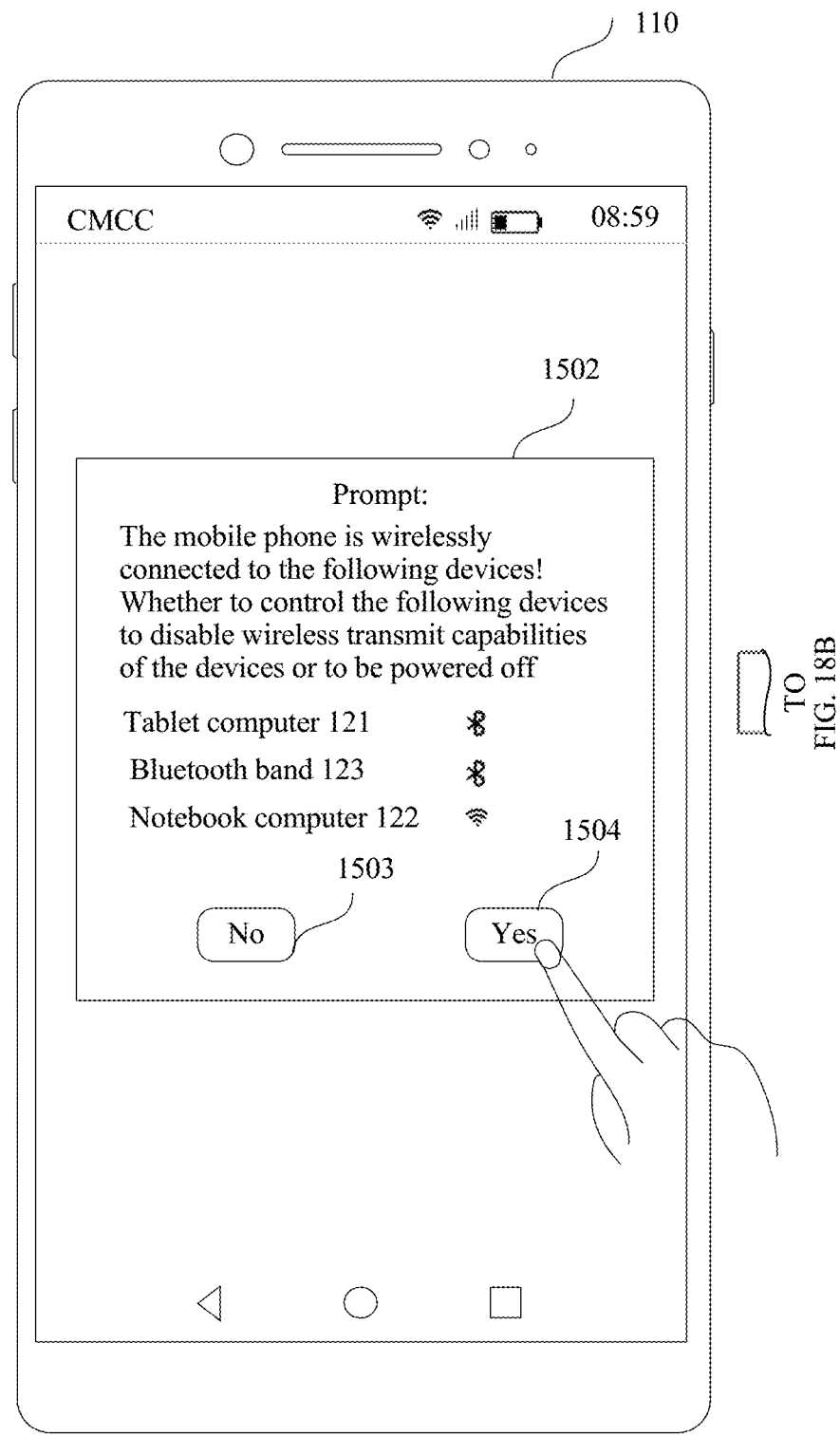
FIG. 18A and FIG. 18B are a schematic diagram of a mobile phone display interface instance according to an embodiment of the present application.
Figure 18B:
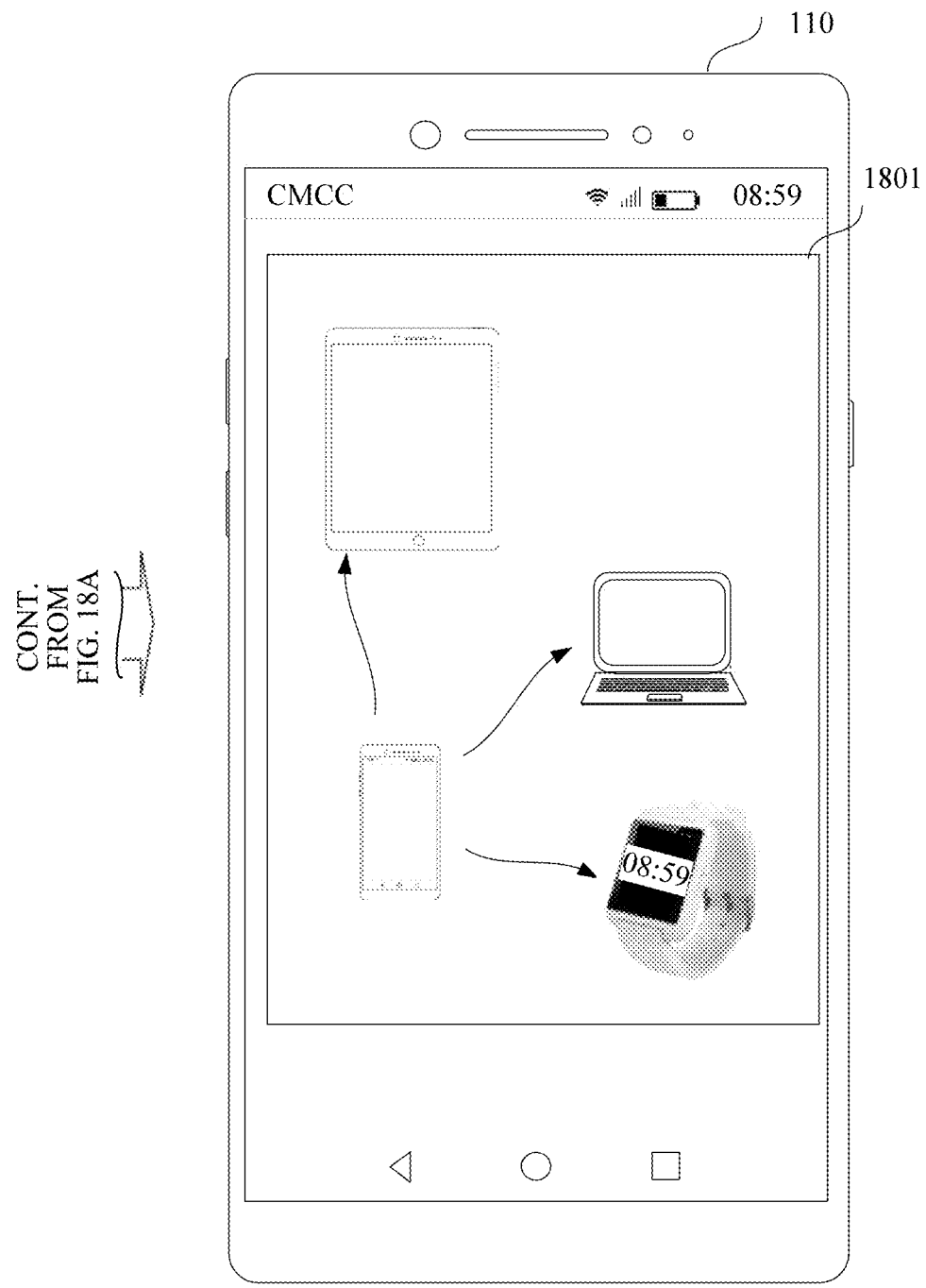

Optionally, when the user taps a "Yes" option 1504 shown in FIG. 18A by using a finger, the mobile phone 110 may directly send the first control command to all wireless devices (namely, the notebook computer 122, the tablet computer 121, and the Bluetooth band 123) that have wireless short-range communication connections to the mobile phone 110. Optionally, when the user taps the "Yes" option 1504 shown in FIG. 18A by using a finger, the mobile phone 110 may directly display a "command sending interface" 1801 shown in FIG. 18B, instead of displaying the "Wireless device control interface" shown in FIG. 16B. On the "command sending interface" 1801 shown in FIG. 18B, a dynamic image of sending a command by the mobile phone to the notebook computer, the Bluetooth band, and the tablet computer may be displayed.

Figure 17:
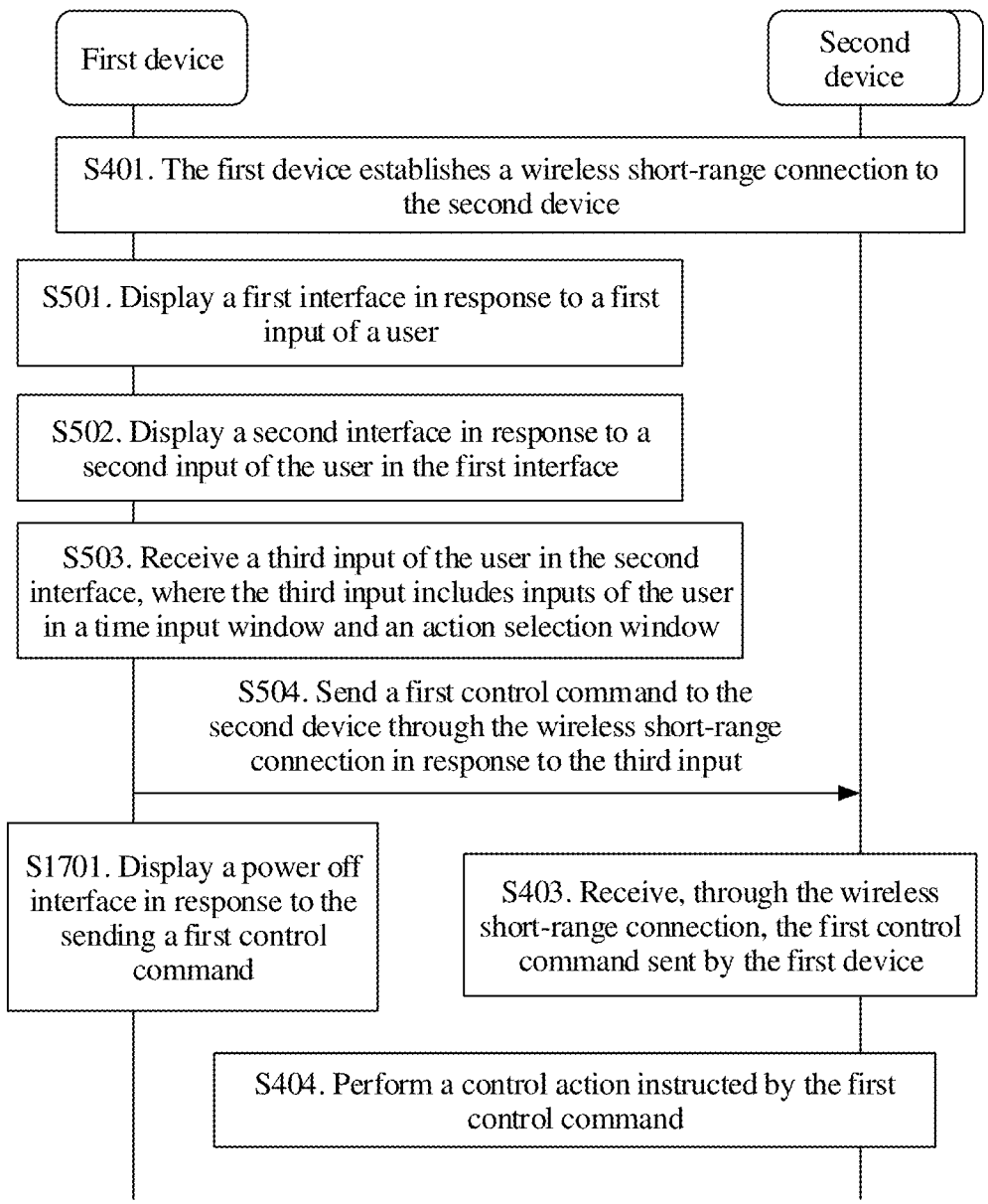
FIG. 17 is a flowchart of a device control method according to an embodiment of the present application.

In the second application scenario, the first input may be an instruction used to instruct the first device to be powered off. Therefore, after S504, the method in this embodiment of the present application may further include S1701. For example, as shown in FIG. 17, after S504 shown in FIG. 5, the method in this embodiment of the present application may further include S1701:

S1701. The first device displays a power off interface in response to the sending a first control command.

According to the device control method provided in this embodiment of the present application, when receiving a power off instruction, the first device may suspend power-off, and first prompts a user whether to control a second device that has a wireless short-range communication connection to the first device to perform a corresponding control action, so that forgetting to disable or enable a wireless device because the user carries a relatively large quantity of wireless devices may be avoided. In this way, in some application scenarios, for example, in a process of taking an airplane, electromagnetic interference caused by a wireless device to the airplane because the user forgets to turn off the wireless device or forgets to disable a wireless communication capability of the wireless device may be avoided, thereby reducing a security risk.

Optionally, in some embodiments, in the second application scenario of this embodiment of the present application, the first device may respond to a power off operation of the user, directly sends the first control command to all devices that have wireless short-range communication connections to the first device before the power-off, and does not need to display the first interface, the second interface, and the like. Specifically, before S402, the method in this embodiment of the present application further includes S1901 to S1903. For example, as shown in FIG. 19, before S402 shown in FIG. 4, the method in this embodiment of the present application further includes S1901 to S1903.

S1901. The first device receives a first input of a user, where the first input is used to instruct the first device to be powered off.

For example, the first input may be a tap operation performed by the user on a power-off shortcut key of the first device. For example, when the first device is a mobile phone, the first input may be a touch and hold operation performed by the user on a physical lock screen key of the mobile phone.

Figure 19:
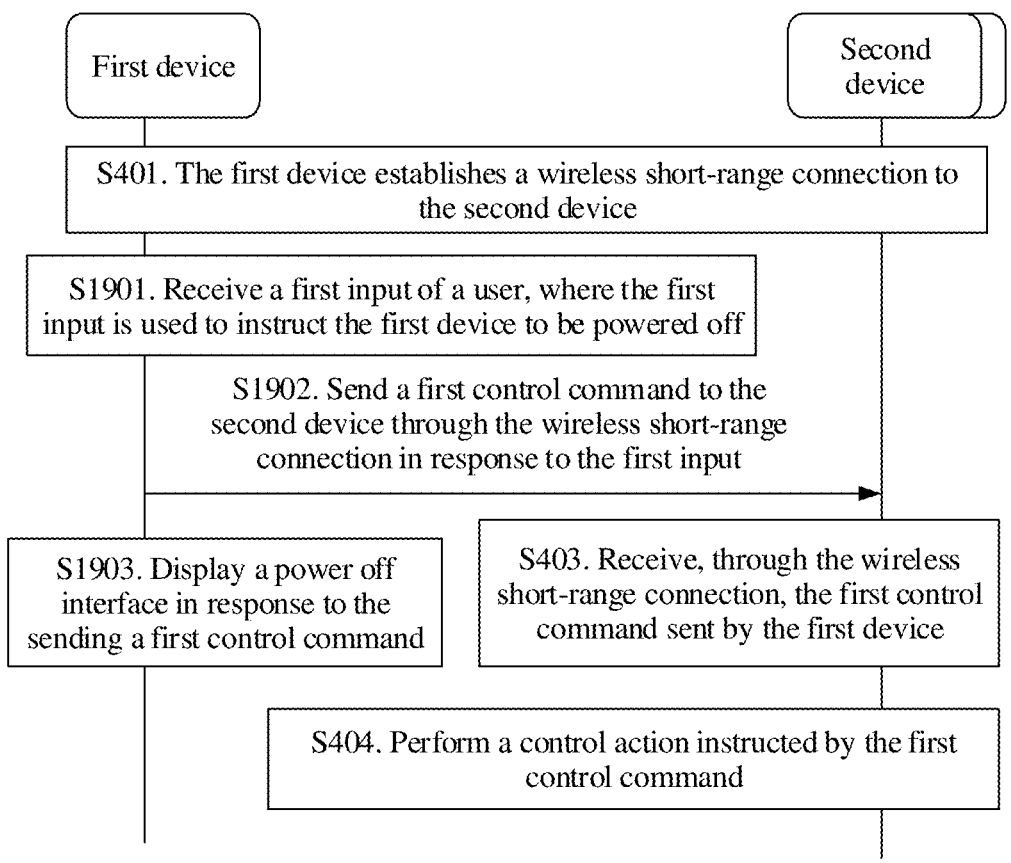
FIG. 19 is a flowchart of a device control method according to an embodiment of the present application.

Correspondingly, as shown in FIG. 19, S402 may be replaced with S1902:

S1902. The first device sends a first control command to the second device through a wireless short-range communication connection in response to the first input, where the first control command is used to instruct the second device to perform a control command.

In the second application scenario of this embodiment of the present application, the second device may be all devices that have wireless short-range communication connections to the first device.

S1903. The first device displays a power off interface in response to the sending a first control command.

Figure 20A:
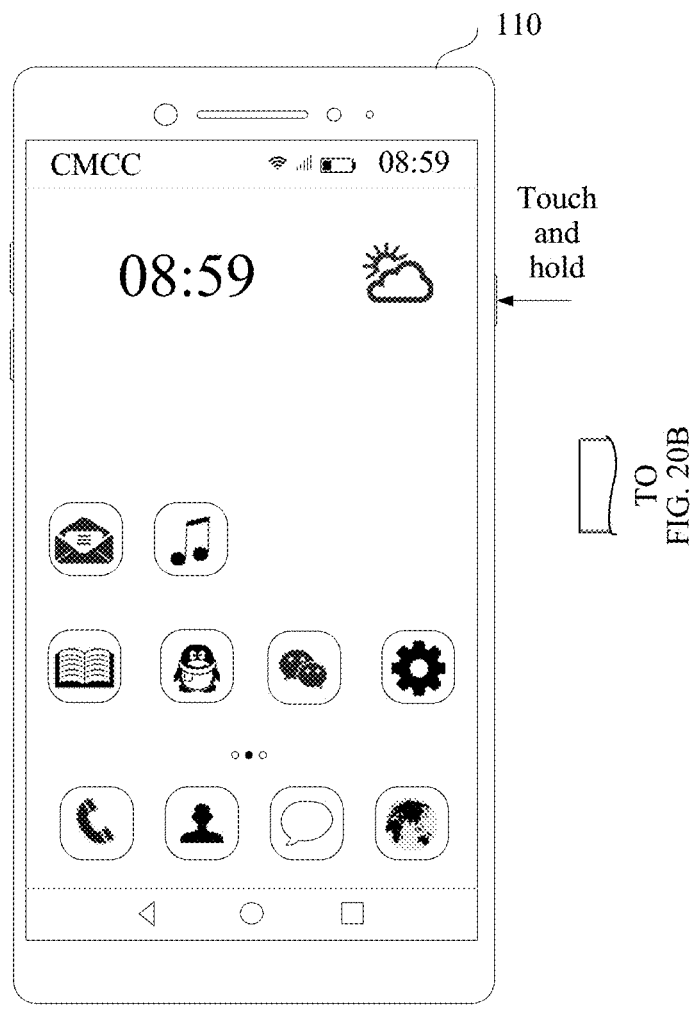
FIG. 20A, FIG. 20B, and FIG. 20C are a schematic diagram of a mobile phone display interface instance according to an embodiment of the present application.

For example, when the mobile phone 110 receives a power off instruction (as shown in FIG. 20A, an instruction triggered by a touch and hold operation performed by the user on a lock screen key of the mobile phone 110), the mobile phone 110 may directly send the first control command to all wireless devices (namely, the notebook computer 122, the tablet computer 121, and the Bluetooth band 123) that have wireless short-range communication connections to the mobile phone 110.

Figure 20B:
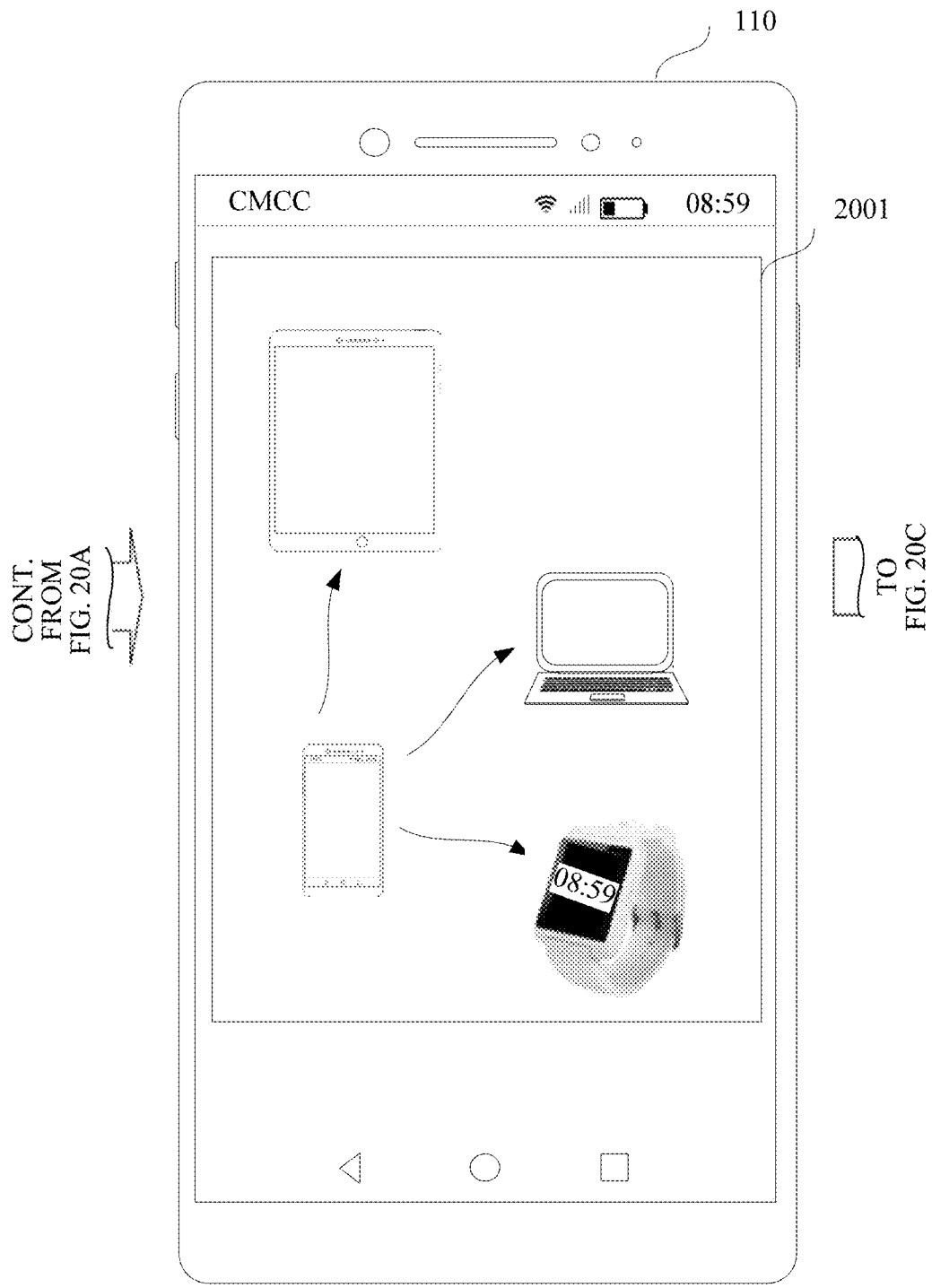
Figure 20C:
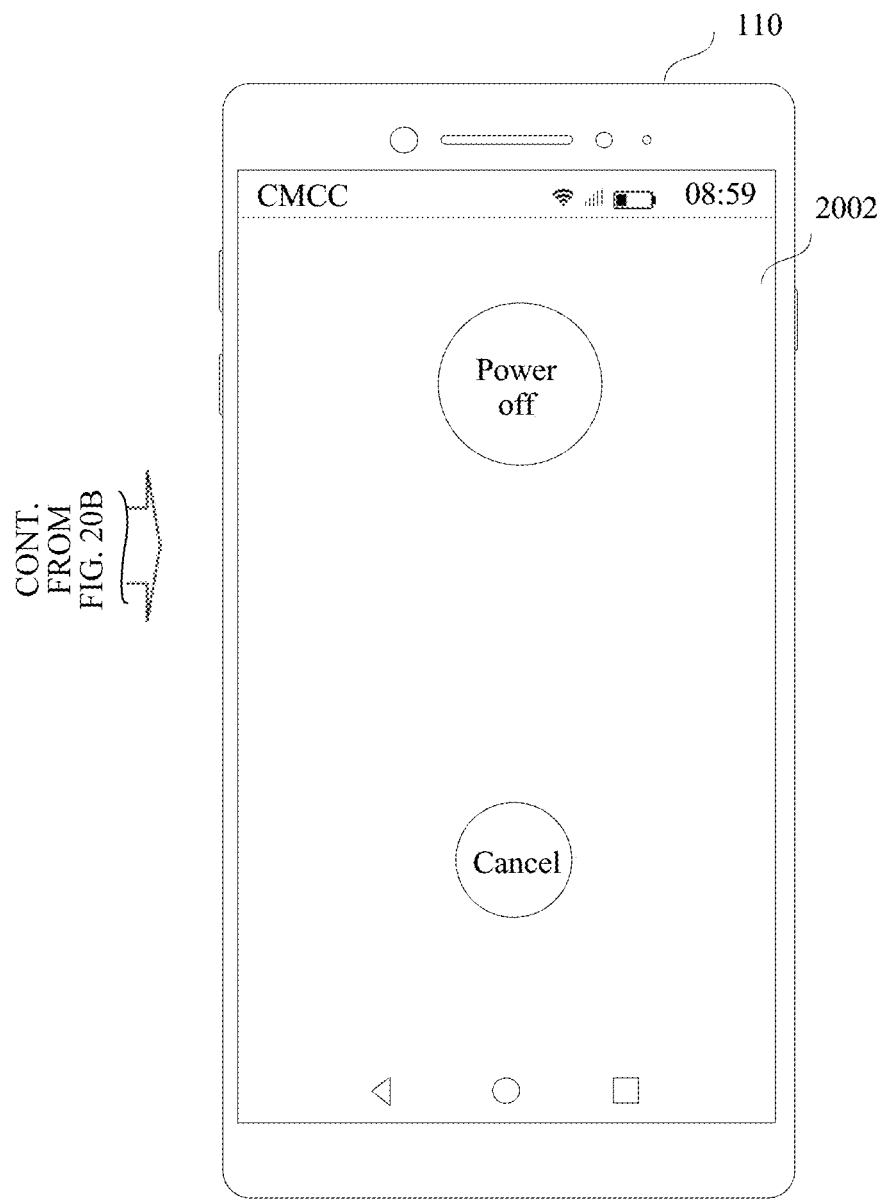

Optionally, when the mobile phone 110 receives a power off instruction (as shown in FIG. 20A, an instruction triggered by a touch and hold operation performed by the user on a lock screen key of the mobile phone 110), when sending the first control command to all wireless devices that have wireless short-range communication connections to the mobile phone 110, the mobile phone 110 may also display a "command sending interface" 2001 shown in FIG. 20B. In addition, after the mobile phone 110 displays the "command sending interface" 2001 shown in FIG. 20B for a specific time (for example, 5 seconds), the mobile phone 110 may display a "Power off interface" 2002 shown in FIG. 20C.

In a third application scenario, the first input may be an instruction used to instruct the first device to disable a wireless communication capability (such as a wireless transmit capability) of the first device. For example, the first input may be an instruction of the user to disable a mobile network of the mobile phone 110. Alternatively, the first input may be an instruction of the user to enable an airplane mode of the mobile phone 110.

Figure 21A:
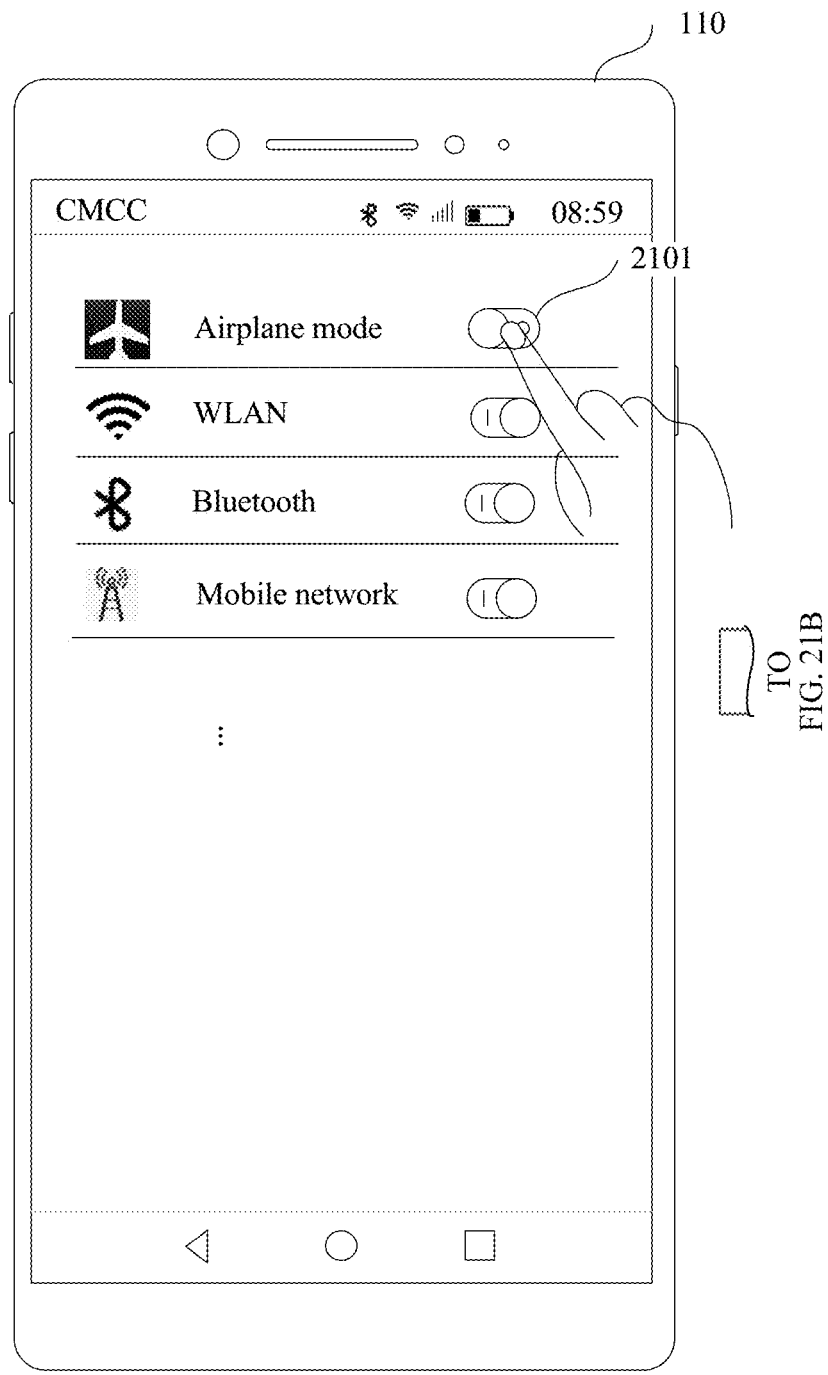
FIG. 21A and FIG. 21B are a schematic diagram of a mobile phone display interface instance according to an embodiment of the present application.

For example, the first input is the instruction of the user to enable the airplane mode of the mobile phone 110. When the user slides on an "Airplane mode" option 2101 shown in FIG. 21A by using a finger, to enable the airplane mode of the mobile phone 110, the mobile phone 110 may display a "control prompt interface" 2102 shown in FIG. 21B. The "control prompt interface" 2102 shown in FIG. 21B includes prompts such as prompt information "The mobile phone has wireless short-range communication connections to the following devices", icons of the devices that have the wireless short-range communication connections to the mobile phone 110, corresponding wireless short-range communication connection manners, a "Yes" option 2104, and a "No" option 2103.

Figure 22A:
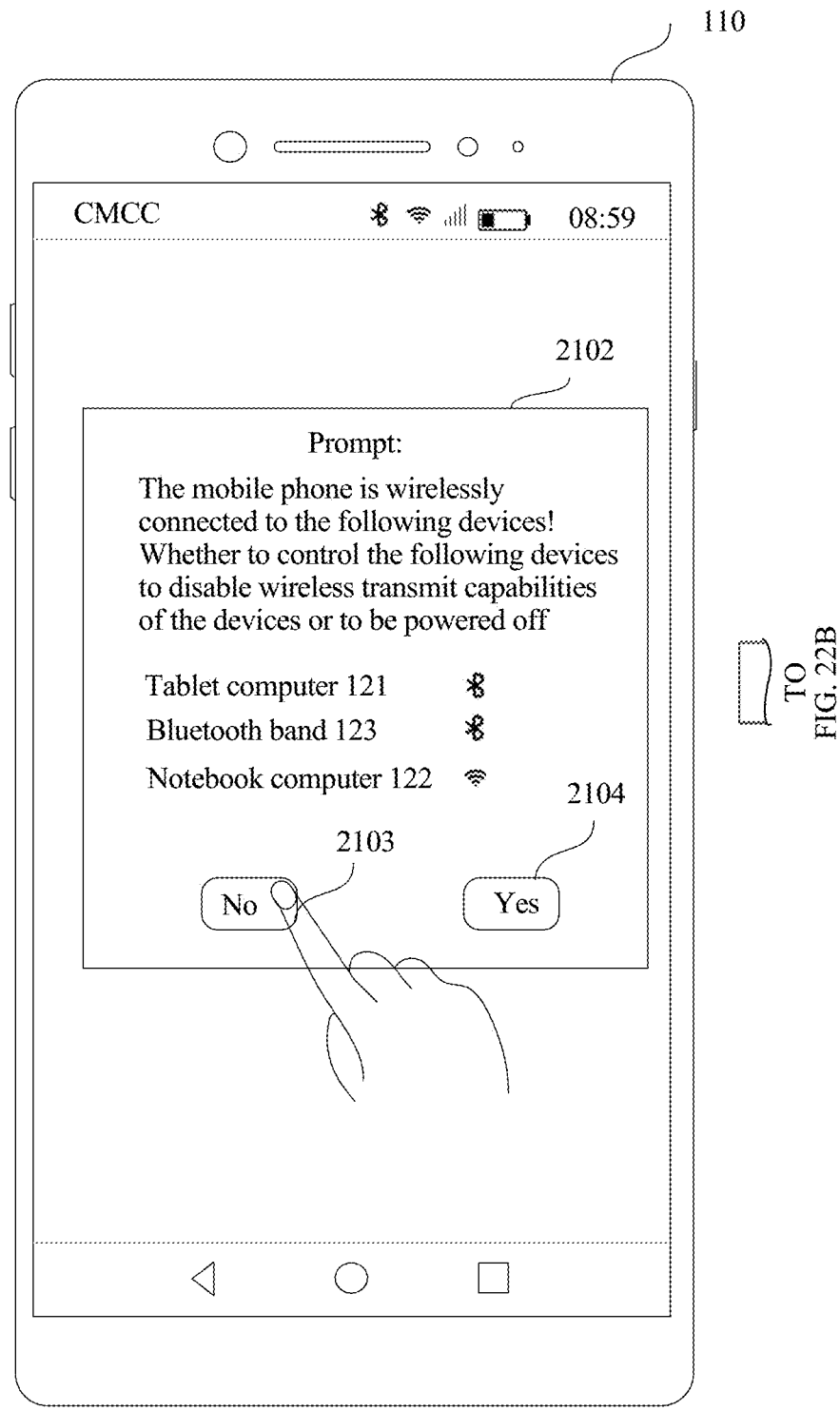
FIG. 22A and FIG. 22B are a schematic diagram of a mobile phone display interface instance according to an embodiment of the present application.
Figure 22B:
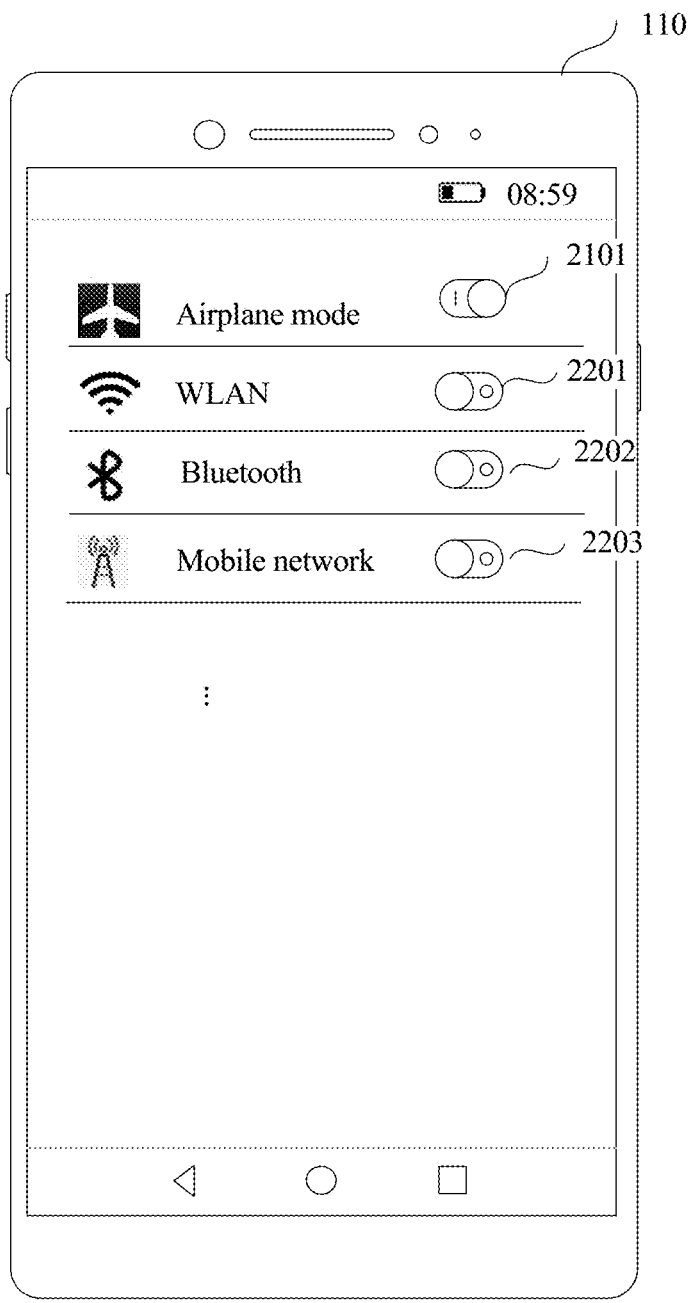

When the user taps the "No" option 2103 shown in FIG. 22A by using a finger, the mobile phone 110 may display an "Airplane mode interface" shown in FIG. 22B. In the "Airplane mode interface" shown in FIG. 22B, the "Airplane mode" option 2101 is enabled, and a "WLAN" option 2201, a "Bluetooth" option 2202, and a "Mobile network" option 2203 are all disabled.

Figure 23A:
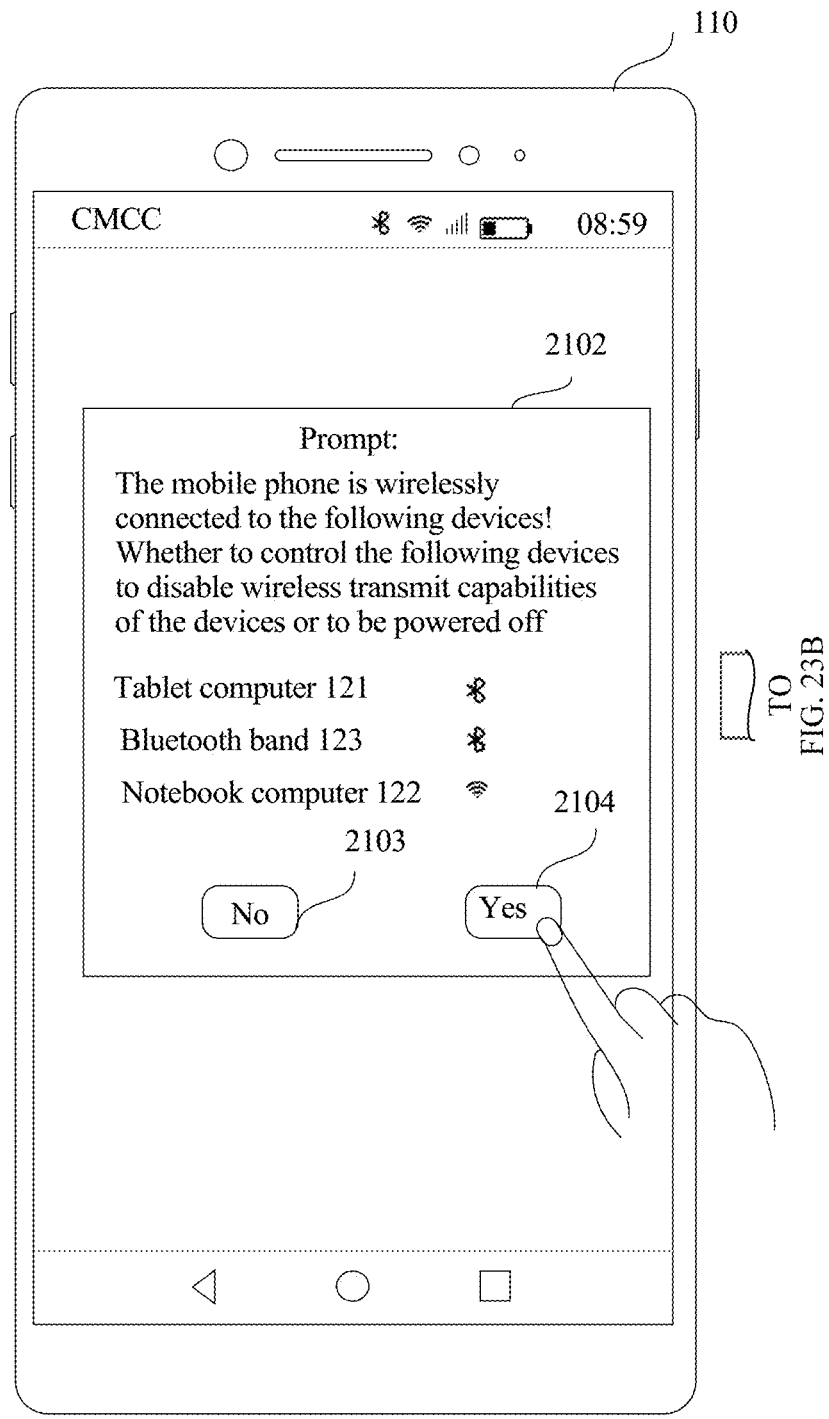
FIG. 23A and FIG. 23B are a schematic diagram of a mobile phone display interface instance according to an embodiment of the present application.
Figure 23B:
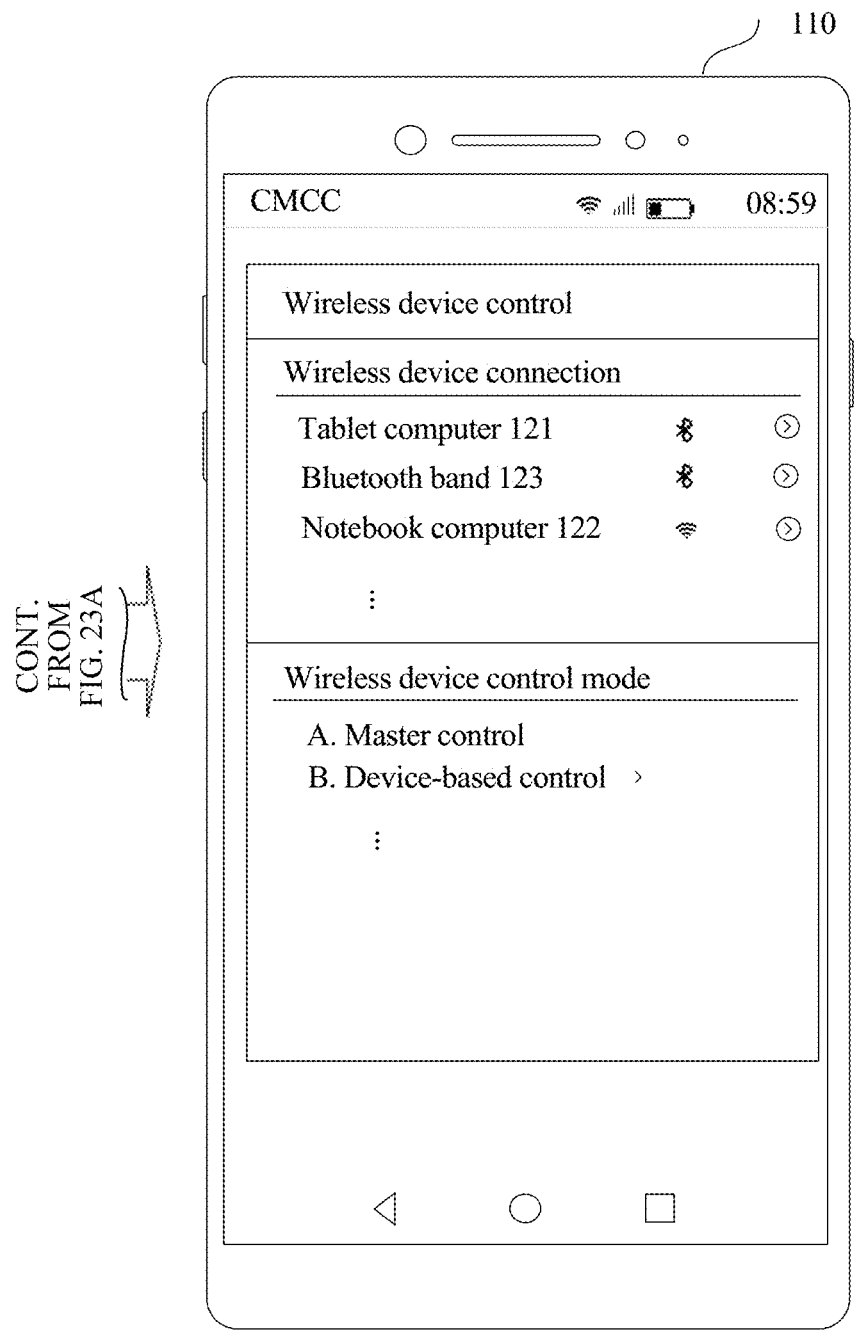

As shown in FIG. 23A, when the user taps a "Yes" option 2104 shown in FIG. 23A by using a finger, the mobile phone 110 may display a "Wireless device control interface" shown in FIG. 23B.

It should be noted that for a specific method in which the user controls the mobile phone 110 to send the first control command to the second device through the "Wireless device control interface" shown in FIG. 23B, refer to related descriptions in FIG. 10A, FIG. 10B, FIG. 10C, FIG. 11A, and FIG. 11B in the embodiment of the present application. Details are not described herein again in this embodiment of the present application.

Figure 21B:
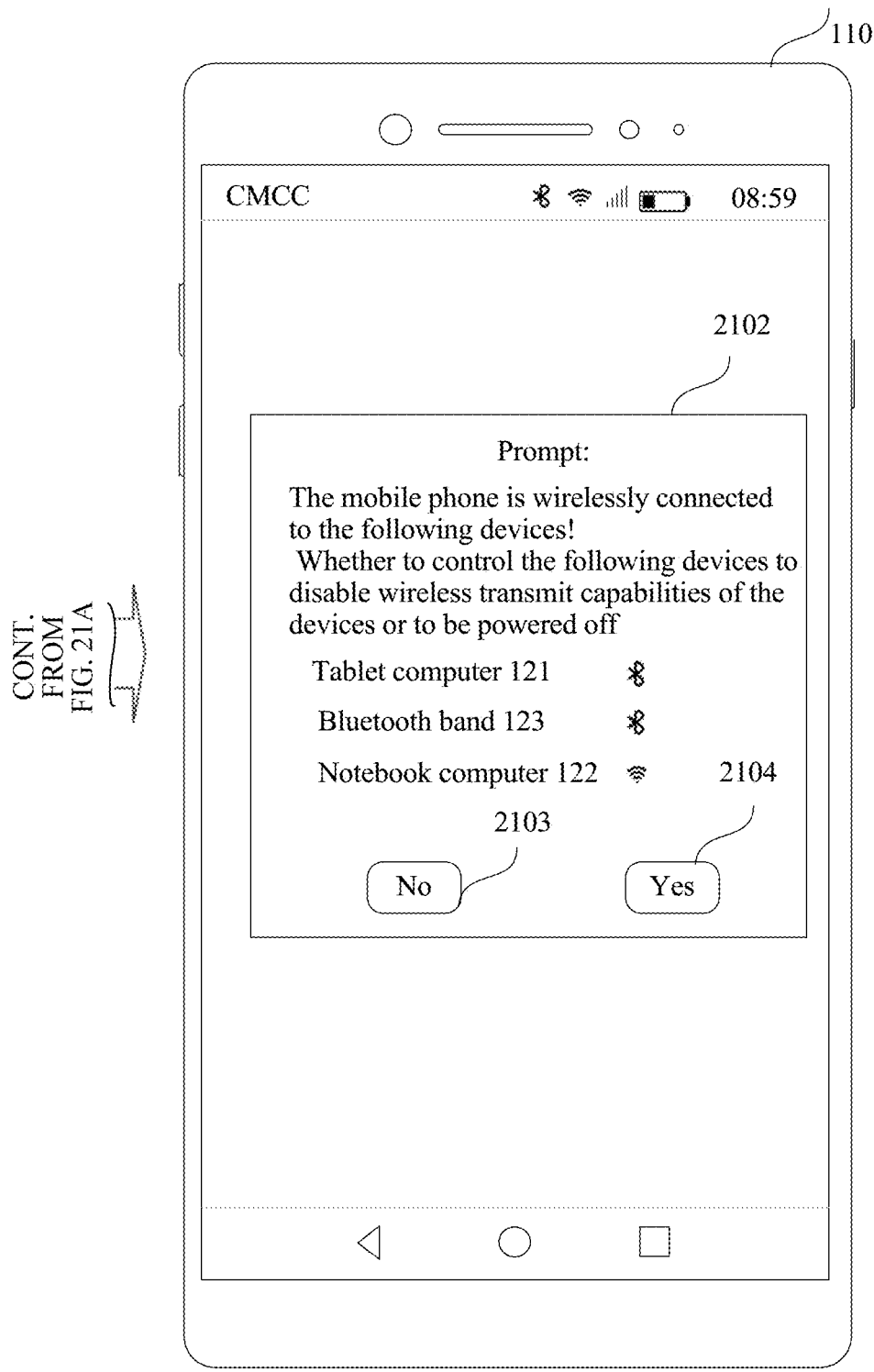

Optionally, in the third application scenario, when the user taps the "Yes" option 2104 shown in FIG. 21B by using a finger, the mobile phone 110 may directly send the first control command to all wireless devices (namely, the notebook computer 122, the tablet computer 121, and the Bluetooth band 123) that have wireless short-range communication connections to the mobile phone 110. For example, it is assumed that the "control prompt interface" 2102 shown in FIG. 21B is a "control prompt interface" 1502 shown in FIG. 18A. When the user taps the "Yes" option 1504 shown in FIG. 18A by using a finger, the mobile phone 110 may directly display a "command sending interface" 1801 shown in FIG. 18B, instead of displaying the "Wireless device control interface" shown in FIG. 16B. On the "command sending interface" 1801 shown in FIG. 18B, a dynamic image of sending a command by the mobile phone to the notebook computer, the Bluetooth band, and the tablet computer may be displayed.

Figure 24:
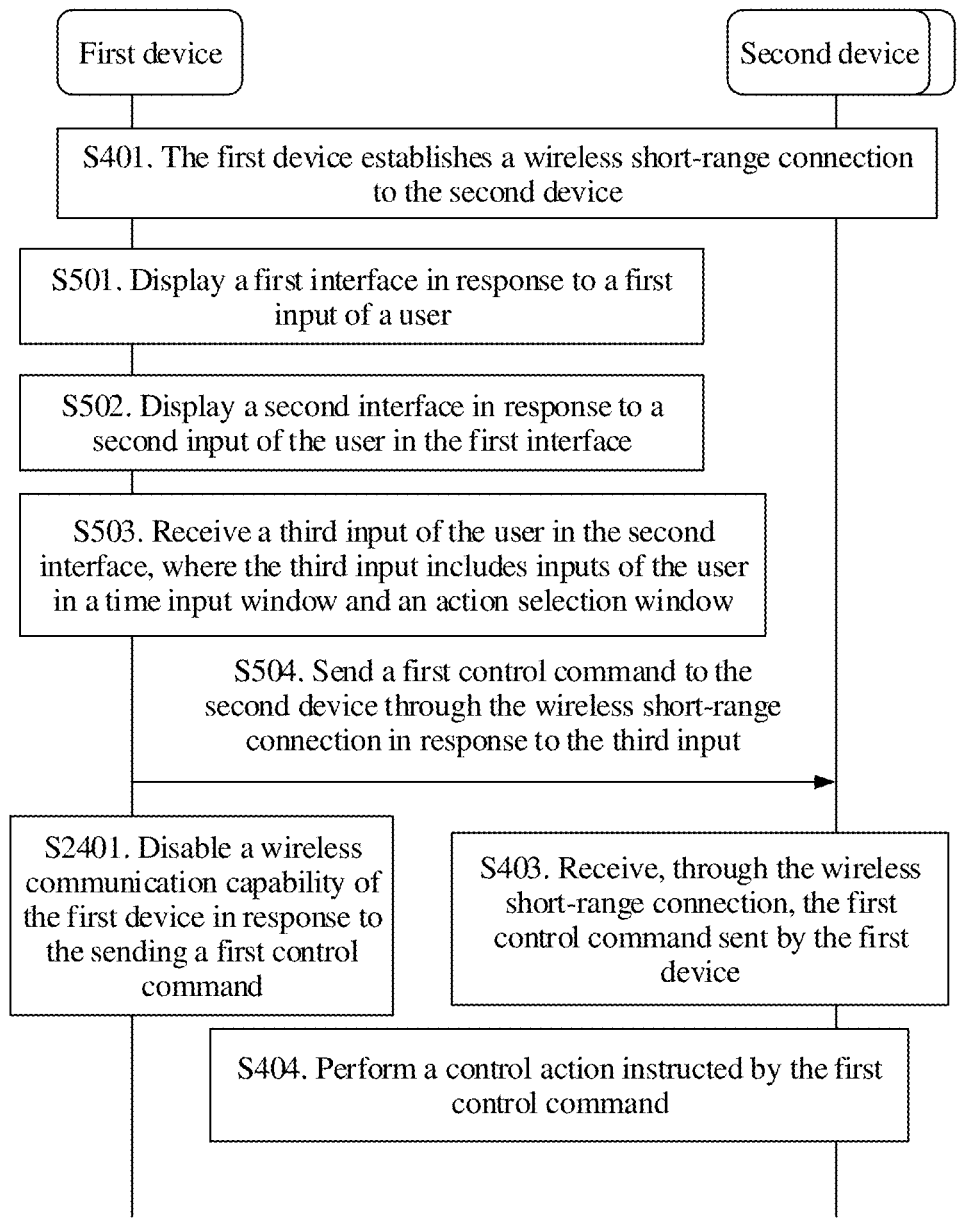
FIG. 24 is a flowchart of a device control method according to an embodiment of the present application.

In the third application scenario, the first input may be an instruction used to instruct the first device to disable a wireless communication capability (such as a wireless transmit capability) of the first device. Therefore, as shown in FIG. 24, after S504 shown in FIG. 5, the method in this embodiment of the present application may further include S2401:

S2401. The first device disables a wireless communication capability of the first device in response to the sending a first control command.

According to the device control method provided in this embodiment of the present application, when receiving an instruction of disabling the wireless communication capability of the first device, the first device may suspend disabling the wireless communication capability of the first device, and first prompts a user whether to control a second device that has a wireless short-range communication connection to the first device to be powered off or to disable a wireless communication capability of the second device, so that forgetting to disable a wireless device because the user carries a relatively large quantity of wireless devices may be avoided. In this way, in some application scenarios, for example, in a process of taking an airplane, electromagnetic interference caused by a wireless device to the airplane because the user forgets to turn off the wireless device or forgets to disable a wireless communication capability of the wireless device may be avoided, thereby reducing a security risk.

Optionally, in some embodiments, in the third application scenario of this embodiment of the present application, the first device may directly send, in response to an operation of disabling the wireless communication capability of the first device by the user, the first control command to all devices that have wireless short-range communication connections to the first device before disabling the wireless communication capability of the first device, and does not need to display the first interface, the second interface, and the like. Specifically, before S402, the method in this embodiment of the present application may further include S2501 to S2503. For example, as shown in FIG. 25, before S402 shown in FIG. 4, the method in this embodiment of the present application may further include S2501 to S2503.

S2501. The first device receives a first input of a user, where the first input is used to instruct the first device to disable a wireless communication capability of the first device.

Figure 25:
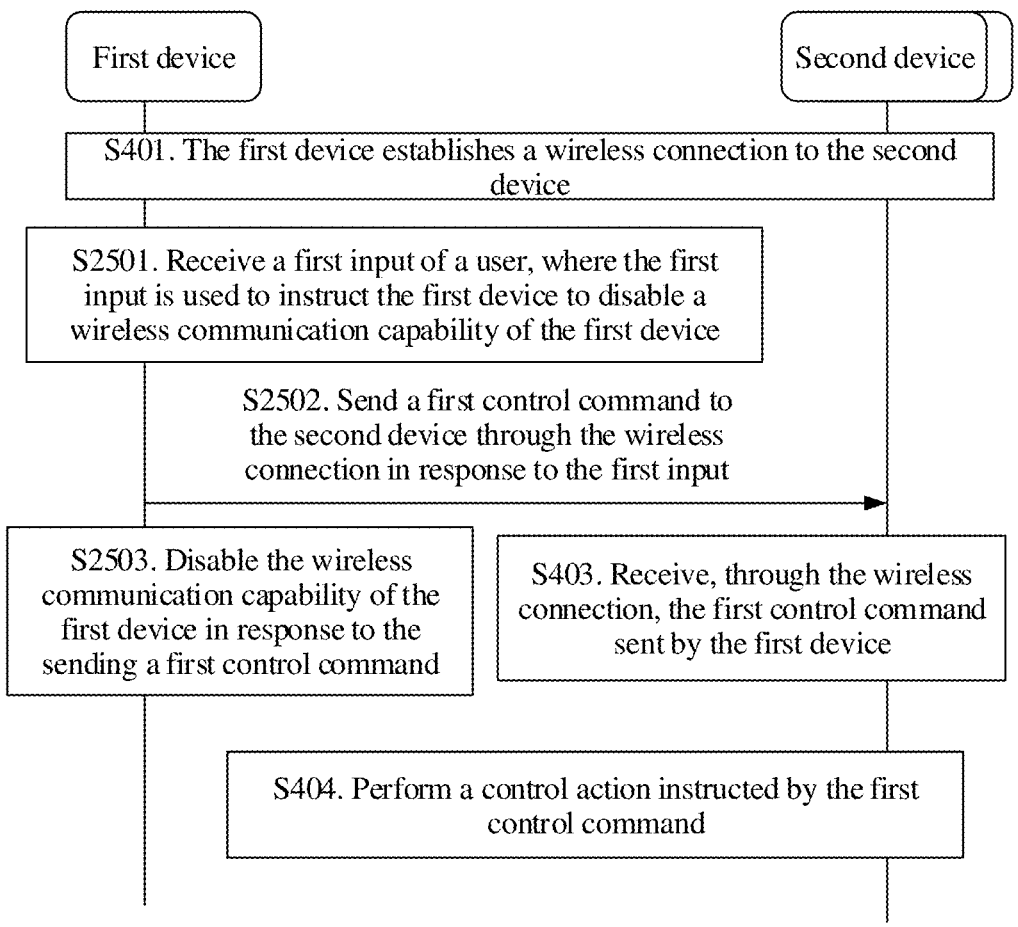
FIG. 25 is a flowchart of a device control method according to an embodiment of the present application.

Correspondingly, as shown in FIG. 25, S402 shown in FIG. 4 may be replaced with S2502:

S2502. The first device sends a first control command to the second device through a wireless short-range communication connection in response to the first input, where the first control command is used to instruct the second device to perform a control command.

S2503. The first device disables the wireless communication capability of the first device in response to the sending a first control command.

Figure 26A:
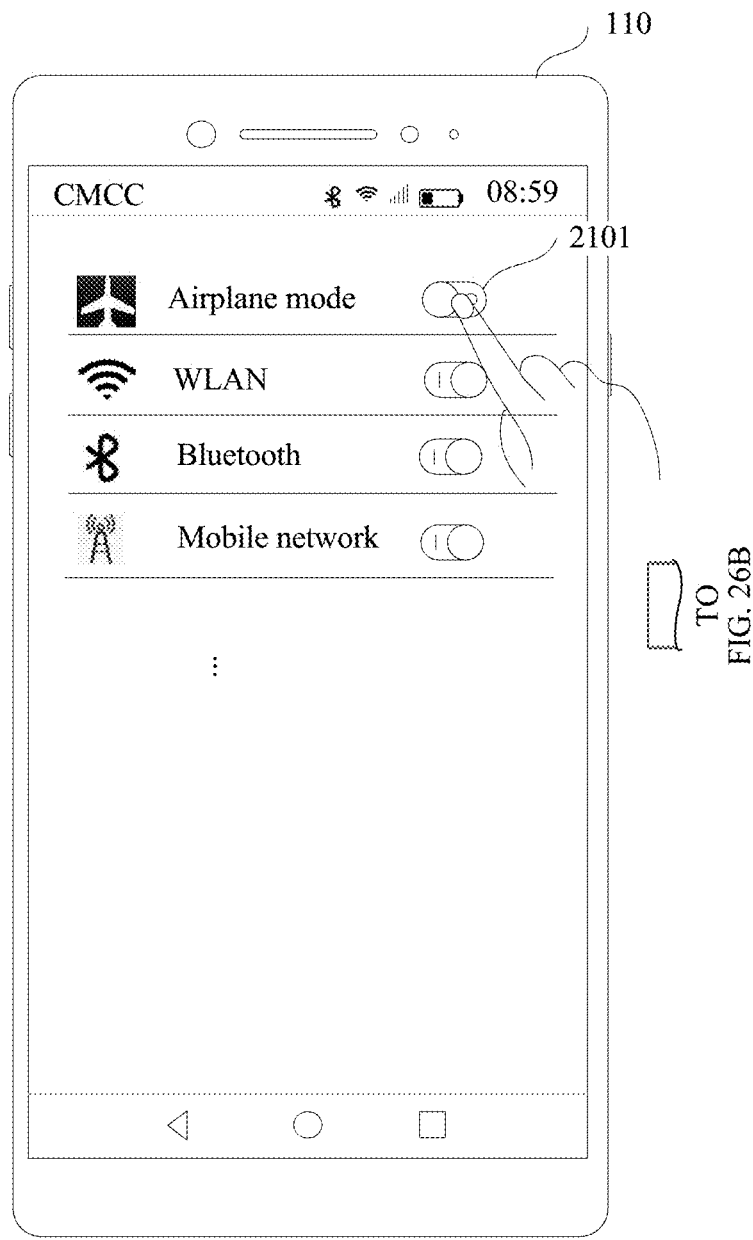
FIG. 26A, FIG. 26B, and FIG. 26C are a schematic diagram of a mobile phone display interface instance according to an embodiment of the present application.

For example, when the user slides on an "Airplane mode" option 2101 shown in FIG. 26A by using a finger, to enable the airplane mode of the mobile phone 110, the mobile phone 110 may directly send a first control command to all wireless devices (namely, the notebook computer 122, the tablet computer 121, and the Bluetooth band 123) that have wireless short-range communication connections to the mobile phone 110.

Figure 26B:
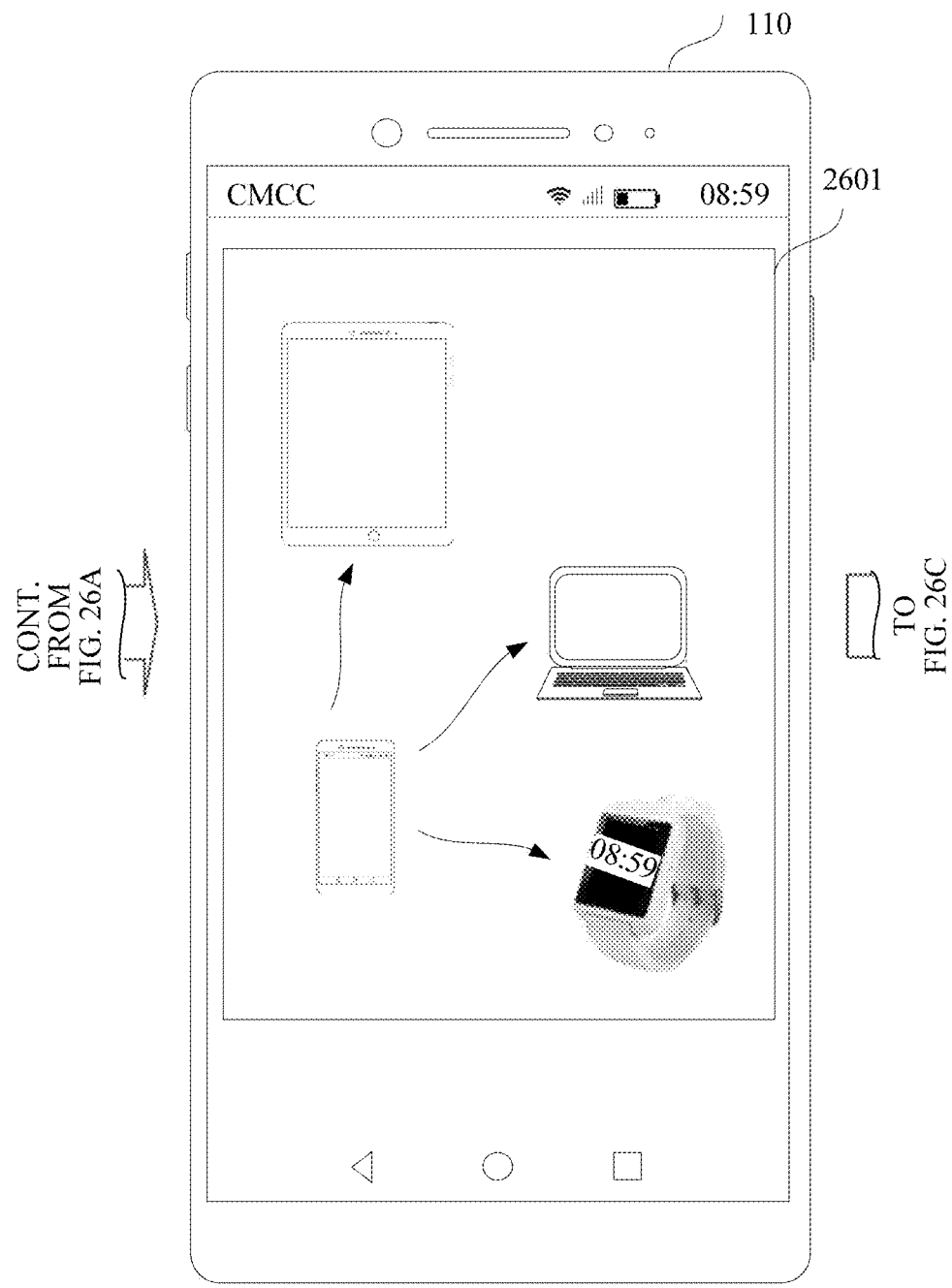
Figure 26C:
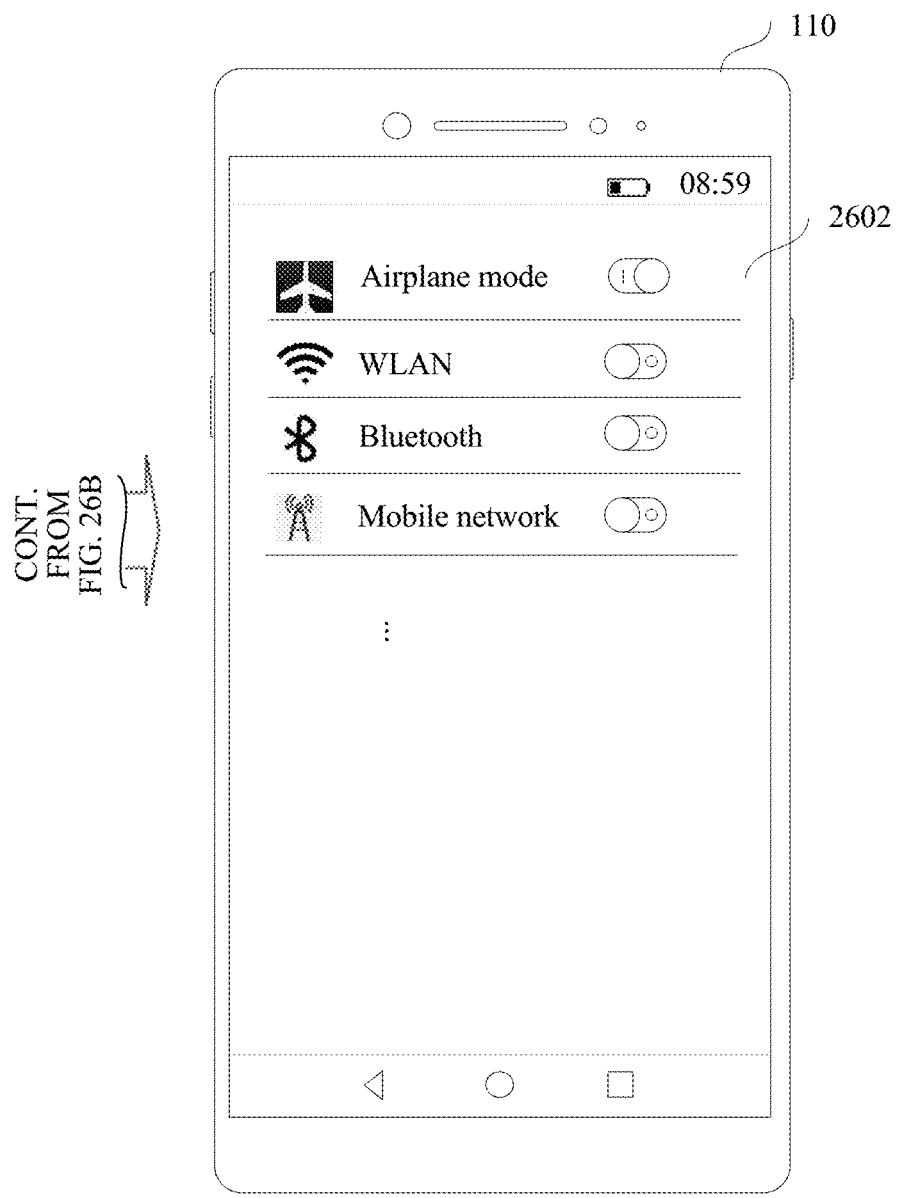

Optionally, when the user slides on an "Airplane mode" option 2101 shown in FIG. 26A by using a finger, to enable the airplane mode of the mobile phone 110, when sending the first control command to all wireless devices that have wireless short-range communication connections to the mobile phone 110, the mobile phone 110 may also display a "command sending interface" 2601 shown in FIG. 26B. In addition, after the mobile phone 110 displays the "command sending interface" 2601 shown in FIG. 26B for a specific time (for example, 5 seconds), the mobile phone 110 may display an "Airplane mode interface" 2602 shown in FIG. 26C. In the "Airplane mode interface" shown in FIG. 26C, the "Airplane mode" option is enabled, and a "WLAN" option, a "Bluetooth" option, and a "Mobile network" option are all disabled.

In different scenarios, the first device may control the second device to perform different operations (for example, disabling a wireless transmit capability, disabling a wireless receive capability and a wireless transmit capability, disabling a wireless receive capability, or powering off).

For example, in a process in which a user is taking an airplane, electromagnetic interference caused to the airplane by wireless devices carried by the user (the mobile phone 110, the notebook computer 122, the tablet computer 121, and the Bluetooth band 123 shown in FIG. 1) is mainly generated by transmitting radio signals by these wireless devices. Therefore, to reduce the electromagnetic interference caused to the airplane by the wireless devices carried by the user, before the airplane that the user is taking takes off, a first control command that is sent by the mobile phone 110 (namely, the first device) to the notebook 122, the tablet computer 121, and the Bluetooth band 123 (namely, the second device) under control of the user may be used to instruct the notebook 122, the tablet computer 121, and the Bluetooth band 123 to disable wireless transmit capabilities of the notebook 122, the tablet computer 121, and the Bluetooth band 123 within a time indicated by time information.

Figure 27:
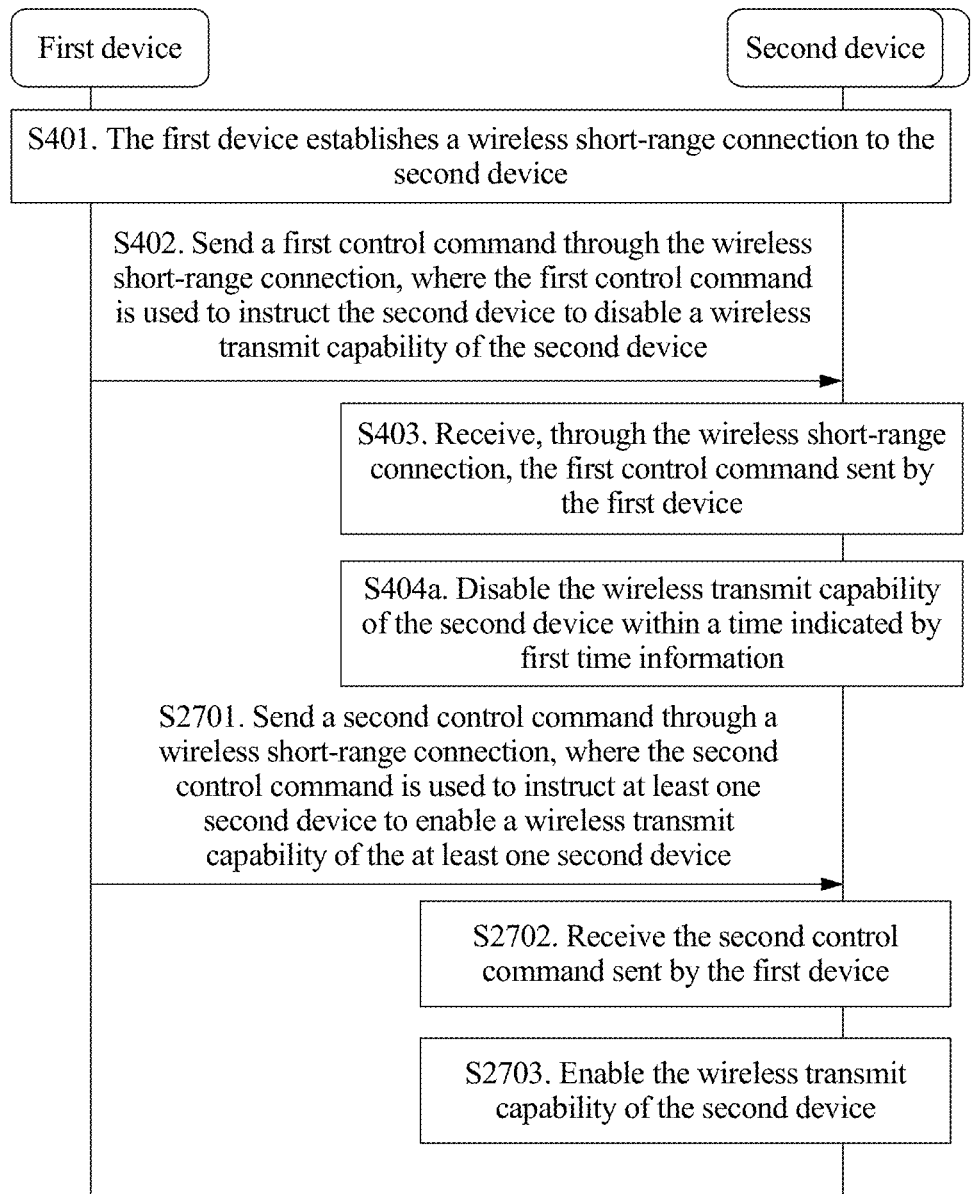
FIG. 27 is a flowchart of a device control method according to an embodiment of the present application.
Figure 28:
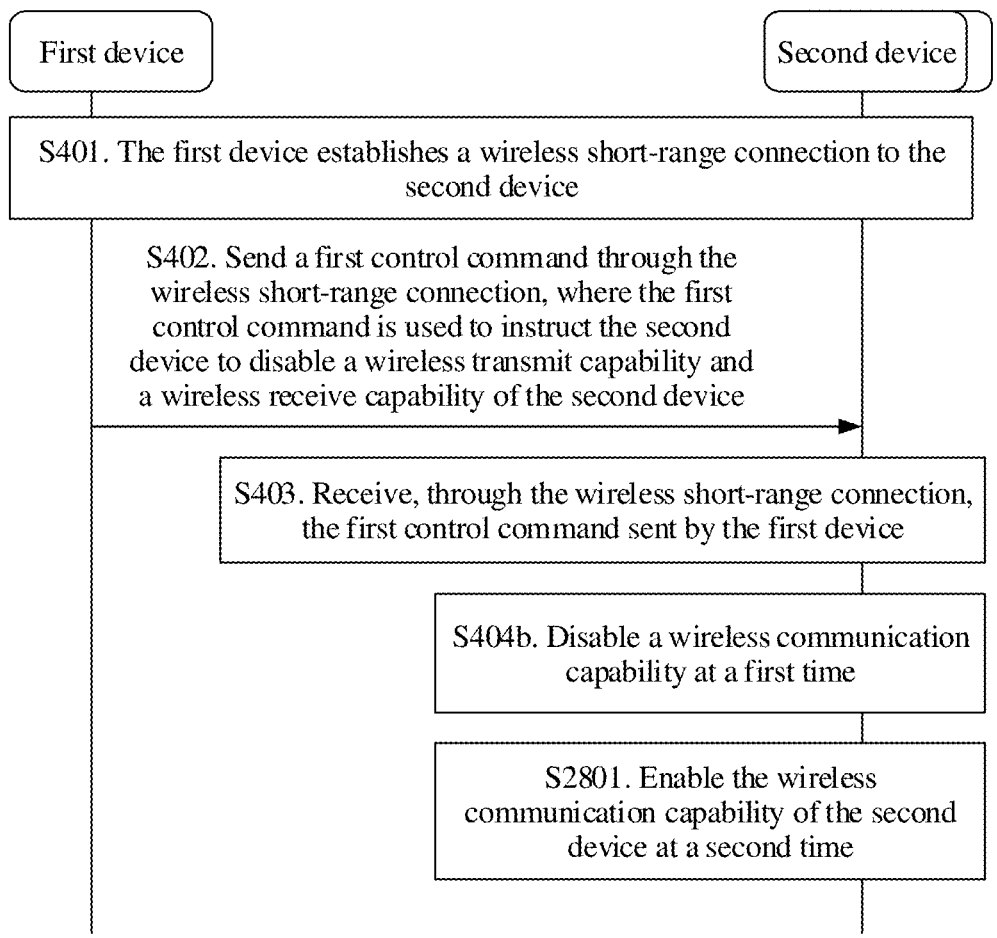
FIG. 28 is a flowchart of a device control method according to an embodiment of the present application.

To be specific, in a first implementation of this embodiment of the present application, the first control command may carry first indication information and time information, and the first indication information may be used to instruct the second device to disable a wireless transmit capability of the second device within a time indicated by the time information. Specifically, S404 may be replaced with S404a. For example, as shown in FIG. 27, S404 shown in FIG. 4 may be replaced with S404a:

S404a. The second device disables a wireless transmit capability of the second device within a time indicated by time information.

It may be understood that, in the first implementation, because the first indication information only instructs the second device to disable the wireless transmit capability of the second device within the time indicated by the time information, and does not instruct the second device to disable a wireless receive capability of the second device, the second device may further receive another device (for example, a command, a message, or other data sent by the first device). For example, the second device may further receive a second control command sent by the first device.

Specifically, because wireless receive capabilities of second devices are all enabled after the time indicated by the time information, the first device may send a second control command to at least one of the second devices after the time indicated by the time information, so as to instruct the at least one second device to enable a wireless transmit capability of the at least one second device. Specifically, as shown in FIG. 27, after S404a, the method in this embodiment of the present application may further include S2701 to S2703.

S2701. The first device sends a second control command to the second device through the wireless short-range communication connection, where the second control command is used to instruct the second device to enable the wireless transmit capability of the second device.

S2702. The second device receives the second control command sent by the first device.

S2703. The second device enables the wireless transmit capability of the second device.

Usually, during a takeoff of an airplane, relatively strong electromagnetic interference may be caused to the airplane when a wireless device uses a radio frequency Tx capability of the wireless device to transmit information, while relatively strong electromagnetic interference may not be caused to the airplane when the wireless device uses a Bluetooth transmit capability to send a signal. Therefore, the first indication information may be used to instruct the second device to disable the radio frequency Tx capability of the second device within the time indicated by the time information. Certainly, for security, the first indication information may be used to instruct the second device to disable the wireless transmit capability (including the radio frequency Tx capability, the Bluetooth transmit capability, and the like) of the second device within the time indicated by the time information.

Further, after the first device controls the second devices to disable wireless transmit capabilities of the second device, in some scenarios (for example, during a takeoff of an airplane), electromagnetic interference caused by the plurality of second devices for transmitting radio signals may be avoided.

Certainly, in a process in which the user is taking an airplane, receiving a radio signal by a wireless device carried by the user also causes electromagnetic interference to the airplane to some extent. To reduce the electromagnetic interference caused to the airplane by the wireless device carried by the user to a greater extent, a first control command sent by the mobile phone 110 to the notebook 122, the tablet computer 121, and the Bluetooth band 123 may be used to instruct the notebook 122, the tablet computer 121, and the Bluetooth band 123 to disable wireless transmit capabilities of the notebook 122, the tablet computer 121, and the Bluetooth band 123 within a time indicated by time information, and is also used to instruct the notebook 122, the tablet computer 121, and the Bluetooth band 123 to disable wireless receive capabilities of the notebook 122, the tablet computer 121, and the Bluetooth band 123 within the time indicated by the time information.

To be specific, in a second implementation of this embodiment of the present application, the first control command may carry second indication information and time information, and the second indication information is used to instruct the second device to disable a wireless transmit capability and a wireless receive capability of the second device within a time indicated by the time information.

Further, the time information may include a first time and a second time, and the second indication information may be further used to instruct the second device to disable a wireless communication capability at the first time and enable the wireless communication capability at the second time. For example, when the time information is 09:10:00-11:20:00, the first time is 09:10:00, and the second time is 11:20:00. Specifically, S404 shown in FIG. 4 may be replaced with S404b. After S404b, the method in this embodiment of the present application may further include S2801.

S404b. The second device disables the wireless communication capability at the first time.

S2801. The second device enables the wireless communication capability of the second device at the second time.

Optionally, to avoid electromagnetic interference caused to an airplane by a wireless device carried by the user when the user is on the airplane, a first control command sent by the mobile phone 110 to the notebook 122, the tablet computer 121, and the Bluetooth band 123 may be used to instruct the notebook 122, the tablet computer 121, and the Bluetooth band 123 to be powered off at the first time included in the time information. The time information includes the first time and the second time. For example, when the time information is 09:10:00-11:20:00, the first time is 09:10:00, and the second time is 11:20:00.

To be specific, in a third implementation of this embodiment of the present application, the first control command may carry third indication information or time information, and the third indication information is used to instruct the second device to be powered off within the time indicated by the time information.

Figure 29:
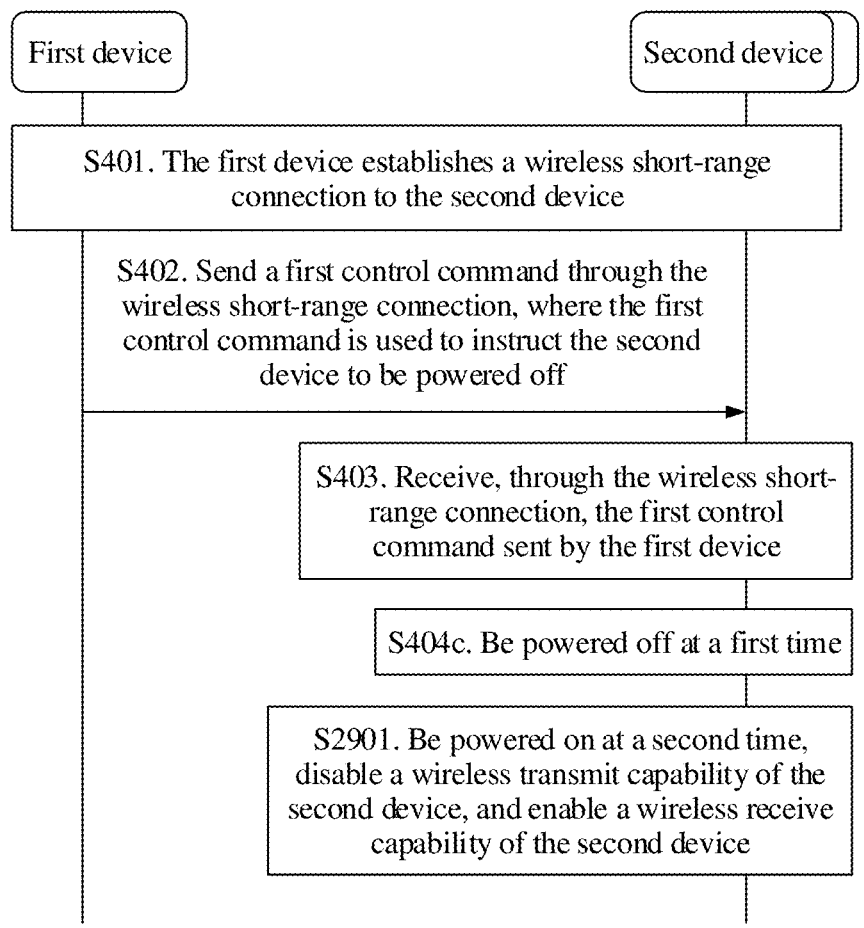
FIG. 29 is a flowchart of a device control method according to an embodiment of the present application.

Further, the third indication information may be used to instruct the second device to be powered on and disable a wireless transmit capability at the second time. Specifically, as shown in FIG. 29, S404 shown in FIG. 4 may be replaced with S404c. After S404c, the method in this embodiment of the present application may further include S2901.

S404c. The second device is powered off at the first time.

As shown in FIG. 29, after S404c, the method in this embodiment of the present application may further include S2901.

S2901. The second device is powered on at the second time, disables a wireless transmit capability of the second device, and enables a wireless receive capability of the second device.

Optionally, after S2901, the method in this embodiment of the present application may further include S2701 to S2703.

For example, when the user attends a conference/lecture or the user is taking a rest, if a wireless device carried by the user (the mobile phone 110, the notebook 122, the tablet computer 121, and the Bluetooth band 123 shown in FIG. 1) receives a signal sent by another wireless device, for example, an incoming call reminder, interference may be caused to the user. In this case, to avoid interference caused to the user for receiving a radio signal by a wireless device carried by the user, a first control command that is sent by the mobile phone 110 of the user to the notebook 122, the tablet computer 121, and the Bluetooth band 123 under control of the user may be used to instruct the notebook 122, the tablet computer 121, and the Bluetooth band 123 to disable wireless receive capabilities of the notebook 122, the tablet computer 121, and the Bluetooth band 123 within a time indicated by time information.

To be specific, in a fourth implementation of this embodiment of the present application, the first control command may carry fourth indication information or time information, and the fourth indication information is used to instruct the second device to disable the wireless receive capability of the second device within the time indicated by the time information.

For example, the first indication information, the second indication information, and the third indication information may be different indication information in a same field (such as a wireless control field) in the first control command.

For example, when the wireless control field is "00" (namely, the first indication information), the first control command is used to instruct the second device to disable the wireless transmit capability of the second device within the time indicated by the time information. When the wireless control field is "01" (namely, the second indication information), the first control command is used to instruct the second device to disable the wireless transmit capability and the wireless receive capability of the second device within the time indicated by the time information. When the wireless control field is "10" (namely, the third indication information), the first control command is used to instruct the second device to be powered off within the time indicated by the time information. When the wireless control field is "11" (namely, the fourth indication information), the first control command is used to instruct the second device to disable the wireless receive capability of the second device within the time indicated by the time information. Certainly, alternatively, the first indication information may be "01", the second indication information may be "00", and the third indication information may be "10". This is not limited in this embodiment of the present application.

In some embodiments, it is assumed that the first control command is sent by the first device in a "Master control" mode, the first indication information is "00", the second indication information is "01", and the third indication information is "10"; an effective time of the first control command is not limited.

When the first control command is used to instruct the second device to disable the wireless transmit capability of the second device within the time indicated by the time information, for detailed content of the first control command, refer to a control command shown in Table 1 below:

TABLE 1

| First control command | | |
|---|---|---|
| Control action (first indication information) | Time information | Wireless device identifier |
| 00 | 00:00:00-FF:FF:FF | FF:FF:FF:FF:FF:FF |

That the time information is "00:00:00-FF:FF:FF" is used to indicate that the effective time of the first control command is not limited. For example, because the time information is "00:00:00-FF:FF:FF", after the second device disables the wireless transmit capability of the second device, the wireless transmit capability of the second device needs to remain disabled until the user manually enables the wireless transmit capability of the second device.

That the wireless device identifier is "FF:FF:FF:FF:FF:FF" is used to indicate that the first control command is sent to all wireless devices that have wireless short-range communication connections to the first device. If a wireless device that receives the first control command determines that the wireless device identifier is "FF:FF:FF:FF:FF:FF", it may be determined that the first control command is sent to the wireless device, and then the wireless device may perform a control action instructed by the first control command.

When the effective time of the first control command is not limited, and the first control command is used to instruct the second device to disable the wireless transmit capability and the wireless receive capability of the second device within the time indicated by the time information, for detailed content of the first control command, refer to a control command shown in Table 2 below:

TABLE 2

| First control command | | |
|---|---|---|
| Control action (first indication information) | Time information | Object device identifier |
| 01 | 00:00:00-FF:FF:FF | FF:FF:FF:FF:FF:FF |

When the effective time of the first control command is not limited, and the first control command is used to instruct the second device to be powered off within the time indicated by the time information, for detailed content of the first control command, refer to a control command shown in Table 3 below:

TABLE 3

| First control command | | |
|---|---|---|
| Control action (first indication information) | Time information | Object device identifier |
| 10 | 00:00:00-FF:FF:FF | FF:FF:FF:FF:FF:FF |

In other embodiments, in a "Device-based control" mode, the object device identifier carried in the first control command may be an identifier of a second device that is specified by the user to receive the first control command, and the identifier of the second device may be any one of information that may uniquely identify the second device, such as an internet protocol (Internet Protocol, IP) address and a media access control (Media Access Control, MAC) address of the second device.

It is assumed that the first control command is sent by the first device in the "Device-based control" mode, the first indication information is "00", the second indication information is "01", and the third indication information is "10". The time information is "09:10:00-11:20:00". The first device is the mobile phone 110 shown in FIG. 1, and a wireless device to which the user chooses to send the first control command includes the notebook computer 122 and the tablet computer 121 shown in FIG. 1. A device identifier of the notebook computer 122 is 35:AB:25:66:EF:20, and a device identifier of the tablet computer 121 is 35:AB:25:66:EF:88.

When the first control command is used to instruct the second device to disable the wireless transmit capability of the second device within the time indicated by the time information, for detailed content of the first control command, refer to a control command shown in Table 4 below:

TABLE 4

| First control command | | |
|---|---|---|
| Control action (first indication information) | Time information | Object device identifier |
| 00 | 09:10:00-11:20:00 | 35:AB:25:66:EF:20 35:AB:25:66:EF:88 |

When the first control command (namely, the second indication information) is used to instruct the second device to disable the wireless transmit capability and the wireless receive capability of the second device within the time indicated by the time information, for detailed content of the first control command, refer to a control command shown in Table 5 below:

TABLE 5

| First control command | | |
|---|---|---|
| Control action (first indication information) | Time information | Object device identifier |
| 01 | 09:10:00-11:20:00 | 35:AB:25:66:EF:20 35:AB:25:66:EF:88 |

When the first control command (namely, the third indication information) is used to instruct the second device to be powered off within the time indicated by the time information, for detailed content of the first control command, refer to a control command shown in Table 6 below:

TABLE 6

First control command

| Control action (first indication information) | Time information | Object device identifier |
|---|---|---|
| 10 | 09:10:00-11:20:00 | 35:AB:25:66:EF:20 35:AB:25:66:EF:88 |

Further, the wireless transmit capability may include a radio frequency Tx capability, a WiFi transmit capability, and a Bluetooth transmit capability, and the wireless receive capability may include a radio frequency Rx capability, a WiFi receive capability, and a Bluetooth receive capability.

Based on this case, the first control command may further include a field used to distinguish a wireless communication capability. For example, when the field used to distinguish a wireless communication capability (simply referred to as a capability distinguishing field) is 000, it may indicate that the wireless communication capability is a radio frequency capability (a radio frequency Tx capability and/or a radio frequency Rx capability); when the capability distinguishing field is 001, it may indicate that the wireless communication capability includes a radio frequency capability and a WiFi capability (a WiFi transmit capability and/or a WiFi receive capability); when the capability distinguishing field is 010, it may indicate that the wireless communication capability includes a radio frequency capability and a Bluetooth capability (a Bluetooth transmit capability and/or a Bluetooth receive capability); when the capability distinguishing field is 100, it may indicate that the wireless communication capability includes a radio frequency capability, a Bluetooth capability, and a WiFi capability.

For example, it is assumed that the capability distinguishing field is 000, and the first control command shown in Table 5 is used as an example. For detailed content of the first control command, refer to a control command shown in Table 7 below:

TABLE 7

First control command

| Control action (first indication information) | Time information | Object device identifier | Capability distinguishing field |
|---|---|---|---|
| 01 | 09:10:00-11:20:00 | 35:AB:25:66:EF:20 35:AB:25:66:EF:88 | 000 |

Because the first indication information is "01", the first control command shown in Table 7 is used to instruct the notebook computer 122 and the tablet computer 121 to disable wireless transmit capabilities and wireless receive capabilities of the notebook computer 122 and the tablet computer 121. In addition, because the capability distinguishing field shown in Table 7 is "000", the capability distinguishing field may be used to indicate that the wireless transmit capability and the wireless receive capability are respectively a radio frequency Tx capability and a radio frequency Rx capability. In conclusion, the first control command shown in Table 7 is used to instruct the notebook computer 122 and the tablet computer 121 to disable a radio frequency Tx capability and a radio frequency Rx capability of the notebook computer 122 and the tablet computer 121 within the time interval 09:10:00-11:20:00.

Optionally, the first control command shown in Table 7 may be further used to instruct the notebook computer 122 and the tablet computer 121 to enable radio frequency Rx capabilities of the notebook computer 122 and the tablet computer 121 at a moment 11:20:01.

Further, in an application scenario of this embodiment of the present application, the first device may send a second control command to at least one of second devices when the first device is powered on. Specifically, before S2701, the method in this embodiment of the present application may further include S3001, and S2701 may be replaced with S3002.

S3001. The first device is powered on in response to a fourth input of the user.

The fourth input may be a power on instruction of the first device. For example, the fourth input may be a touch and hold instruction for a lock screen key of the mobile phone 110 after the mobile phone 110 is powered off.

S3002. The first device establishes a wireless short-range communication connection to the second device in response to the power-on, and sends a second control command to the second device through the wireless short-range communication connection.

Figure 30A:
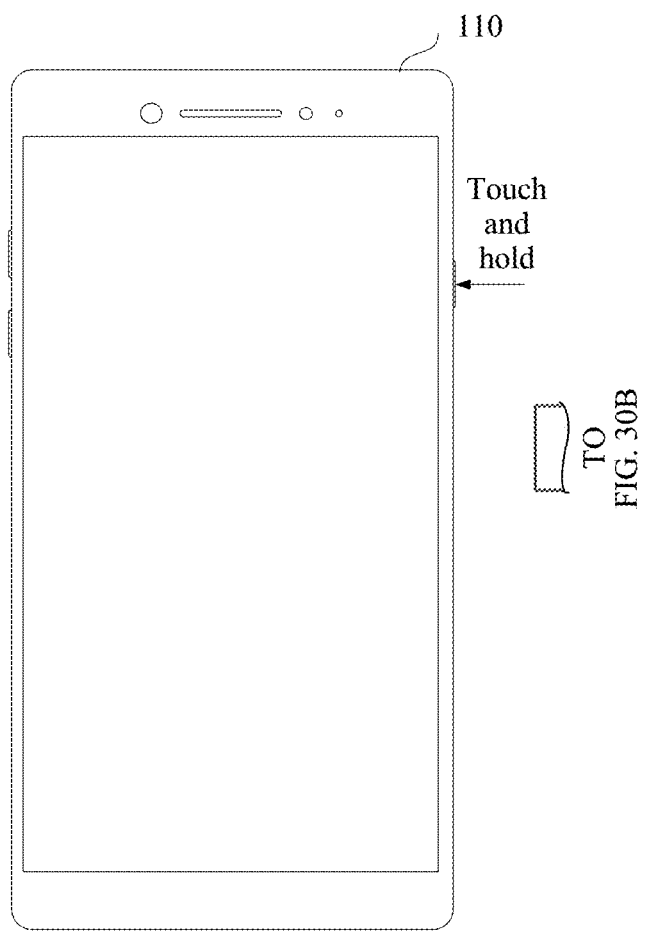
FIG. 30A, FIG. 30B, FIG. 30C, and FIG. 30D are a schematic diagram of a mobile phone display interface instance according to an embodiment of the present application.
Figure 30B:
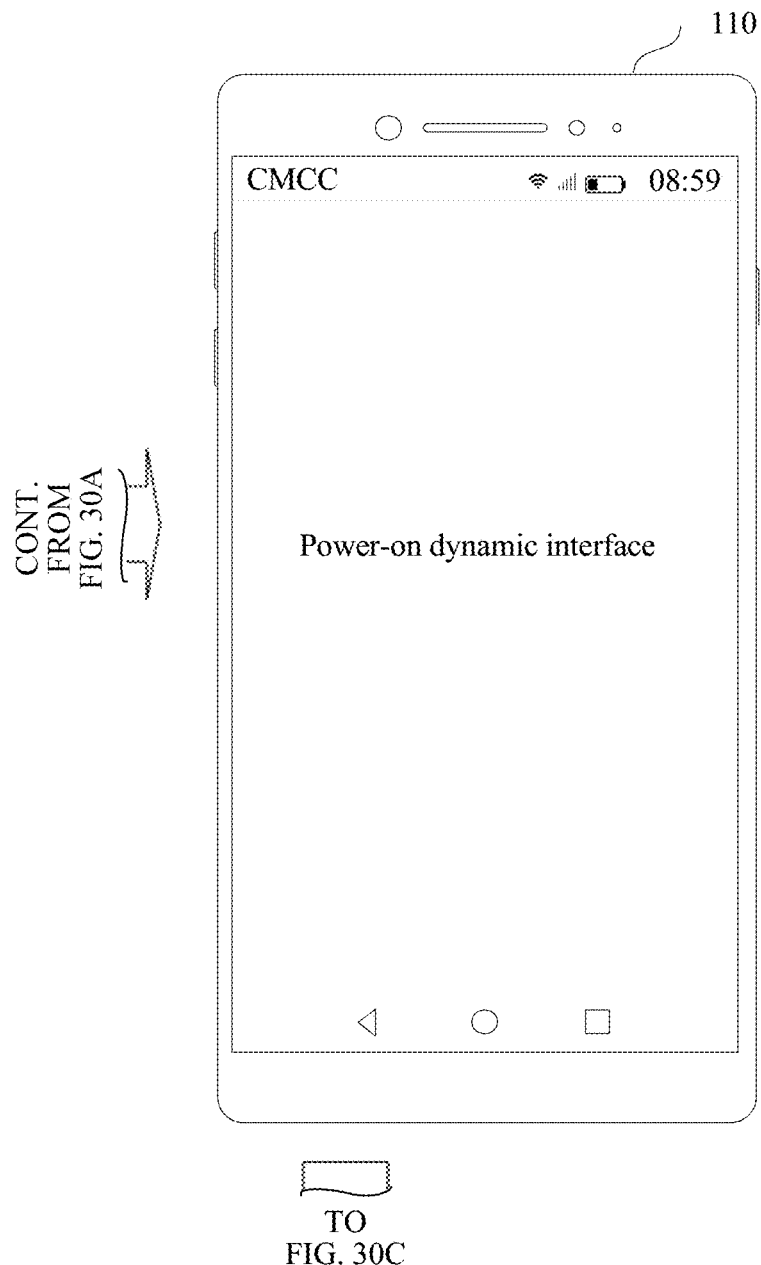

For example, when the mobile phone 110 receives a power on instruction (as shown in FIG. 30A, an instruction triggered by a touch and hold operation performed by the user on a lock screen key of the mobile phone 110), the mobile phone 110 is powered on and starts up and displays a power-on dynamic interface shown in FIG. 30B. The mobile phone 110 may establish a wireless short-range communication connection to the second device after power-on, and may send a second control command to all wireless devices (namely, the notebook computer 122, the tablet computer 121, and the Bluetooth band 123) that have wireless short-range communication connections to the mobile phone 110 in response to the power on operation.

Figure 30C:
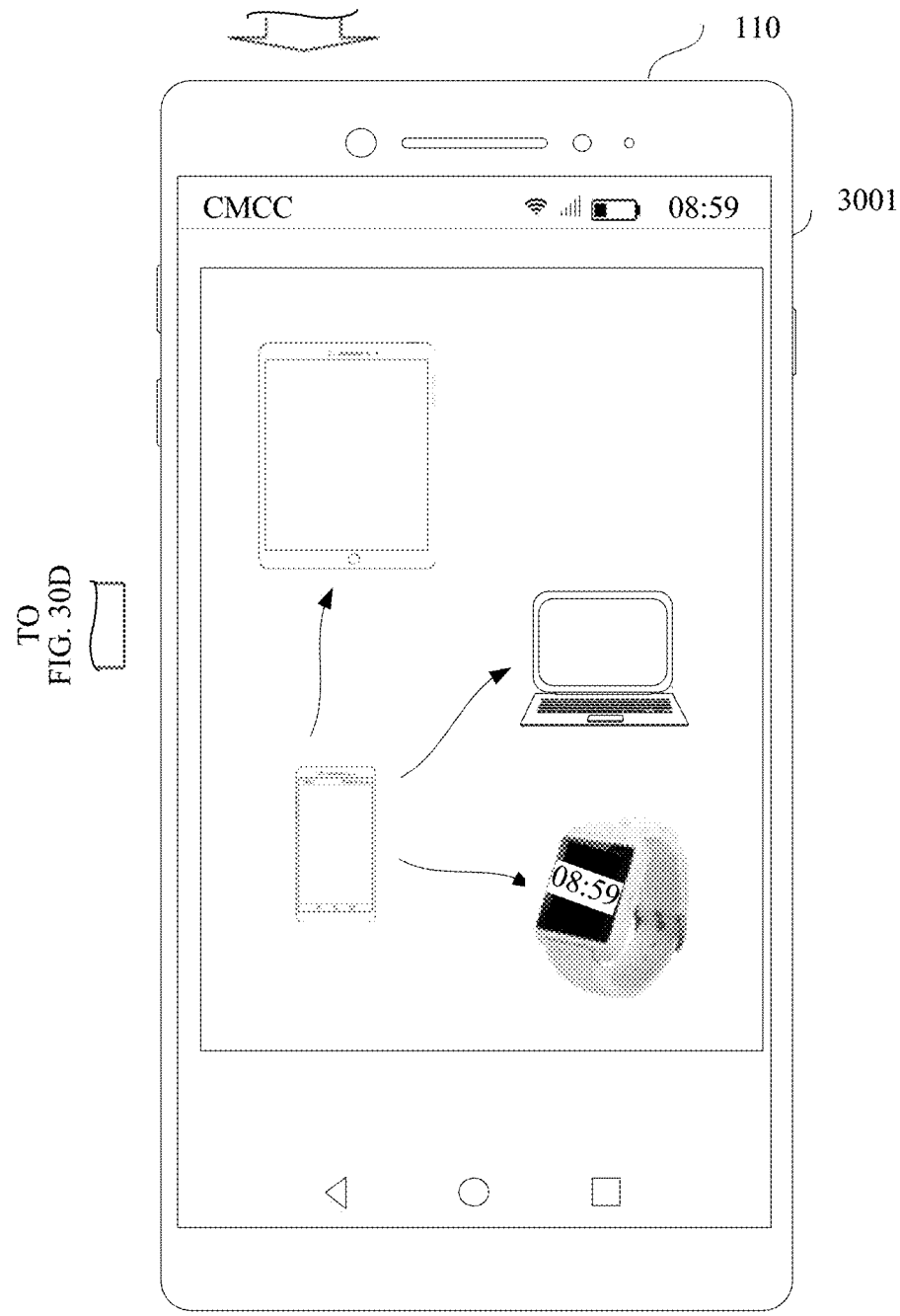
Figure 30D:

Optionally, the mobile phone 110 may further respond to the power on operation, to display a "control sending interface" 3001 shown in FIG. 30C after displaying the power-on dynamic interface shown in FIG. 30B. The mobile phone 110 may display a terminal interface shown in FIG. 30D after displaying the "command sending interface" 3001 shown in FIG. 30C for a specific time.

It should be noted that S3001 may be performed after S1701 or S1901, in other words, S3001 and S3002 may be performed after the first device sends the first control command and is powered off. Alternatively, regardless of whether S1701 or S1901 and related method steps thereof are performed, the first device may perform S3002 after power-on, in other words, regardless of whether S1701 or S1901 and related method steps thereof are performed, the first device may perform S3001 and S3002.

Figure 31A:
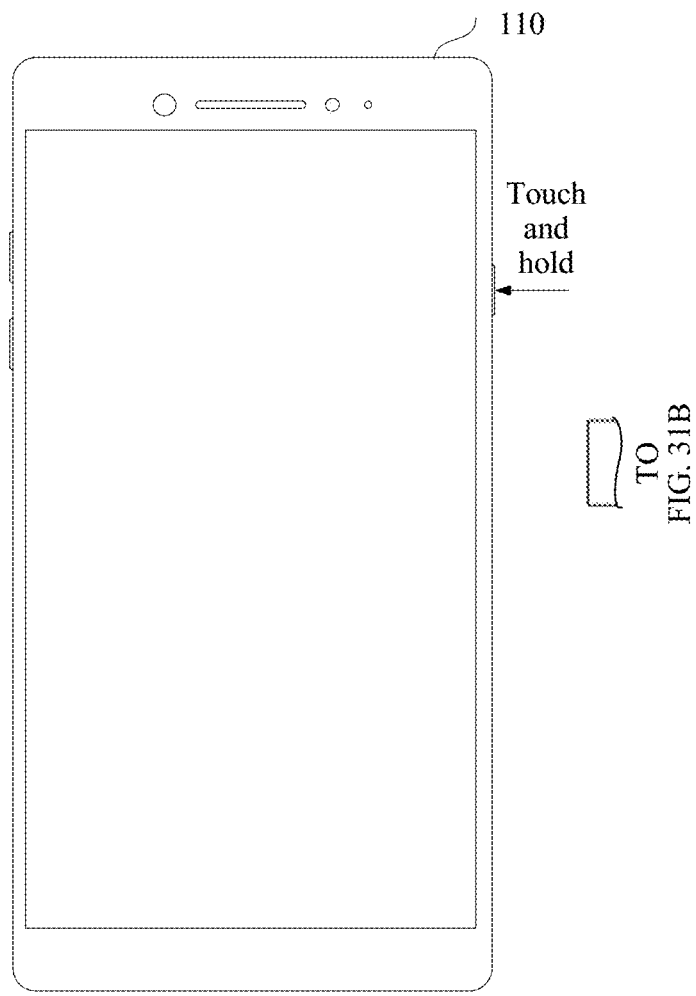
FIG. 31A, FIG. 31B, FIG. 31C, and FIG. 31D are a schematic diagram of a mobile phone display interface instance according to an embodiment of the present application.
Figure 31B:
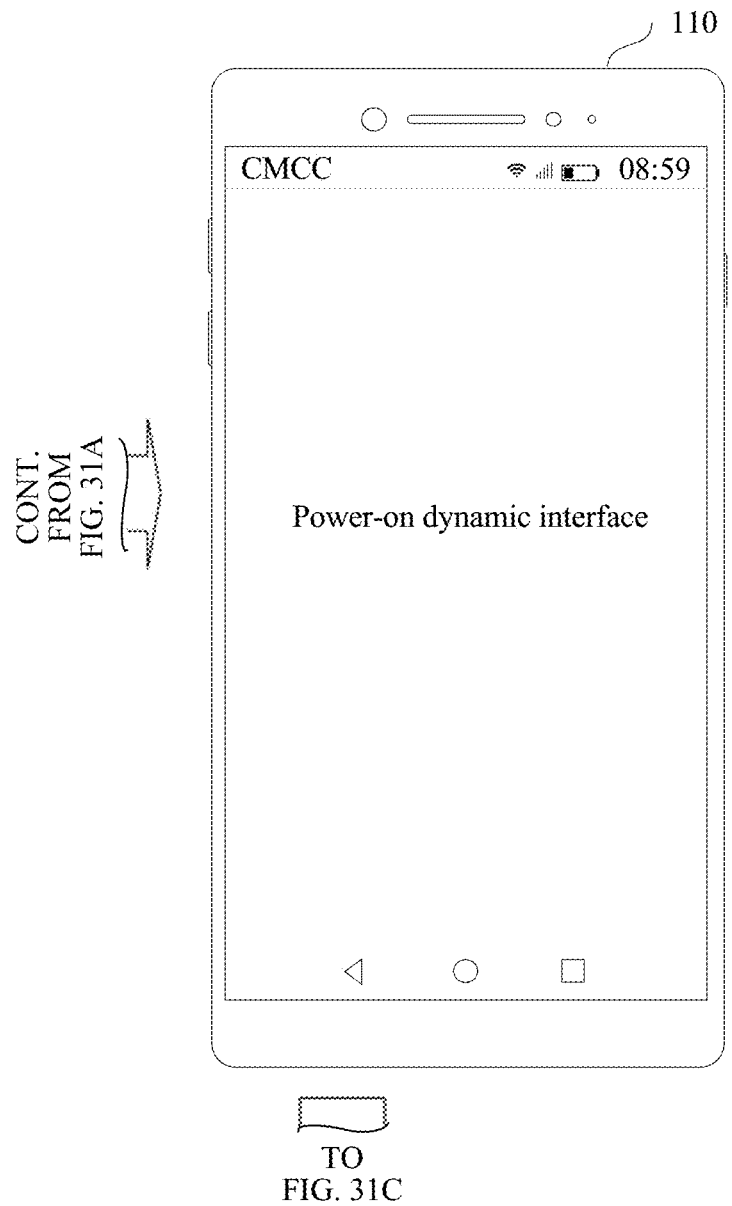
Figure 31C:
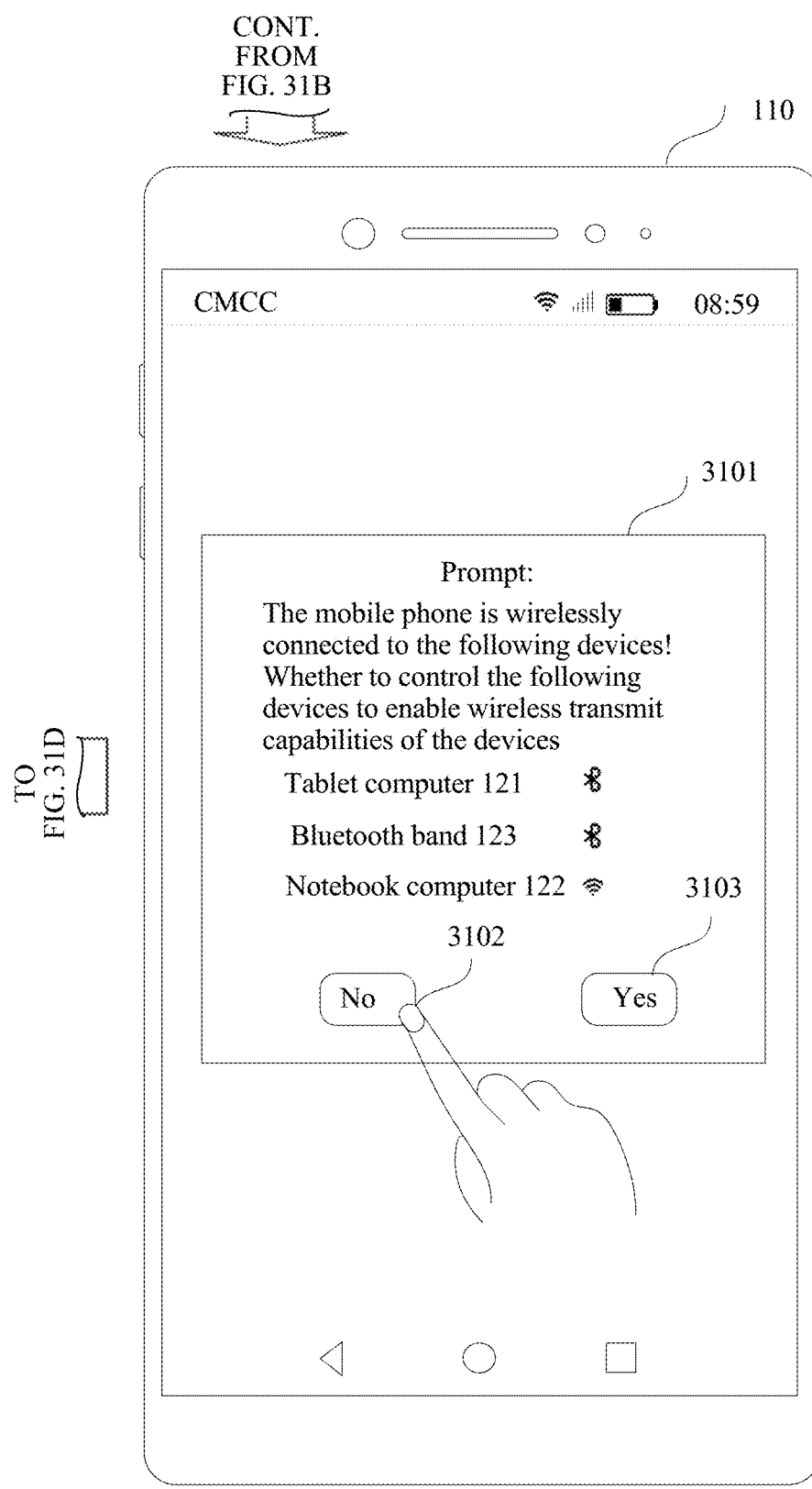
Figure 31D:
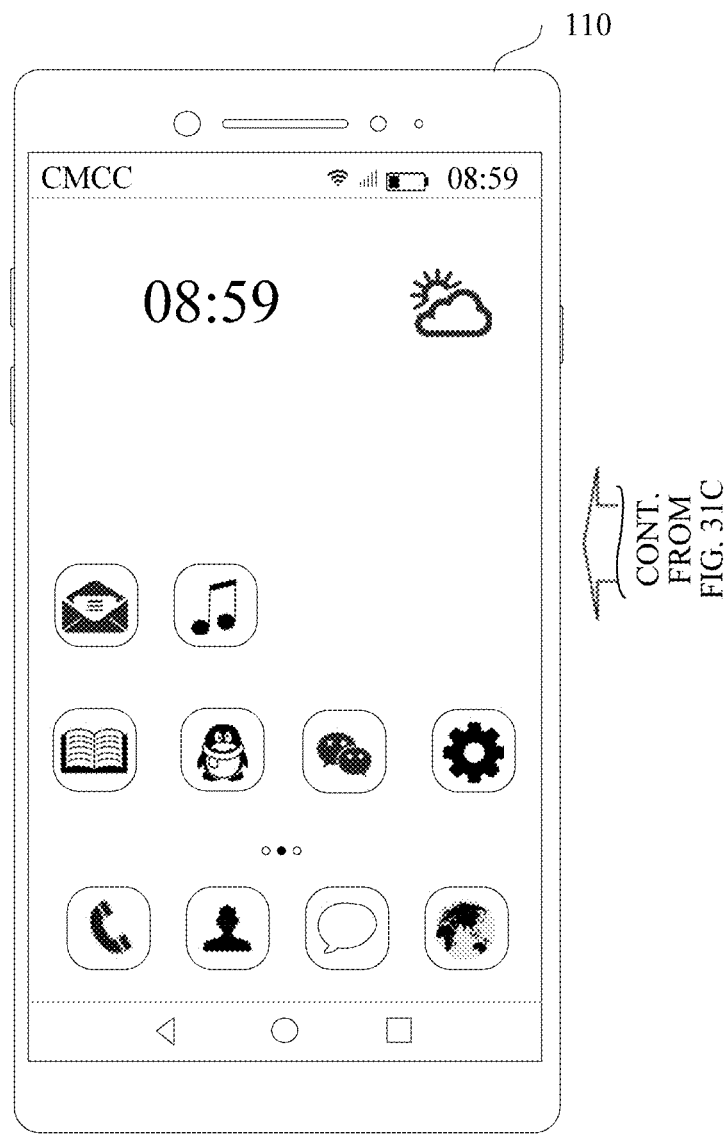
Figure 32A:
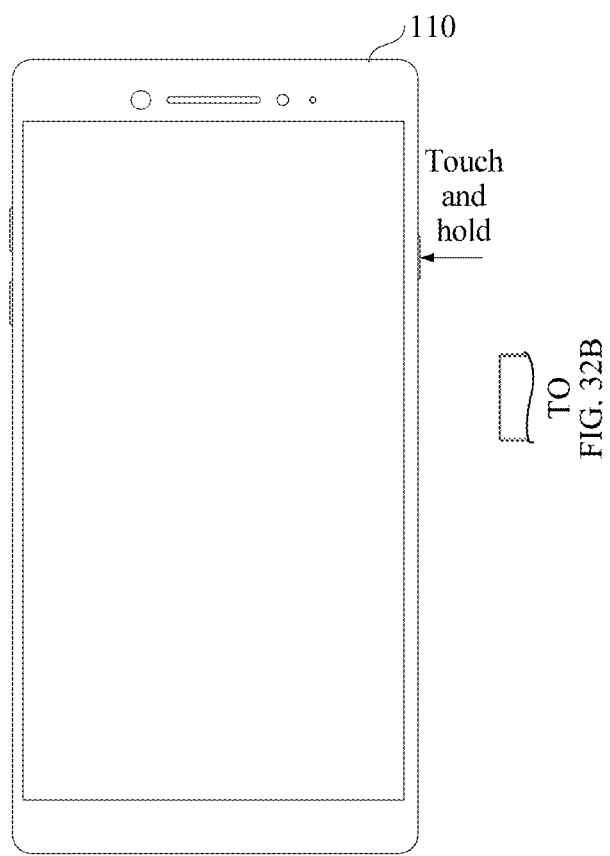
FIG. 32A, FIG. 32B, FIG. 32C, and FIG. 32D are a schematic diagram of a mobile phone display interface instance according to an embodiment of the present application.
Figure 32B:
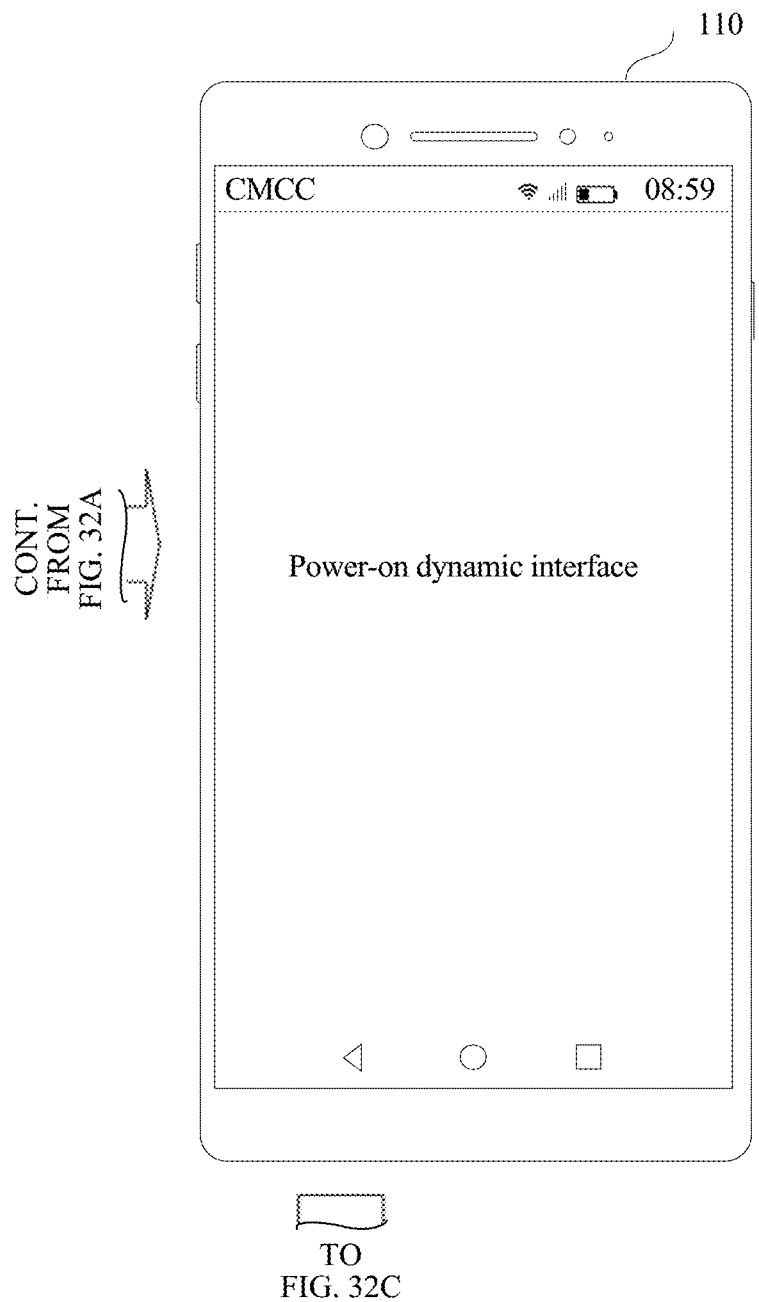
Figure 32C:
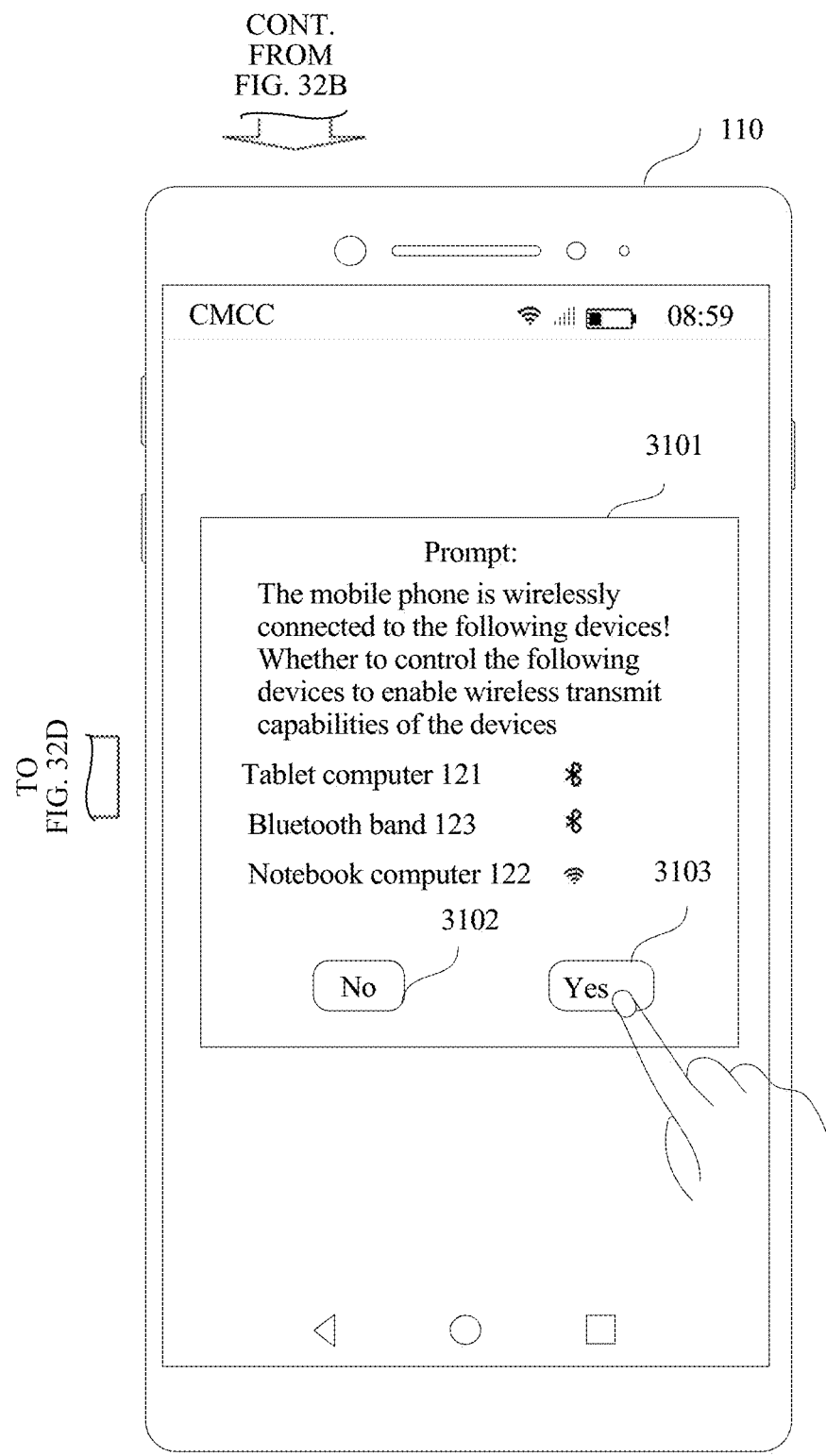

Optionally, the mobile phone 110 may further respond to the power on operation, to display a "control prompt interface" 3101 shown in FIG. 31C after displaying a power-on dynamic interface shown in FIG. 31B. When the user taps a "No" option 3102 on the "control prompt interface" 3101 shown in FIG. 31C by using a finger, the mobile phone 110 may display a terminal interface shown in FIG. 31D. When the user taps a "Yes" option 3103 on a "control prompt interface" 3101 shown in FIG. 32C by using a finger, the mobile phone 110 may display a "Wireless device control interface" shown in FIG. 32D.

Figure 32D:
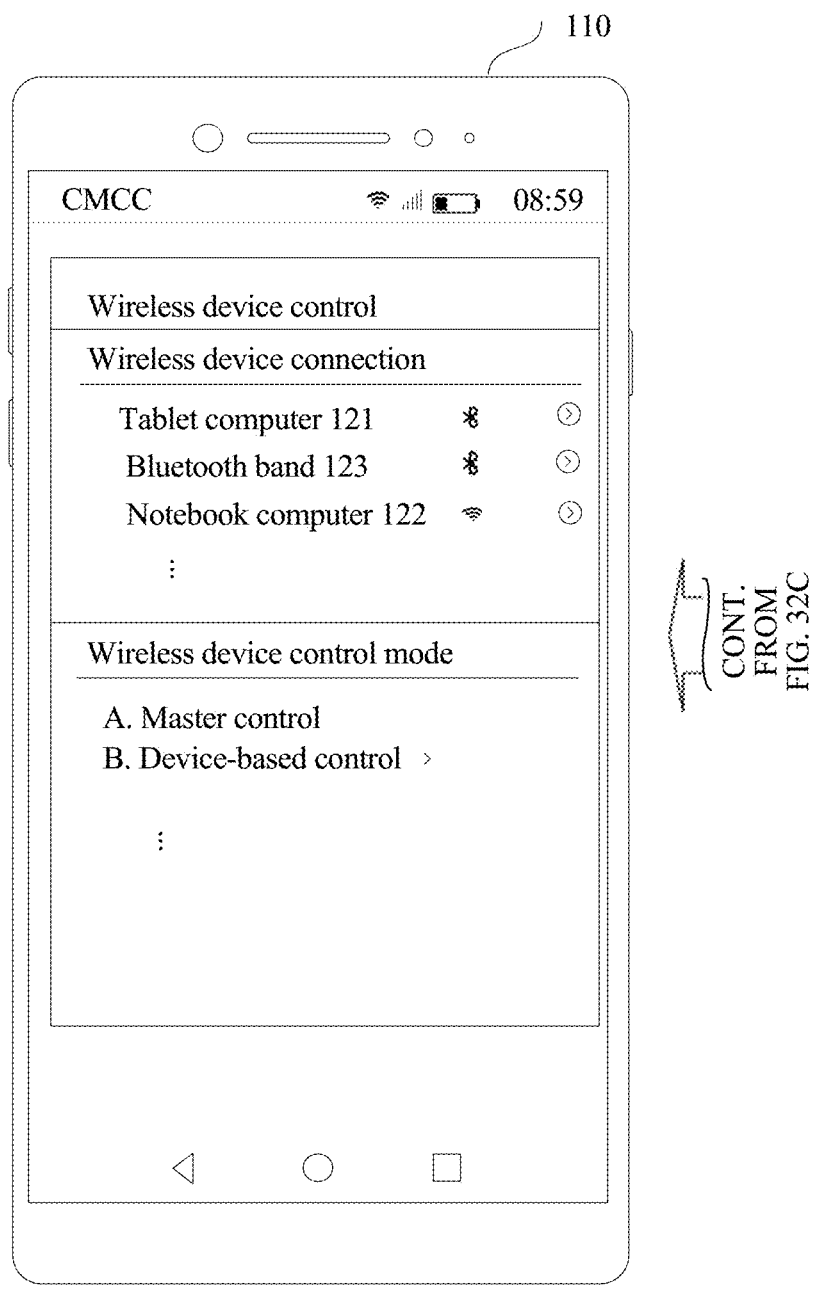

It should be noted that for a specific method in which the user controls the mobile phone 110 to send the second control command to the second device through the "Wireless device control interface" shown in FIG. 32D, refer to related descriptions about sending the first control command by the mobile phone 110 in FIG. 10A, FIG. 10B, FIG. 10C, FIG. 11A, and FIG. 11B in the embodiment of the present application. Details are not described herein again in this embodiment of the present application.

Figure 33A:
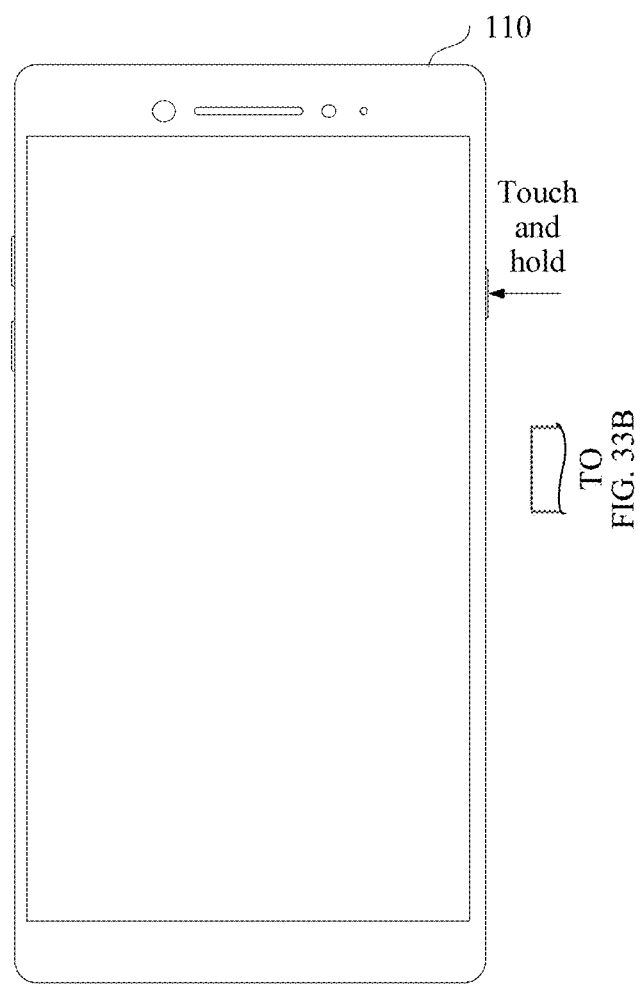
FIG. 33A, FIG. 33B, FIG. 33C, and FIG. 33D are a schematic diagram of a mobile phone display interface instance according to an embodiment of the present application.
Figure 33B:
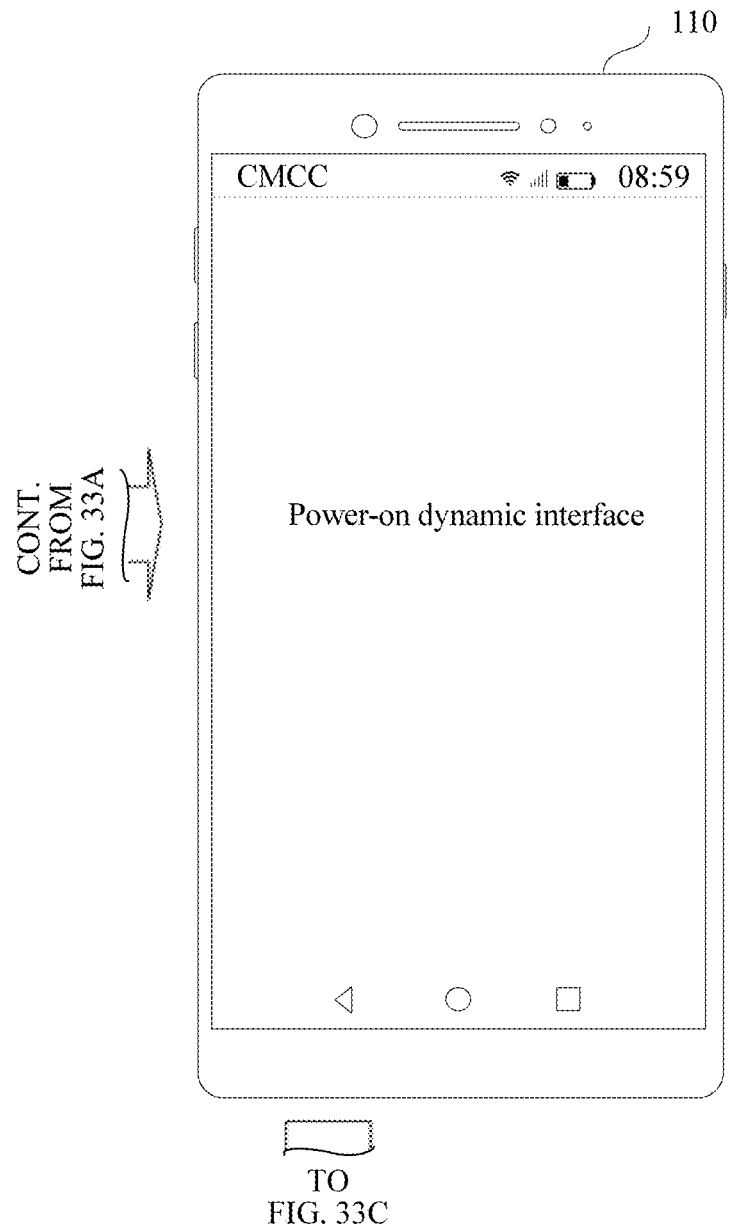
Figure 33C:
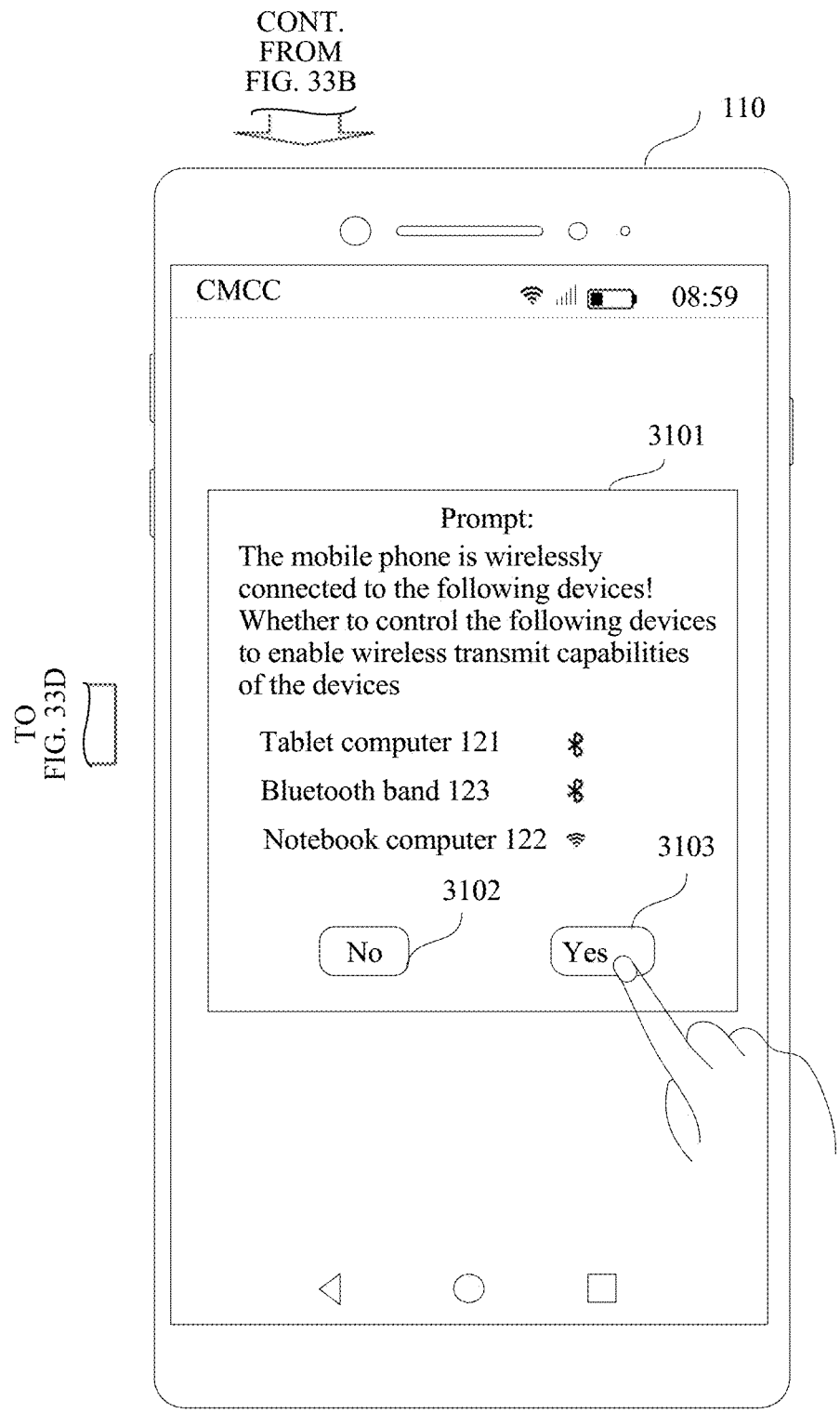
Figure 33D:
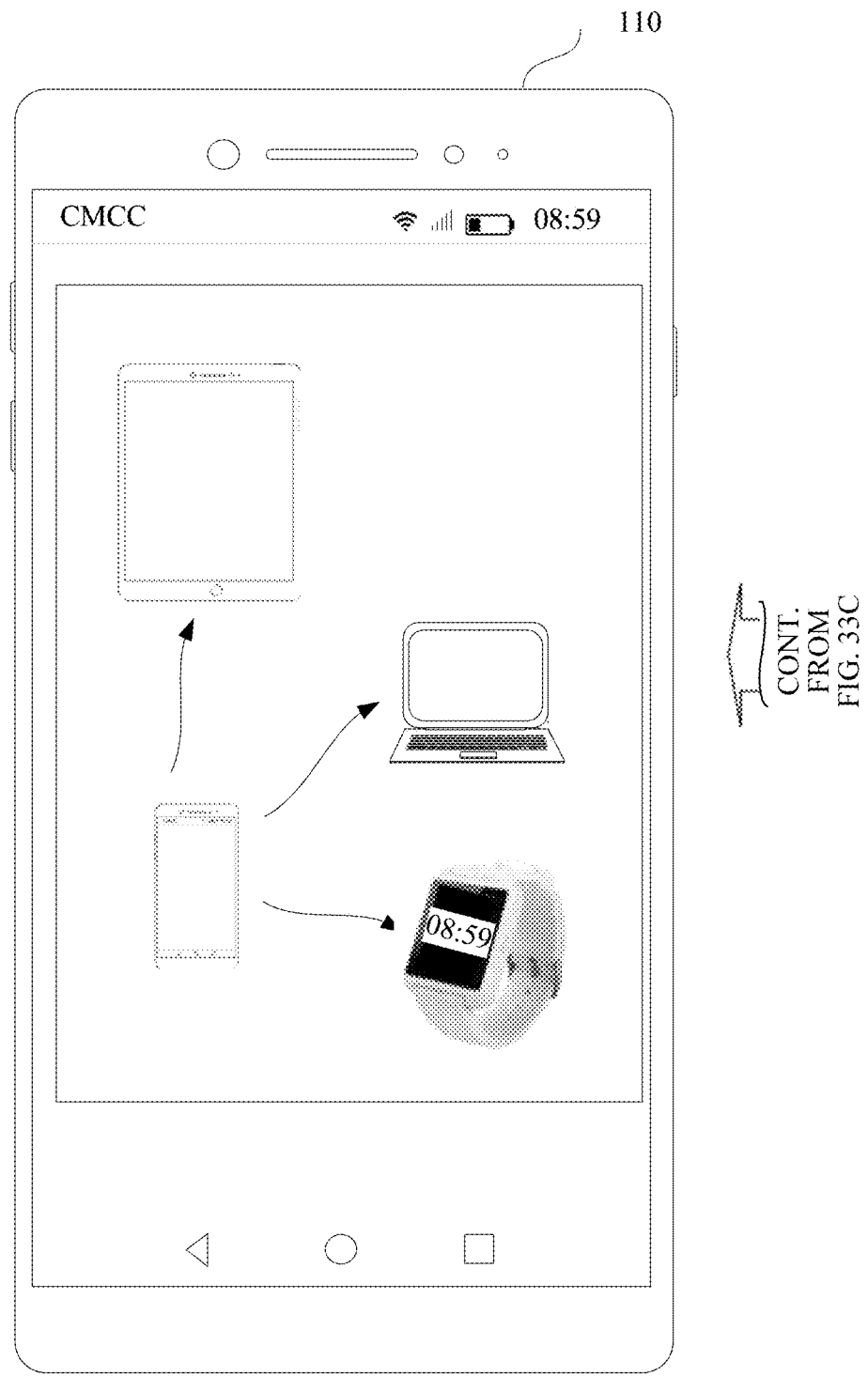

Optionally, the mobile phone 110 may further respond to the power on operation, to display a "control prompt interface" 3101 shown in FIG. 33C after displaying a power-on dynamic interface shown in FIG. 33B. When the user taps a "Yes" option 3103 in the "control prompt interface" 3101 shown in FIG. 33C by using a finger, the mobile phone 110 may directly display a "command sending interface" 3001 shown in FIG. 33D, instead of displaying the "Wireless device control interface" shown in FIG. 32D. The mobile phone 110 may display the terminal interface shown in FIG. 31D after displaying the "command sending interface" 3001 shown in FIG. 33D for a period of time (for example, S seconds).

Optionally, in another application scenario of this embodiment of the present application, the first device may further send a second control command to the second device when the user enables a wireless communication capability (for example, a wireless transmit capability) of the first device. Specifically, before S2701, the method in this embodiment of the present application may further include S3101, and S2701 may be replaced with S3102.

S3101. The first device enables the wireless transmit capability of the first device in response to a fifth input of the user.

S3102. The first device sends the second control command to the second device through a wireless short-range communication connection in response to the enabling the wireless transmit capability of the first device.

It should be noted that for a method in which the first device sends the second control command to the second device when the user enables the wireless communication capability of the first device, refer to a detailed description in which the first device sends the first control command when the user disables the wireless communication capability of the first device in this embodiment of the present application. Details are not described herein again in this embodiment of the present application.

Optionally, in another application scenario of this embodiment of the present application, the user may further control, by using the foregoing first application, the first device to send a second control command to the second device. Specifically, before S2701, the method in this embodiment of the present application may further include S3201 and S3202, and S2701 may be replaced with S3203.

S3201. The first device displays a first interface in response to a sixth input, where the first interface includes a device connection window, and the device connection window is used to select, from all second devices that have wireless short-range communication connections to the first device, a device that needs to receive the second control command.

The sixth input is a start instruction of the first application, and the first interface is a display interface of the first application.

S3202. The first device receives a seventh input of the user in the first interface, where the seventh input is used to determine a device that needs to receive the second control command.

S3203. The first device sends the second control command to a second device through a wireless short-range communication connection in response to the seventh input.

It should be noted that, for a method for controlling, by using the first application, the first device to send the second control command to the second device, refer to the detailed description of the method for "controlling, by using the first application, the first device to send the first control command to the second device". Details are not described herein again in this embodiment of the present application.

A difference is that a control action field in the second control command may be used to instruct the second device to enable a wireless transmit capability of the second device. For example, the control action field in the second control command may be "11". Based on the first control command shown in Table 4, for detailed content of the second control command, refer to a control command shown in Table 8 below.

TABLE 8

| | Second control command | | |
|---|---|---|
| Control action | Second time information | Object device identifier |
| 11 | FF:FF:FF-FF:FF:FF | 35:AB:25:66:EF:20 35:AB:25:66:EF:88 |

Further, in an application scenario of this embodiment of the present application, the device control method may be applied to the network architecture shown in FIG. 2. In FIG. 2, the mobile phone 110 establishes a wireless short-range communication connection to each of the tablet computer 121, the notebook computer 122, and the Bluetooth band 123, and the tablet computer 121 further establishes a wireless short-range communication connection to the Bluetooth headset 124. In this case, the mobile phone 110 may interact with the tablet computer 121, the notebook computer 122, and the Bluetooth band 123 to obtain an identifier of another device (a device other than the mobile phone 110) that has wireless short-range communication connections to the tablet computer 121, the notebook computer 122, and the Bluetooth band 123.

Figure 34:
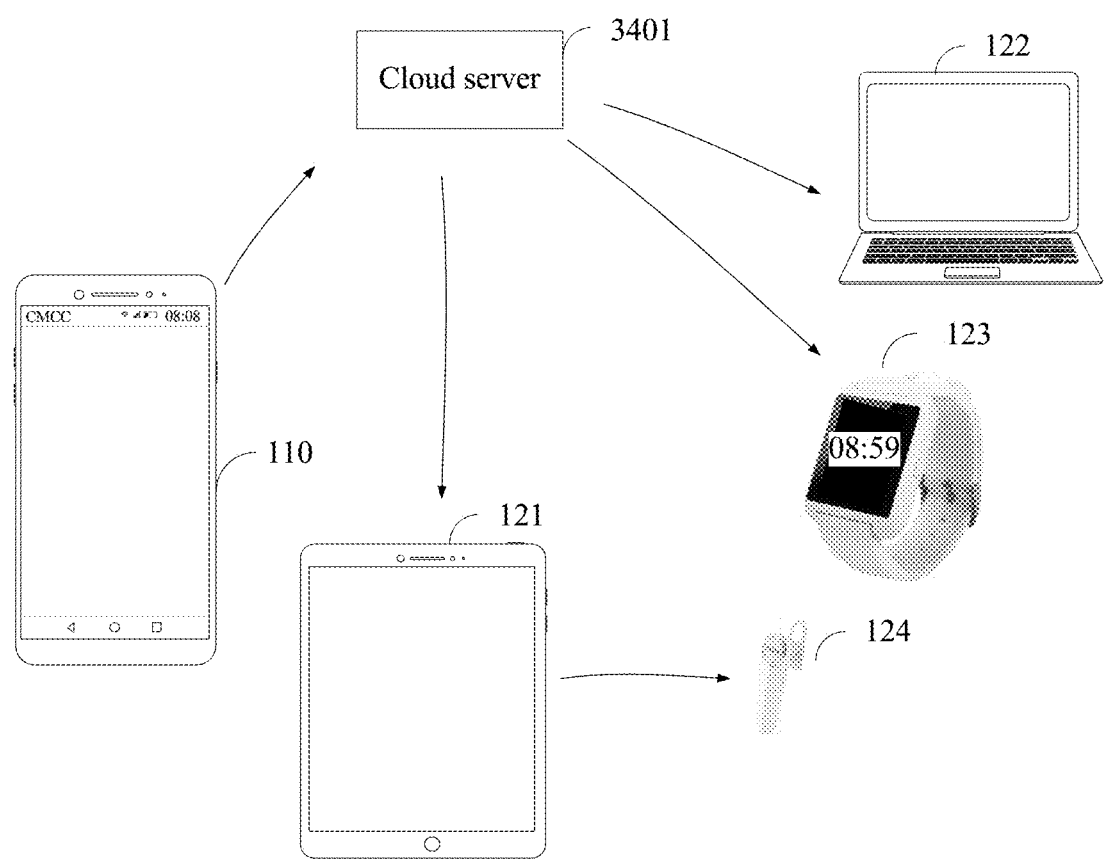
FIG. 34 is a schematic diagram of a network architecture to which a device control method is applied according to an embodiment of the present application.

In some embodiments, as shown in FIG. 34, the mobile phone 110 may send the first control command or the second control command to the tablet computer 121, the notebook computer 122, and the Bluetooth band 123 by using a cloud server 3401, and then the tablet computer 121 sends the first control command or the second control command to the Bluetooth headset 124 that has the wireless short-range communication connection to the tablet computer 121.

In other embodiments, after the first device sends the first control command or the second control command to the second device, the second device may forward the first control command or the second control command to another device that has a wireless short-range communication connection to the second device.

Figure 35:
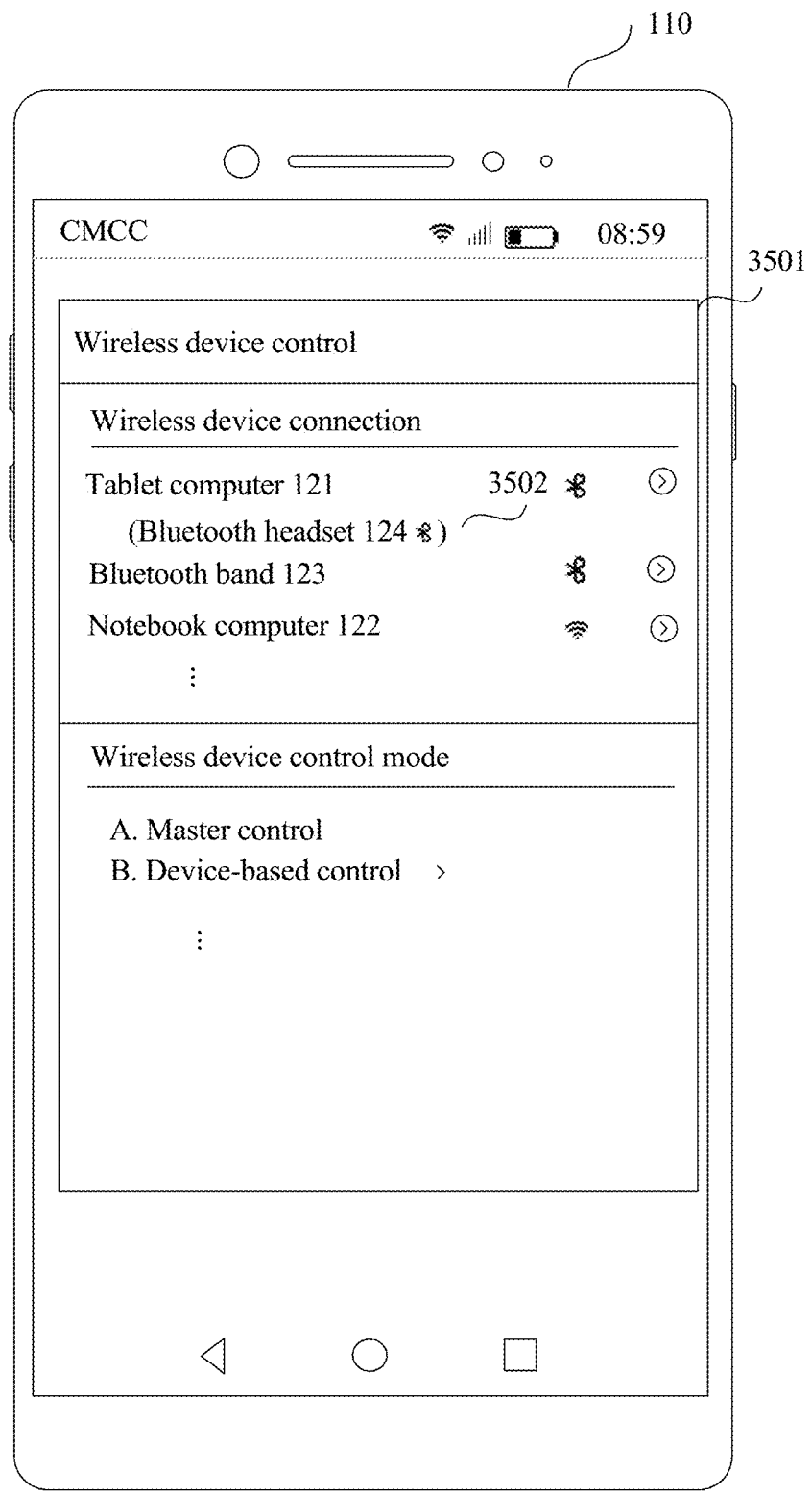
FIG. 35 is a schematic diagram of a mobile phone display interface instance according to an embodiment of the present application.

In these embodiments, the network architecture shown in FIG. 2 is used as an example, and the "Wireless device control interface" shown in FIG. 6B, FIG. 7C, and other related accompanying drawings all may be replaced with a "Wireless device control interface" 3501 shown in FIG. 35. In FIG. 35, the "Wireless device control interface" 3501 may include identifiers and wireless short-range communication connection manners of the tablet computer 121, the Bluetooth band 123, and the notebook computer 122 that have wireless short-range communication connections to the mobile phone 110, and may also include an identifier of the Bluetooth headset 124 that has a wireless short-range communication connection to the tablet computer 121 and a wireless short-range communication connection manner (Bluetooth connection) between the Bluetooth headset 124 and the tablet computer 121.

In the "Master control" mode, after receiving the first control command or the second control command sent by the first device (such as the mobile phone 110), a second device (such as the tablet computer 121) may forward the first control command or the second control command to a third device (such as the Bluetooth headset 124) that has a wireless short-range communication connection to the second device (such as the tablet computer 121), so as to instruct the third device to perform the control action instructed by the first control command or the second control command.

Figure 36:
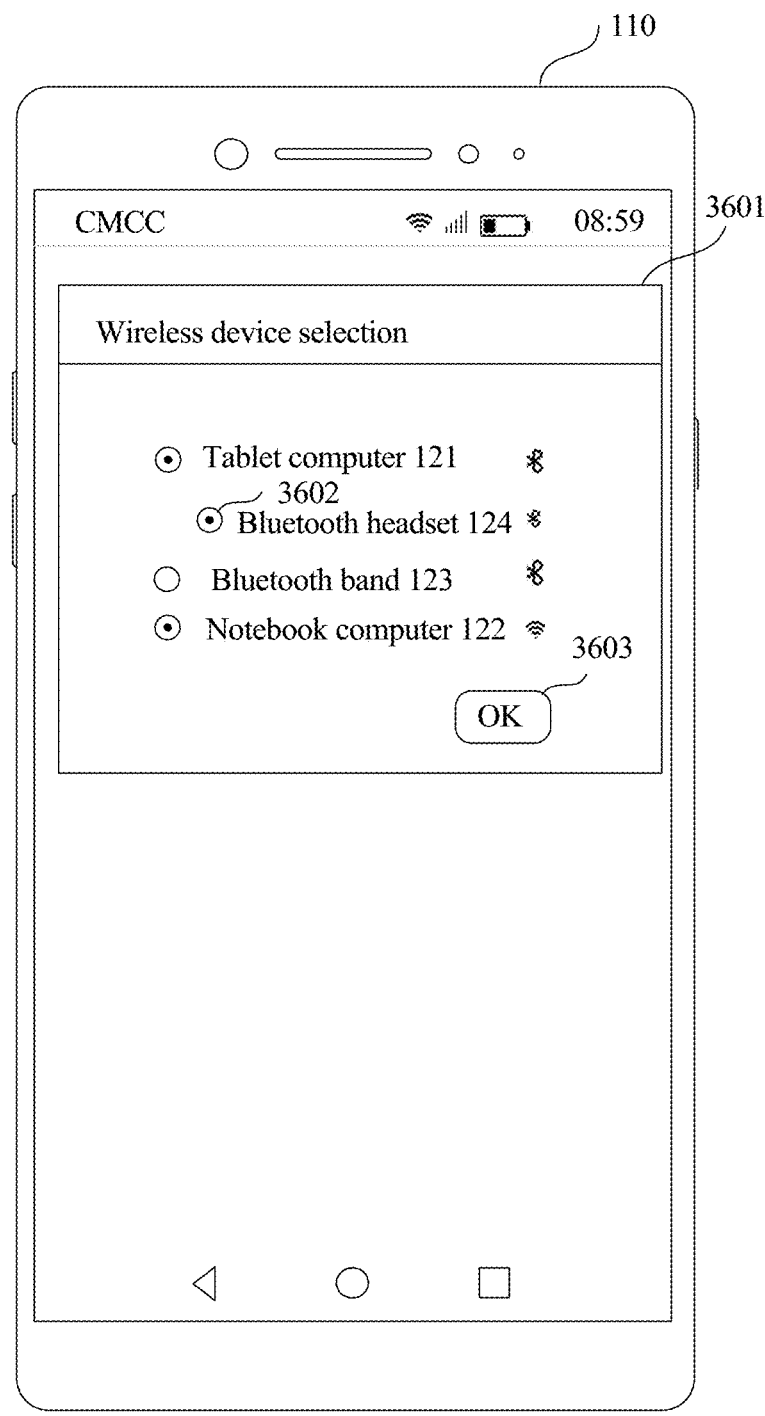
FIG. 36 is a schematic diagram of a mobile phone display interface instance according to an embodiment of the present application.

In addition, the network architecture shown in FIG. 2 is used as an example. The "Wireless device selection interface" shown in FIG. 13B and other related accompanying drawings all may be replaced with a "Wireless device selection interface" 3601 in FIG. 36. In FIG. 36, the "Wireless device selection interface" 3601 may include options and wireless short-range communication connection manners of the tablet computer 121, the Bluetooth band 123, and the notebook computer 122 that have wireless short-range communication connections to the mobile phone 110, and may also include an option of the Bluetooth headset 124 that has a wireless short-range communication connection to the tablet computer 121 and a wireless short-range communication connection manner (Bluetooth connection) between the Bluetooth headset 124 and the tablet computer 121.

In the "Device-based control" mode, as shown in FIG. 36, when the user selects a third device (in other words, the user selects an option 3602 of the Bluetooth headset 124 shown in FIG. 36) that has a wireless short-range communication connection to any second device (such as the tablet computer 121), the first control command or the second control command sent by the first device to the second device may carry forwarding instruction information, where the forwarding instruction information is used to instruct the second device to forward the first control command or the second control command to the third device that has the wireless short-range communication connection to the second device. When receiving the first control command or the second control command that carries the forwarding instruction information, the second device (such as the tablet computer 131) may forward the first control command or the second control command to the third device (the Bluetooth headset 124) that has the wireless short-range communication connection to the second device.

If the user does not select any third device, the second device does not need to forward the received first control command or the received second control command.

For example, the forwarding instruction information may be indicated by using a preset field in the first control command or the second control command. For example, when the preset field is "1", it indicates that the second device needs to forward the first control command or the second control command to the third device that has the wireless short-range communication connection to the second device; when the preset field is "0", it indicates that the second device does not need to forward the first control command or the second control command to the third device that has the wireless short-range communication connection to the second device.

For example, based on the first control command shown in Table 5, for detailed content of the first control command, refer to a control command shown in Table 9.

TABLE 9

| First control command | | | |
|---|---|---|---|
| Control action (first indication information) | Time information | Object device identifier | Forwarding instruction information |
| 01 | 09:10:00-11:20:00 | 35:AB:25:66:EF:20 35:AB:25:66:EF:88 | 1 |

According to the device control method provided in this embodiment of the present application, the first device may send a first control command to second devices to instruct the second devices to perform a control action (for example, the control action includes enabling a wireless communication capability, disabling a wireless communication capability, powering on, or powering off). In this way, the user does not need to manually control the second devices to enable a wireless communication capability, disable a wireless communication capability, be powered on, or be powered off. In addition, the first device may simultaneously control a plurality of second devices to perform the control action by using the first control command, without a need of manually controlling the plurality of second devices one by one, so that efficiency of controlling a plurality of wireless devices to perform the control action can be improved. Then, a security risk existing or inconvenience caused to the user because the user forgets a wireless device may be further reduced.

The foregoing mainly describes the solutions provided in the embodiments of this application from a perspective of interaction between the first device, the second device, and the third device. It may be understood that, to implement the foregoing functions, the first device includes corresponding function modules for performing the functions. A person skilled in the art should easily be aware that, in combination with the examples described in the embodiments disclosed in this specification, the first device and algorithms steps may be implemented in this application by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

The first device provided in the embodiments of this application is configured to implement the foregoing method embodiments. Specifically, the first device may be divided based on the foregoing method examples. For example, modules or units may be obtained through division for the functions, or two or more functions may be integrated into one processing module. The integrated module may be implemented in a form of hardware, or may be implemented in a form of a software module or unit. In this embodiment of this application, module or unit division is an example, and is merely a logical function division. In actual implementation, another division manner may be used.

Figure 37:
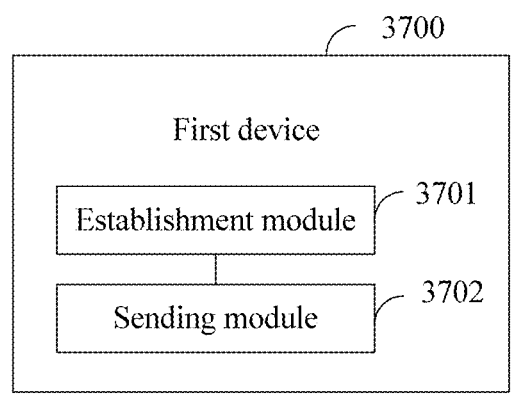
FIG. 37 is a schematic structural composition diagram of a first device according to an embodiment of the present application.

FIG. 37 is a possible schematic structural diagram of a first device in the foregoing embodiments. As shown in FIG. 37, the first device 3700 may include an establishment module 3701 and a sending module 3702.

The establishment module 3701 is configured to support S401 in the method embodiment, and/or is configured to execute another process of the technology described in this specification. The sending module 3702 is configured to support S402, S504, S1902, S2502, S2701, S3102, and S3203 in the method embodiment, and/or is configured to execute another process of the technology described in this specification.

Figure 38:
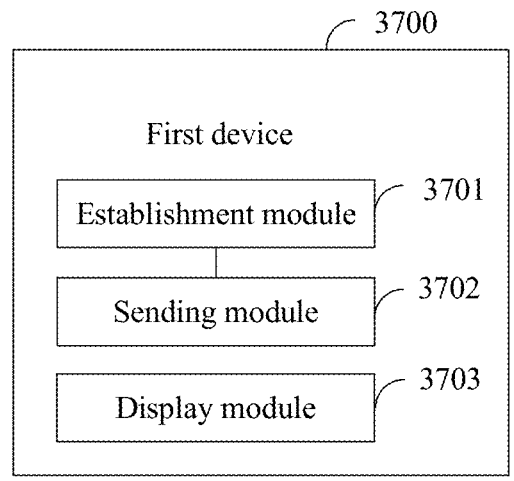
FIG. 38 is a schematic structural composition diagram of a first device according to an embodiment of the present application.

Further, as shown in FIG. 38, the first device 3700 may include a display module 3703. The display module 3703 is configured to support S501, S502, S1701, S1903, and S3201 in the method embodiment, and/or is configured to execute another process of the technology described in this specification.

Further, the first device 3700 may include a control module. The control module is configured to support S2401, S2503, and S3101 in the method embodiment, and/or is configured to execute another process of the technology described in this specification.

Further, the first device 3700 may include a storage module. The storage module is configured to store icons of one or more second devices, one or more first interfaces, one or more second interfaces, and the like, and/or is configured to execute another process of the technology described in this specification.

Certainly, the first device 3700 includes but is not limited to the unit modules listed above. For example, the first device 3700 may further include a receiving module configured to receive data or a signal sent by another device (such as a second device). In addition, functions that can be specifically implemented by the modules include but are not limited to functions corresponding to the method steps in the examples. For another unit of the first device 3700 and a detailed description of each unit of the first device 3700, refer to a detailed description of a method step corresponding to the unit. Details are not described herein again in this embodiment of this application.

When an integrated unit is used, the establishment module 3701, the control module, and the like may be integrated into one processing unit for implementation. The processing unit may be a processor or a controller, for example, may be a CPU, a graphics processing unit (GPU), a general-purpose processor, a digital signal processor (DSP), an application-specific integrated circuit (ASIC), a field programmable gate array (FPGA) or another programmable logic device, a transistor logic device, a hardware component, or any combination thereof. The processing unit may implement or execute various examples of logical blocks, modules, and circuits described with reference to content disclosed in this application. The processing unit may be a combination implementing a computing function, for example, a combination of one or more microprocessors, or a combination of a DSP and a microprocessor. The storage module may be a memory.

Figure 39:
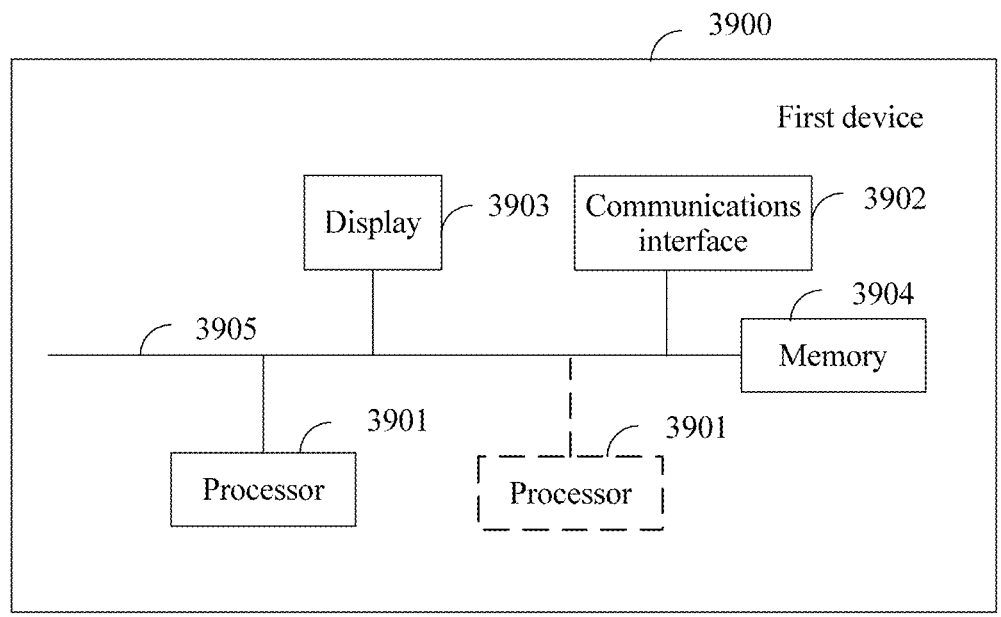
FIG. 39 is a schematic structural composition diagram of a first device according to an embodiment of the present application.

When the processing unit is a processor and the storage module is a memory, the first device 3700 in this embodiment of this application may be a first device 3900 shown in FIG. 39. As shown in FIG. 39, the first device 3900 includes a processor 3901, a communications interface 3902, a display 3903, and a memory 3904.

The processor 3901, the communications interface 3902, the display 3903, and the memory 3904 are connected to each other through a bus 3905. The communications interface 3902 is configured to communicate with a second device through a wireless short-range communication connection, and the display 3903 is configured to display a display interface generated by the processor. The memory 3904 is configured to store computer program code. The computer program code includes an instruction. When the processor 3901 executes the instruction, the first device performs the device control method shown in any one of FIG. 4, FIG. 5, FIG. 17, FIG. 19, FIG. 24, FIG. 25, FIG. 27, FIG. 28, and FIG. 29.

The bus 3905 may be a peripheral component interconnect (PCI) bus, an extended industry standard architecture (EISA) bus, or the like. The bus 3905 may be classified into an address bus, a data bus, a control bus, and the like. For ease of representation, only one thick line is used to represent the bus in FIG. 39, but this does not mean that there is only one bus or only one type of bus.

Optionally, the first device 3900 provided in this application may include one or more processors 3901.

An embodiment of the present application further provides a computer storage medium. The computer storage medium stores computer program code. When one or more processors 3901 of the first device 3900 execute the computer program code, the first device 3900 performs the related method steps in any one of FIG. 4, FIG. 5, FIG. 17, FIG. 19, FIG. 24, FIG. 25, FIG. 27, FIG. 28, and FIG. 29 to implement the device control method in the foregoing embodiments.

An embodiment of the present application further provides a computer program product. When the computer program product is run on a computer, the computer is enabled to perform the related method steps corresponding to the first device in any one of FIG. 4, FIG. 5, FIG. 17, FIG. 19, FIG. 24, FIG. 25, FIG. 27, FIG. 28, and FIG. 29 to implement the device control method in the foregoing embodiments.

The first device 3700, the first device 3900, the computer storage medium, or the computer program product provided in the embodiments of the present application is configured to perform a corresponding method provided above. Therefore, for beneficial effects that can be achieved by the first device 3700, the first device 3900, the computer storage medium, or the computer program product, refer to beneficial effects in the corresponding method provided above. Details are not described herein again.

Figure 40:
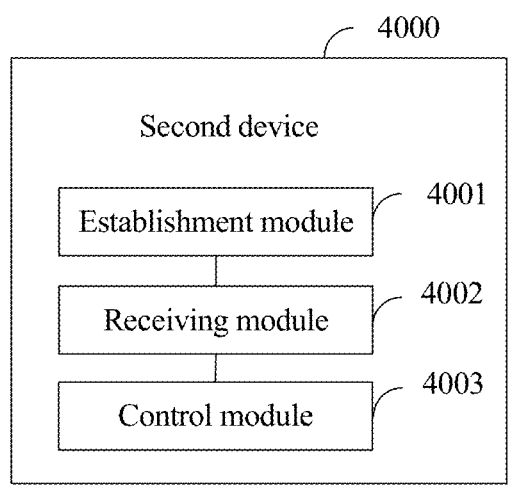
FIG. 40 is a schematic structural composition diagram of a second device according to an embodiment of the present application.

FIG. 40 is a possible schematic structural diagram of a second device in the foregoing embodiments. As shown in FIG. 40, the second device 4000 may include an establishment module 4001, a receiving module 4002, and a control module 4003.

The establishment module 4001 is configured to support an operation: "a first device establishes a wireless short-range communication connection to a second device" in S401 in the method embodiment, and/or is configured to execute another process of the technology described in this specification. The receiving module 4002 is configured to support S403 and S2702 in the method embodiment, and/or is configured to execute another process of the technology described in this specification. The control module 4003 is configured to support S404, S404a, S2703, S404b, S2801, S404c, and S2901 in the method embodiment, and/or is configured to execute another process of the technology described in this specification.

Further, the second device 4000 may include a sending module 4002. The sending module 4002 may be configured to send a first control command or a second control command to a third device.

Certainly, the second device 4000 includes but is not limited to the unit modules listed above. In addition, functions that can be specifically implemented by the modules include but are not limited to functions corresponding to the method steps in the examples. For another unit of the second device 4000 and a detailed description of each unit of the second device 4000, refer to a detailed description of a method step corresponding to the unit.

When an integrated unit is used, the establishment module 4001, the control module 4003, and the like may be integrated into one processing unit for implementation. The processing unit may be a processor or a controller, for example, may be a CPU, a GPU, a general-purpose processor, a DSP, an ASIC, an FPGA or another programmable logic device, a transistor logic device, a hardware component, or any combination thereof. The processing unit may implement or execute various examples of logical blocks, modules, and circuits described with reference to content disclosed in this application. The processing unit may be a combination implementing a computing function, for example, a combination of one or more microprocessors, or a combination of a DSP and a microprocessor. The storage module may be a memory.

Figure 41:
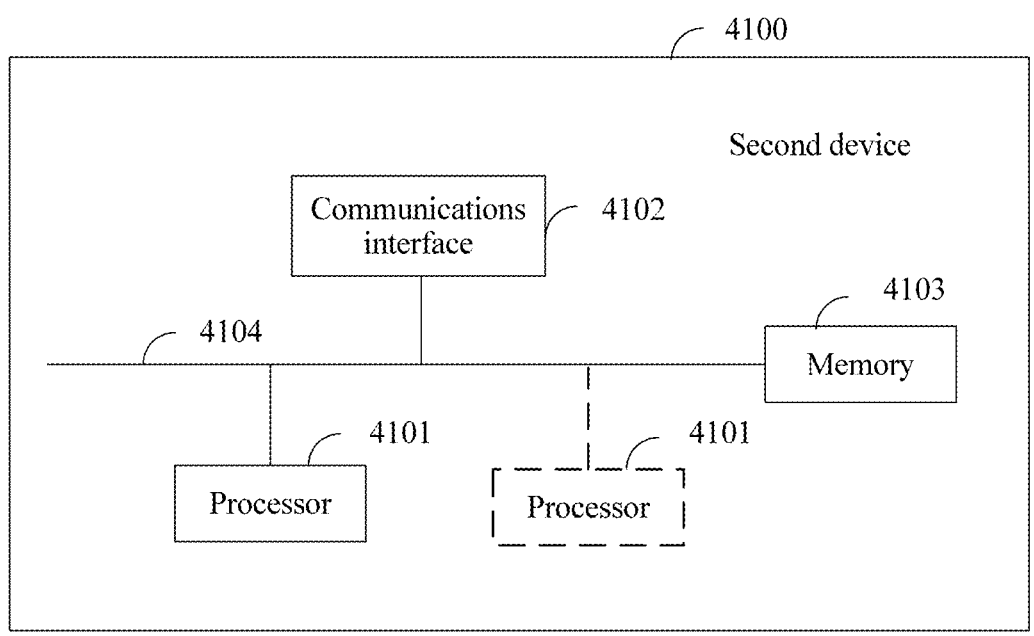
FIG. 41 is a schematic structural composition diagram of a second device according to an embodiment of the present application.

When the processing unit is a processor and the storage module is a memory, the second device 4000 in this embodiment of this application may be a second device 4100 shown in FIG. 41. As shown in FIG. 41, the second device 4101 includes a processor 4101, a communications interface 4102, and a memory 4103.

The processor 4101, the communications interface 4102, and the memory 4103 are connected to each other through a bus 4104. The communications interface 4102 is configured to communicate with a first device through a wireless short-range communication connection. The memory 4103 is configured to store computer program code. The computer program code includes an instruction. When the processor 4101 executes the instruction, the second device performs the device control method shown in any one of FIG. 4, FIG. 5, FIG. 17, FIG. 19, FIG. 24, FIG. 25, FIG. 27, FIG. 28, and FIG. 29.

The bus 4104 may be a PCI bus, an EISA bus, or the like. The bus 4104 may be classified into an address bus, a data bus, a control bus, and the like. For ease of representation, only one thick line is used to represent the bus in FIG. 41, but this does not mean that there is only one bus or only one type of bus.

Optionally, the second device 4100 provided in this application may include one or more processors 4101.

An embodiment of the present application further provides a computer storage medium. The computer storage medium stores computer program code. When one or more processors 4101 of the second device 4101 execute the computer program code, the second device 4101 performs the related method steps in any one of FIG. 4, FIG. 5, FIG. 17, FIG. 19, FIG. 24, FIG. 25, FIG. 27, FIG. 28, and FIG. 29 to implement the device control method in the foregoing embodiments.

An embodiment of the present application further provides a computer program product. When the computer program product is run on a computer, the computer is enabled to perform the related method steps corresponding to the second device in any one of FIG. 4, FIG. 5, FIG. 17, FIG. 19, FIG. 24, FIG. 25, FIG. 27, FIG. 28, and FIG. 29 to implement the device control method in the foregoing embodiments.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented based on a requirement, to be specific, an inner structure of an apparatus is divided into different function modules to implement all or some of the functions described above. For a detailed working process of the foregoing system, apparatus, and unit, refer to a corresponding process in the foregoing method embodiments.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:
1. A device control method, comprising:
 establishing, by a first device, a wireless short-range communication connection to a second device;
 sending, by the first device, a first control command to the second device through the wireless short-range communication connection, wherein the first control command is used to instruct the second device to perform a control action; and before sending the first control command to the second device through the wireless short-range communication connection:
  displaying, by the first device, a first interface in response to a first input of a user, wherein the first interface comprises a device connection window, and the device connection window comprises an identifier of a device that has the wireless short-range communication connection to the first device; and
  displaying, by the first device, a second interface in response to a second input of the user, wherein the second interface comprises a selection window having a plurality of selectable control commands associated with communication capability and power of the second device, the selection window is used to set indication information in the first control command by selecting at least one of the plurality of selectable control commands, and the indication information is used to indicate the control action to be performed by the second device,
  wherein the second interface further comprises a time window, and time information entered in the time window is used to indicate a time at which the second device performs the control action.

2. The device control method according to claim 1, wherein
  the control action includes at least enabling a wireless communication capability, disabling a wireless communication capability, powering on, or powering off,
  the wireless communication capability includes at least a wireless transmit capability and a wireless receive capability,
  the wireless transmit capability comprises one or more of a radio frequency transmit capability, a wireless fidelity (Wi-Fi) transmit capability, or a Bluetooth transmit capability, and
  the wireless receive capability comprises one or more of a radio frequency receive capability, a Wi-Fi receive capability, or a Bluetooth receive capability.

3. The device control method according to claim 1, wherein
  when the first input is further used to instruct the first device to be powered off, after sending the first control command to the second device through the wireless short-range communication connection, the method further comprises displaying, by the first device, a power off interface;
  when the first input is further used to instruct the first device to disable a wireless communication capability of the first device, after sending the first control command to the second device through the wireless short-range communication connection, the method further comprises disabling, by the first device, the wireless communication capability of the first device, and displaying a third interface comprising indication information indicating that the wireless communication capability of the first device has been disabled; and
  when the first input is a start instruction of a first application, the first interface is a display interface of the first application.

4. The device control method according to claim 1, wherein the time information comprises a first time and a second time; and
  the first control command is used to instruct the second device to be powered off at the first time and to be powered on at the second time.

5. The device control method according to claim 4, wherein the first control command is used to instruct the second device to be powered on and to disable a wireless communication capability at the second time.

6. The device control method according to claim 1, wherein the time information comprises a first time and a second time; and
  the first control command is used to instruct the second device to disable a wireless communication capability at the first time and to enable the wireless communication capability at the second time.

7. The device control method according to claim 1, wherein the first control command is further used to instruct a third device that has a wireless short-range communication connection to the second device to perform the control action.

8. The device control method according to claim 1, wherein the plurality of selectable control commands include commands for instructing the second device to perform any of disabling transmit capability and enabling receive capability of the second device, disabling transmit capability and disabling receive capability of the second device, enabling transmit capability and enabling receive capability of the second device, powering on the second device, and powering off the second device.

9. The device control method according to claim 1, wherein the second interface further comprises a time obtaining area for selecting one or more time options read from time information stored in the first device.

10. A device control method, comprising:
  establishing, by a second device, a wireless short-range communication connection to a first device;
  receiving, by the second device through the wireless short-range communication connection to the first device, a first control command; and
  performing, by the second device, a control action according to an instruction of the first control command, wherein
  the control action comprises enabling a wireless communication capability, disabling a wireless communication capability, powering on, or powering off,
  the first control command further carries time information used to indicate a time at which the second device performs the control action, and
  the first control command selectable from a plurality of control commands displayable using a user interface of the first device and designated by operation of the user interface of the first device.

11. The device control method according to claim 10, wherein
  the time information comprises a first time and a second time; and
  the second device is powered off at the first time and is powered on and disables the wireless communication capability at the second time according to the first control command.

12. The device control method according to claim 10, wherein the time information comprises a first time and a second time; and
  the second device disables the wireless communication capability at the first time and enables the wireless communication capability at the second time according to the first control command.

13. A first device, comprising:
a processor;
a communications interface configured to communicate with a second device through a wireless short-range communication connection;
a display configured to display a display interface generated by the processor; and
a memory configured to store computer readable instructions that, when executed by the processor, cause the first device to:
  establish the wireless short-range communication connection to the second device; and
  send a first control command to the second device through the wireless short-range communication connection, wherein the first control command is used to instruct the second device to perform a control action, wherein
  before sending the first control command to the second device through the wireless short-range communication connection, the first device is caused to:
    display a first interface in response to a first input of a user, wherein the first interface comprises a device connection window, and the device connection window comprises an identifier of a device that has the wireless short-range communication connection to the first device; and
    display a second interface in response to a second input of the user, wherein the second interface comprises a selection window having a plurality of selectable control commands associated with communication capability and power of the second device, the selection window is used to set indication information in the first control command by selecting at least one of the plurality of selectable control commands, and the indication information is used to indicate the control action to be performed by the second device,
  wherein the second interface further comprises a time window, and time information entered in the time window is used to indicate a time at which the second device performs the control action.

14. The first device according to claim 13, wherein the control action includes at least enabling a wireless communication capability, disabling a wireless communication capability, powering on, or powering off.

15. The first device according to claim 14, wherein
the wireless communication capability includes, at least, a wireless transmit capability and a wireless receive capability;
the wireless transmit capability comprises one or more of a radio frequency transmit capability, a wireless fidelity (Wi-Fi) transmit capability, or a Bluetooth transmit capability; and
the wireless receive capability comprises one or more of a radio frequency receive capability, a Wi-Fi receive capability, and a Bluetooth receive capability.

16. The first device according to claim 13, wherein
when the first input is further used to instruct the first device to be powered off, after sending the first control command to the second device through the wireless short-range communication connection, the first device is further caused to display a power off interface;
when the first input is further used to instruct the first device to disable a wireless communication capability of the first device, after sending the first control command to the second device through the wireless short-range communication connection, the first device is further caused to disable the wireless communication capability of the first device, and display a third interface comprising indication information indicating that the wireless communication capability of the first device has been disabled; and
when the first input is a start instruction of a first application, the first interface is a display interface of the first application.

17. The first device according to claim 13, wherein the time information comprises a first time and a second time; and
the first control command is used to instruct the second device to be powered off at the first time and to be powered on at the second time.

18. The first device according to claim 17, wherein the first control command is used to instruct the second device to be powered on and to disable a wireless communication capability at the second time.

19. The first device according to claim 13, wherein the time information comprises a first time and a second time; and
the first control command is used to instruct the second device to disable a wireless communication capability at the first time and to enable the wireless communication capability at the second time.

20. The first device according to claim 13, wherein the first control command is further used to instruct a third device that has a wireless short-range communication connection to the second device to perform the control action.

* * * * *